(12) United States Patent
Thomaz et al.

(10) Patent No.: US 11,904,470 B2
(45) Date of Patent: Feb. 20, 2024

(54) SYSTEMS, APPARATUSES, AND METHODS FOR ROBOTIC LEARNING AND EXECUTION OF SKILLS INCLUDING NAVIGATION AND MANIPULATION FUNCTIONS

(71) Applicant: Diligent Robotics, Inc., Austin, TX (US)

(72) Inventors: Andrea Lockerd Thomaz, Austin, TX (US); Vivian Yaw-Wen Chu, Austin, TX (US); Peter Worsnop, Bethesda, MD (US); Reymundo Gutierrez, Round Rock, TX (US); Lauren Hutson, Austin, TX (US); Shuai Li, Sammamish, WA (US); Anjana Nellithimaru, Austin, TX (US); Frank Mathis, Austin, TX (US)

(73) Assignee: Diligent Robotics, Inc., Austin, TX (US)

( * ) Notice: Subject to any disclaimer, the term of this patent is extended or adjusted under 35 U.S.C. 154(b) by 0 days.

(21) Appl. No.: 18/446,040

(22) Filed: Aug. 8, 2023

(65) Prior Publication Data

US 2023/0381959 A1 Nov. 30, 2023

Related U.S. Application Data

(63) Continuation of application No. PCT/US2022/015710, filed on Feb. 8, 2022.
(Continued)

(51) Int. Cl.
*B25J 9/16* (2006.01)
*B25J 19/02* (2006.01)

(52) U.S. Cl.
CPC ............... *B25J 9/163* (2013.01); *B25J 9/162* (2013.01); *B25J 9/1666* (2013.01); *B25J 9/1676* (2013.01); *B25J 19/021* (2013.01)

(58) Field of Classification Search
CPC . B25J 9/163; B25J 9/162; B25J 9/1666; B25J 9/1676; B25J 19/021
See application file for complete search history.

(56) References Cited

U.S. PATENT DOCUMENTS 9,919,232 B2 3/2018 Tappeiner et al.
9,926,138 B1 3/2018 Brazeau et al.
(Continued)

FOREIGN PATENT DOCUMENTS

FR 2898824 A1 9/2007
JP 2003256025 A 9/2003
(Continued)

OTHER PUBLICATIONS

Ahmadzadeh et al., "Visuospatial skill learning for object reconfiguration tasks". 2014, IEEE, pp. 685-691.
(Continued)

*Primary Examiner* — Basil T. Jos
(74) *Attorney, Agent, or Firm* — COOLEY LLP

(57) ABSTRACT

Systems, apparatus, and methods are described for robotic learning and execution of skills. A robotic apparatus can include a memory, a processor, sensors, and one or more movable components (e.g., a manipulating element and/or a transport element). The processor can be operatively coupled to the memory, the movable elements, and the sensors, and configured to obtain information of an environment, including one or more objects located within the environment. In some embodiments, the processor can be configured to learn skills through demonstration, exploration, user inputs, etc. In some embodiments, the processor
(Continued)

can be configured to execute skills and/or arbitrate between different behaviors and/or actions. In some embodiments, the processor can be configured to execute skills and/or behaviors using cached trajectories or plans. In some embodiments, the processor can be configured to execute skills requiring navigation and manipulation behaviors.

28 Claims, 44 Drawing Sheets

Related U.S. Application Data

(60) Provisional application No. 63/211,999, filed on Jun. 17, 2021, provisional application No. 63/147,124, filed on Feb. 8, 2021.

(56) References Cited

U.S. PATENT DOCUMENTS

| | | | |
|---|---|---|---|
| 10,571,896 | B2 | 2/2020 | Benaim et al. |
| 10,834,419 | B2 | 11/2020 | Joshi et al. |
| 10,836,183 | B2 | 11/2020 | Kajio et al. |
| 11,148,288 | B2 | 10/2021 | Chu et al. |
| 11,298,825 | B2 | 4/2022 | Chu et al. |
| 2003/0120391 | A1 | 6/2003 | Saito |
| 2012/0185096 | A1* | 7/2012 | Rosenstein ............ B25J 5/007 901/1 |
| 2013/0245824 | A1 | 9/2013 | Barajas et al. |
| 2014/0163730 | A1 | 6/2014 | Mian |
| 2016/0129592 | A1 | 5/2016 | Saboo et al. |
| 2016/0257000 | A1 | 9/2016 | Guerin et al. |
| 2017/0232613 | A1 | 8/2017 | Ponulak et al. |
| 2017/0343992 | A1 | 11/2017 | Benaim et al. |
| 2017/0357270 | A1 | 12/2017 | Russell |
| 2020/0070343 | A1 | 3/2020 | Thomaz et al. |
| 2021/0379748 | A1 | 12/2021 | Murdoch et al. |
| 2021/0379758 | A1 | 12/2021 | Chu et al. |
| 2022/0032458 | A1 | 2/2022 | Chu et al. |
| 2022/0371193 | A1 | 11/2022 | Chu et al. |

FOREIGN PATENT DOCUMENTS

| | | |
|---|---|---|
| JP | 2003271975 A | 9/2003 |
| JP | 2004049731 A | 2/2004 |
| JP | 2005131713 A | 5/2005 |
| JP | 2013193202 A | 9/2013 |
| JP | 2016103277 A | 6/2016 |
| JP | 2016146188 A | 8/2016 |
| WO | WO-2004106009 A1 | 12/2004 |
| WO | WO-2006013829 A1 | 2/2006 |
| WO | WO-2018156952 A1 | 8/2018 |
| WO | WO-2020047120 A1 | 3/2020 |
| WO | WO-2022170279 A1 | 8/2022 |

OTHER PUBLICATIONS

Akgun et al., "Simultaneously learning actions and goals from demonstration," Feb. 2016, vol. 40, Issue 2, pp. 211-227.
Akgun et al., "Trajectories and keyframes for kinesthetic teaching: a human-robot interaction perspective," Proceedings of the 7th Annual ACM/IEEE International Conference on Human-Robot Interaction (2012), pp. 391-398.
Arduengo, et al., "Robust and Adaptive Door Operation with a Mobile Manipulator Robot", arxiv.org, Cornell University Library, 201 Olin Library Cornell University Ithaca, NY 14853, Feb. 25, 2019, 15 pages.
Chu et al., "Learning Haptic Affordances from Demonstration and Human-Guided Exploration," IEEE Haptics Symposium (HAPTICS), Philadelphia, PA, 2016, pp. 119-125.
Cosgun et al., "Context-aware robot navigation using interactively built semantic maps," Paladyn, J. Behav. Robot, 2018, 23 pages.
Dang et al., "Robot learning of everyday object manipulations via human demonstration", IEEE (2010); pp. 1284-1289.
Green et al., "Designing for Learnability in Human-Robot Communication," IEEE Transactions on Industrial Electronics, Aug. 2003, vol. 50, No. 4, pp. 644-650.
Hart et al., "Learning Generalizable Control Programs," 2011, IEEE Transactions on Autonomous Mental Development, Sep. 2011, vol. 3, No. 3, pp. 216-231.
Holz et al., "A skill-based system for object perception and manipulation for automating kitting tasks," IEEE, 2015, 9 pages.
Huang et al., "A virtual demonstrator environment for robot imitation learning", IEEE, 2015, pp. 1-6.
International Preliminary Report on Patentability dated Aug. 3, 2023 in PCT/US2022/015710, 10 pgs.
International Search Report and Written Opinion for International Application No. PCT/US2022/015710, dated May 31, 2022, 15 pages.
International Search Report and Written Opinion dated Feb. 5, 2020, for International Application No. PCT/US2019/048601, 18 pages.
International Search Report and Written Opinion dated May 15, 2018, for International Application No. PCT/US2018/019520, 10 pages.
Kurenkov et al., "An Evaluation of GUI and Kinesthetic Teaching Methods for Constrained-Keyframe Skills," IEEE/RSJ International Conference on Intelligent Robots and Systems, Sep. 28-Oct. 2, 2015, pp. 3608-3613.
Lallee et al., "Towards a Platform-Independent Cooperative Human Robot Interaction System: III An Architecture for Learning and Executing Actions and Shared Plans", IEEE, 2012, p. 329.
Liu, et al., "Learning Articulated Constraints From a One-Shot Demonstration for Robot Manipulation Planning", IEEE Access, vol. 7, Nov. 18, 2019, pp. 172584-172596.
Nassal, "An approach to motion planning for mobile manipulation," IEEE, 1994, pp. 831-838.
Pairet, et al., "Learning and Generalisation of Primitives Skills Towards Robust Dual-arm Manipulation", arxiv.org, Cornell University Library, 201 Olin Library Cornell University Ithaca, NY 14853, Apr. 2, 2019, 8 pages.
Pardowitz, M., et al., "Incremental Learning of Tasks From User Demonstrations, Past Experiences, and Vocal Comments," IEEE Transactions on Systems, Man, and Cybernetics—Part B: Cybernetics, Apr. 2007, vol. 37, No. 2, pp. 322-332.
Savarimuthu, T.R., et al., "Teaching a Robot the Semantics of Assembly Tasks," IEEE Transactions on Systems, Man, and Cybernetics: Systems, May 2018, vol. 48, No. 5, pp. 670-692.
Sucan et al., "Combining planning techniques for manipulation using realtime perception," 2010, IEEE, 7 pages.
Vernon, D., et al., "A Survey of Artificial Cognitive Systems: Implications for the Autonomous Development of Mental Capabilities in Computational Agents," IEEE Transactions on Evolutionary Computation, Apr. 2007, vol. 11, No. 2, pp. 151-180.
Wächter, M., et al., "Action & sequence reproduction based on automatic segmentation and Object-Action Complexes," 13th IEEE-RAS International Conference on Humanoid Robots (Humanoids), 2013, pp. 189-195.
Welschehold, Tim et al., "Learning mobile manipulation actions from human demonstrations", 2017 IEEE/RSJ International Conference On Intelligent Robots And Systems (IROS), IEEE, Sep. 24, 2017, pp. 3196-3201.
Weser et al., "Autonomous planning for mobile manipulation services based on multi-level robot skills," IEEE, 2009, 1999-2004.

\* cited by examiner

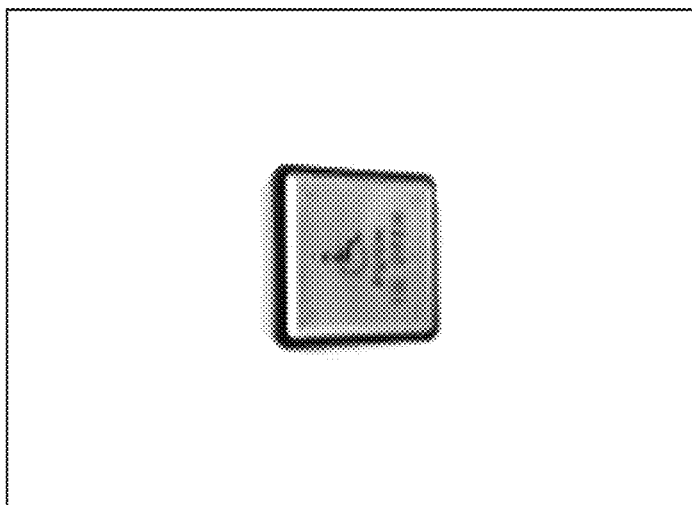
Button 2730c
Wave Sensor 2730b
FIG. 28
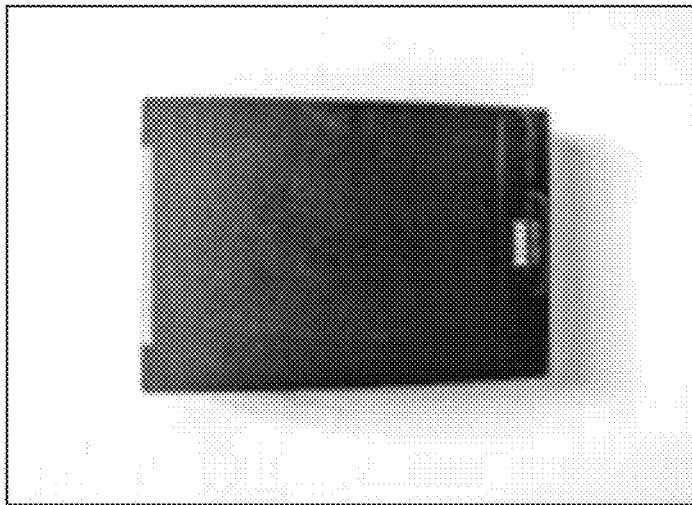
RFID Scanner 2730a

| Doorway Configuration | Example | Wall Type | Door In Field of View |
|---|---|---|---|
|  | 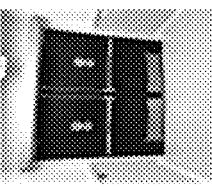 | right_wall left_wall | ✓ |
| 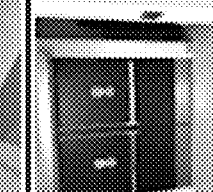 | 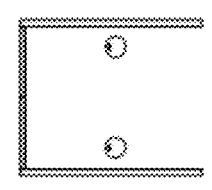 | blocking_right_wall blocking_left_wall | ✗ |
| 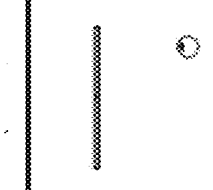 |  | right_wall left_wall | ✓ |
|  | 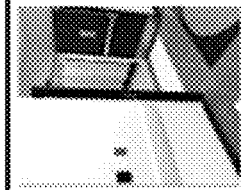 | no_wall | ✓ |
FIG. 37

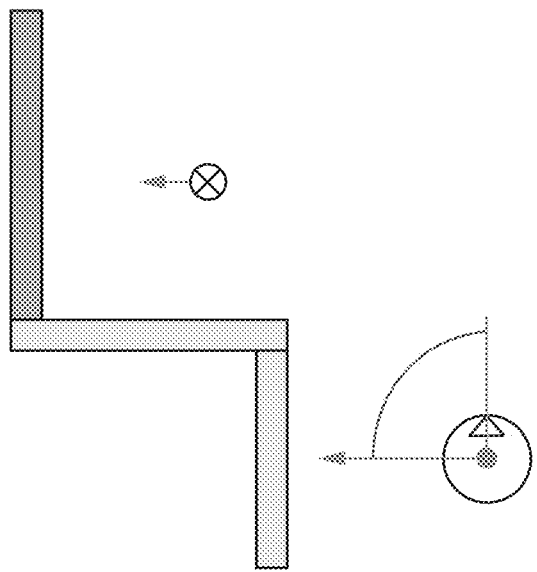
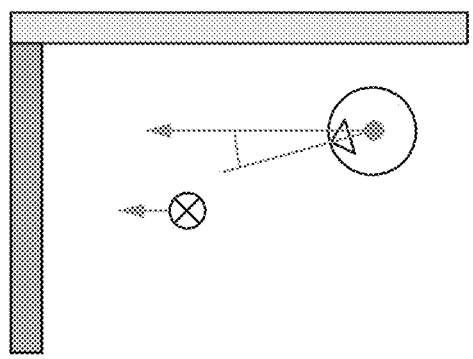
FIG. 38

SYSTEMS, APPARATUSES, AND METHODS FOR ROBOTIC LEARNING AND EXECUTION OF SKILLS INCLUDING NAVIGATION AND MANIPULATION FUNCTIONS

CROSS-REFERENCE TO RELATED APPLICATIONS

This application is a continuation of International Application No. PCT/US2022/015710, entitled "SYSTEMS, APPARATUSES, AND METHODS FOR ROBOTIC LEARNING AND EXECUTION OF SKILLS INCLUDING NAVIGATION AND MANIPULATION FUNCTIONS," filed Feb. 8, 2022, which claims priority to and benefit of U.S. Provisional Application No. 63/147,124, entitled "SYSTEMS, APPARATUS, AND METHODS FOR ROBOTIC LEARNING AND EXECUTION OF SKILLS," filed Feb. 8, 2021, and U.S. Provisional Application No. 63/211,999, entitled "SYSTEMS, APPARATUS, AND METHODS FOR ROBOTIC LEARNING AND EXECUTION OF SKILLS," filed Jun. 17, 2021, the disclosure of each of which is incorporated herein by reference in its entirety.

TECHNICAL FIELD

The present disclosure relates generally to systems, apparatus, and methods for robotic learning and execution of skills. More specifically, the present disclosure relates to a robotic apparatus capable of learning and executing skills in unstructured environments.

BACKGROUND

Robots can be used to perform and automate a variety of tasks. Robots can perform tasks by moving through an environment, such as an office building or a hospital. Robots can be equipped with wheels, tracks, or other mobile components that enable them to move autonomously around an environment. Robots that do not have an arm or other manipulator, however, cannot manipulate objects in the environment. Therefore, these robots are limited in their ability to perform tasks, e.g., such robots may not be able to pick up and deliver an object without a human being present to manipulate the object at a pick up or delivery point.

Robots that include an arm or other manipulator may be able to pick up and deliver objects to a location without a human being present. For example, a robot that has an arm with an end effector, such as a gripper, can use the gripper to pick up one or more objects from different locations and deliver those objects to a new location, all without human assistance. These robots can be used to automate certain tasks, thereby allowing human operators to focus on other tasks. However, most commercial robots do not include manipulators due to the challenge and complexity of programming the operation of a manipulator.

Moreover, most commercial robots are designed to operate in structured environments, e.g., a factory, a warehouse, etc. Unstructured environments, e.g., environments involving humans, such as hospitals and homes, can impose additional challenges for programming a robot. In unstructured environments, robots cannot rely on complete knowledge of their surrounding environment but must be able to perceive changes in their surrounding environment and adapt based on those changes. Thus, in unstructured environments, robots have to continuously acquire information about the environment to be able to make autonomous decisions and perform tasks. Oftentimes, the movements of a robot, e.g., the movements of an arm or end effector in the environment, are also constrained by objects and other obstacles in the environment, further adding to the challenge of robot perception and manipulation. Given the uncertain and dynamic nature of unstructured environments, robots typically cannot be pre-programmed to perform tasks.

Furthermore, most existing robots are configured to execute simple tasks. For instance, most existing robots are configured to move around in a structured environment. At the most these existing robots may navigate through an open door. However, existing robots are not designed to perform sophisticated tasks such as identifying different types of doors, accessing these doors, opening the doors, and navigating through the doorway without pre-programming.

Accordingly, there is a need for robotic systems that can perceive and adapt to dynamic and unstructured environments, and can perform sophisticated tasks within those environments, without relying on pre-programmed manipulation skills.

SUMMARY

Systems, apparatus, and methods are described for robotic learning and execution of skills. In some embodiments, a robotic device can comprise a base supported on a transport element, a manipulating element coupled to the base and including an end effector, a set of sensors, and a processor operatively coupled to the base, the manipulating element, and the set of sensors. The processor can be configured to: register a starting pose of the base and the end effector relative to an activation device for opening a door in response to receiving a first user input indicating a starting pose for opening the door, obtain during a demonstration of a manipulation required to trigger the activation device to open the door sensor data using a set of sensors at a plurality of keyframes of the demonstration, register a target pose of the end effector relative to the activation device in response to receiving a second user input indicating a target pose for triggering the activation device, generate a plan for triggering the activation device based at least in part on the starting pose, sensor data collected at the plurality of keyframes, and the target pose, identify a plurality of additional starting poses for opening the door, and generate a plurality of additional plans for triggering the activation device based at least in part on the plurality of additional starting poses, the sensor data collected at the plurality of keyframes, and the target pose.

In some embodiments, the processor can be further configured to scan an environment near the robotic device using at least one sensor of the set of sensors, and identify based on the scan of the environment a marker associated with the activation device. The processor can be configured to identify the starting pose based at least in part on a position of the marker relative to the base. In some embodiments, the robotic device can further comprise a memory. The processor can be operatively coupled to the memory and can be further configured to store the plan and the plurality of additional plans for triggering the activation device as a plan cache in the memory.

In some embodiments, the door can be a type of door of a plurality of doors. The processor can be further configured to associate the plan cache with the type of door. In some embodiments, the door can be a first door. The processor can be further configured to detect using at least one sensor of the set of sensors a second door that is the same type as the first door and select a plan from the plan cache to execute to open the second door. In some embodiments, the door can be a first door and the activation device can be a first activation device. The processor can be further configured to detect using at least one sensor of the set of sensors a second door and a second activation device associated therewith, obtain information of at least one obstacle in an environment near the second door, determine whether executing at least one plan from the plan cache would cause a collision between the manipulating element and the at least one obstacle, and in response to determining that executing the at least one plan from the plan cache would cause a collision, generate at least one modified plan for triggering the second activation device.

In some embodiments, the processor can be configured to obtain information of the at least one obstacle by retrieving information of objects near at least one of the second door or the second activation device from a map of the environment stored in the memory.

In some embodiments, the processor can be further configured to in response to determining that executing the at least one plan from the plan cache would not cause the robotic device to collide with the at least one obstacle, determine whether executing the at least one plan would successfully trigger the second activation device, and in response to determining that the at least one plan would successfully trigger the second activation device, associate the at least one plan with the second activation device.

In some embodiments, the processor can be further configured to in response to determining that the at least one plan would not successfully trigger the second activation device, generate at least one modified plan for triggering the second activation device. In some embodiments, the processor can be further configured to in response to determining that the at least one plan would not successfully trigger the second activation device, present a message to a user to prompt the user to open the second door.

In some embodiments, the processor can be configured to identify the plurality of additional starting poses by randomly sampling around the starting pose based on a statistical distribution. In some embodiments, the processor can be configured to in response to receiving a third user input indicating that an obstacle is located near the door, present a message to a user to prompt the user to teach the collision primitive, and obtain, using at least one sensor of the set of sensors, spatial and geometric information of the obstacle. The processor can be configured to generate the plan and the plurality of additional plans further based on the spatial and geometric information of the obstacle.

In some embodiments, a method can comprise in response to receiving at a robotic device a first user input indicating a starting pose of the robotic device for opening a door, registering the starting pose of a base and an end effector of the robotic device relative to an activation device for opening the door, obtaining, using a set of sensors of the robotic device and during a demonstration of a manipulation by the robotic device to trigger the activation device to open the door, sensor data at a plurality of keyframes of the demonstration, in response to receiving at the robotic device a second user input indicating a target pose for triggering the activation device, registering the target pose of the end effector relative to the activation device, generating a plan for triggering the activation device based at least in part on the starting pose, the sensor data collected at the plurality of keyframes, and the target pose, identifying a plurality of additional starting poses for opening the door, and generating a plurality of additional plans for triggering the activation device based at least in part on the plurality of additional starting poses, the sensor data collected at the plurality of keyframes, and the target pose.

In some embodiments, the activation device is a scanner. Triggering the activation device can include scanning a badge at the scanner. In some variations, the activation device is a button and triggering the activation device can include pushing the button.

In some embodiments, a robotic device can comprise a base supported on a transport element, a manipulating element coupled to the base and including an end effector, a set of sensors, and a processor operatively coupled to the base, the manipulating element, and the set of sensors. The processor can be configured to scan, using at least one sensor of the set of sensors, an environment near the robotic device, identify based on the scan of the environment a marker associated with an activation device for opening a door, access a plan cache including a plurality of plans for triggering the activation device, determine a current pose of the base and the end effector relative to the marker, select a plan from the plurality of plans for triggering the activation device based on the current pose of the base and the end effector, and execute at least a portion of the plan.

In some embodiments, the processor can be configured to after executing the plan, determine whether the door has opened, and in response to determining that the door has opened, navigate using the transport element through the door. In some embodiments, the plan can be a first plan and the processor can be configured to in response to determining that the door has not opened, select a second plan from the plurality of plans for triggering the activation device, the second plan being different from the first plan, and execute the second plan.

In some embodiments, the plan can be a first plan, and the processor can be configured to in response to determining that the door has not opened, move the base and the end effector into a different pose relative to the activation device, select a second plan from the plurality of plans for triggering the activation device, and execute the second plan. In some embodiments, the processor can be further configured to in response to determining that the door has opened, positioning the manipulating element into a predefined safe position prior to navigating through the door.

In some embodiments, the processor can be configured to detect a collision with an obstacle during the execution of at least the portion of the plan, and in response to detecting the collision, terminate the execution of the plan and moving the end effector back into a predefined safe position. In some embodiments, the processor can be configured to determine a type of the activation device based on the marker, the plan cache being associated with the type of the activation device.

In some embodiments, the processor can be configured to in response to receiving a user input after executing the plan that indicates that the door has not opened, select a second plan from the plan cache for triggering the activation device, and execute the second plan. In some embodiments, the processor can be further configured to: define a safety perimeter associated with the robotic device, determine a likelihood that an object has entered the safety perimeter, and based on the likelihood: pause movement of the manipulating element; slow a speed of movement of the manipulating element; or resume movement of the manipulating element. In some embodiments, the processor can be configured to select the plan by selecting the plan from the plurality of plans that is associated with a starting pose that is closest to the current pose of the base and the end effector.

In some embodiments, a method can comprise scanning, using a set of sensors of a robotic device, an environment near the robotic device, identifying based on the scan of the environment a marker associated with an activation device for opening a door, accessing a plan cache including a plurality of plans for triggering the activation device, determining a current pose of a base and an end effector of the robotic device relative to the marker, selecting a plan from the plurality of plans for triggering the activation device based on the current pose of the base and the end effector, and executing at least a portion of the plan.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 28 illustrates example variations of activation devices, according to some embodiments.

FIG. 37 depicts four doorway configurations based on the presence of walls, the robotic device's location, and whether the door is in the robotic device's field of view, according to some embodiments.

FIG. 38 depicts an example door in the field of view of the robotic device and an example door outside the field of view of the robotic device, according to some embodiments.

DETAILED DESCRIPTION

Figure 1:
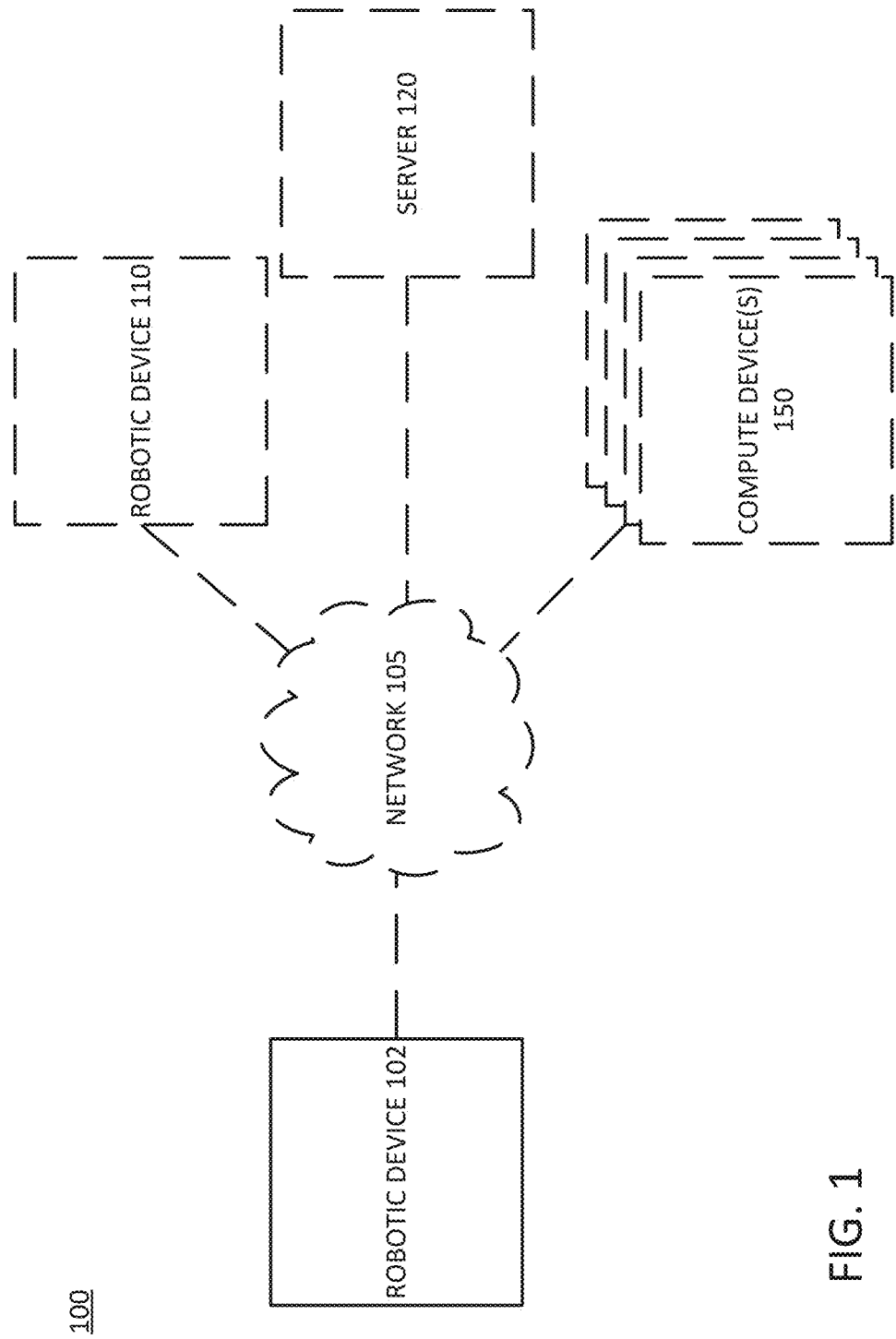
FIG. 1 is a block diagram illustrating a configuration of system including a robotic device, according to some embodiments.

Systems, apparatus, and methods are described herein for robotic learning and execution of skills. In some embodiments, systems, apparatus, and methods described herein relate to a robotic apparatus capable of learning skills via human demonstrations, exploration, and interactions and executing learned skills in unstructured environments. In some embodiments, systems, apparatus, and methods described herein relate to a robotic apparatus capable of learning sophisticated skills such as accessing a door, opening a door, and/or navigating through a doorway.

Overview

In some embodiments, systems, apparatus, and methods described herein relate to robots that can learn skills (e.g., manipulation skills). For example, in some embodiments, robots can learn skills via a Learning from Demonstration ("LfD") process, in which a human demonstrates an action to the system via kinesthetic teaching (e.g. the human guides the robot through the action physically and/or by remote control) and/or the human's own performance of the action. Such systems, apparatus, and methods do not require a robot to be pre-programmed with manipulation skills, but rather the robot is designed to be adaptive and capable of learning skills via observations. For example, a robot can use machine-learning techniques to acquire and execute a manipulation skill. After learning a skill, the robot can execute the skill in different environments. The robot can learn and/or execute a skill based on visual data (e.g., perceived visual information). Alternatively or additionally, the robot can learn and/or execute the skill using haptic data (e.g., torque, forces, and other non-visual information).

In some embodiments, robots can learn skills via Learning from Execution process, in which, during the execution of a previously learned skill, the robot can perceive information about the environment (e.g., using sensor data such as visual information and/or using haptic data such as torque, forces, and other non-visual information). The robot can analyze and/or update information about the environment based on the information perceived during the execution of skill. The robot can adapt its behavior to execute a skill based on this learning. In some embodiments, robots can learn skills via Learning from Exploration process, in which, the robot can scan an environment and collect information on the environment. The robot can then select an existing skill model (e.g., a model that when implemented causes the robot to execute a skill) to plan and execute the skill using the skill model. In some embodiments, robots can learn skills via Learning from User Input (e.g., interactive learning), in which, the robot can engage with a human and receive inputs that enable the robot to execute skills. For instance, the robot can receive information regarding an environment, initial set of models and/or rules to execute a skill, etc. from a user. In some instances, the robot can engage with a user while operating in an environment. In some instances, the robot can autonomously perform certain portions of a skill while learning the other portions of the skill from the user via interactive learning. Additionally or alternatively, the robot can interact with a user during learning by exploration process, thereby using user input to adapt its behavior to execute a skill. In some embodiments, the robot can learn skills via Learning from Cache generation process, in which, the robot can prompt a user to teach the robot one or more pose for executing a skill and/or to teach the robot various markers in an environment. The robot can then generate and save cached plans based on these teachings to execute one or more skills.

Robotic learning can take place at a factory prior to robot deployment, or onsite (e.g., at a hospital) after robot deployment. In some embodiments, a robot can be taught a skill and/or adapted to operate in an environment by users who are not trained in robotics and/or programming. For example, the robot can have a learning algorithm that leverages natural human behavior, and can include tools that can guide a user through the demonstration process.

In some embodiments, a robot can be designed to interact with humans and collaborate with humans to perform tasks. In some embodiments, a robot can use common social behavior to act in a socially predictable and acceptable manner around humans. Robots that are mobile can also be designed to navigate within an environment while interacting with humans in that environment. For example, a robot can be programmed to voice certain phrases to navigate around humans, to move aside to allow humans to pass, and to use eye gaze to communicate intentionality during navigation. In some embodiments, a robot can have sensors that enable it to perceive and track humans in the environment around it, and to use that information to trigger eye gaze and other social behaviors.

In some embodiments, a robot can be designed to propose options for achieving a goal or performing an action during one or more learning processes disclosed above. For example, a robot can propose a few different options for achieving a goal (e.g., picking up an object, opening a door, navigating a doorway, etc.), and can indicate which of those options is most likely to be effective and/or efficient at achieving the goal. In some embodiments, a robot can adapt a skill based on inputs by a user, e.g., a user indicating relevant features to include in a skill model.

In some embodiments, a robotic device can be capable of learning and/or executing skills in an unstructured environment, e.g., a dynamic and/or human environment, where the robotic device does not have complete information of the environment beforehand. Unstructured environments can include, for example, indoor and outdoor settings, and can include one or more humans or other objects that are movable within the environment. Since most natural or real-world environments are unstructured, robotic devices that can adapt and operate in an unstructured environment, such as robotic devices and/or systems described herein, can offer significant improvements over existing robotic devices that are incapable of adapting to an unstructured environment. Unstructured environments can include indoor settings (e.g., buildings, offices, houses, rooms, etc.) and/or other types of enclosed spaces (e.g., airplanes, trains, and/or other types of movable compartments), as well as outdoor settings (e.g., parks, beaches, outside yards, fields). In an embodiment, robotic devices described herein can operate in an unstructured hospital environment.

FIG. 1 is a high-level block diagram that illustrates a system 100, according to some embodiments. System 100 can be configured to learn and execute skills, such as, for example, manipulation skills in an unstructured environment. System 100 can be implemented as a single device, or be implemented across multiple devices that are connected to a network 105. For example, as depicted in FIG. 1, system 100 can include one or more compute devices, such as, for example, one or more robotic devices 102 and 110, a server 120, and additional compute device(s) 150. While four devices are shown, it should be understood that system 100 can include any number of compute devices, including compute devices not specifically shown in FIG. 1.

Network 105 can be any type of network (e.g., a local area network (LAN), a wide area network (WAN), a virtual network, a telecommunications network) implemented as a wired network and/or wireless network and used to operatively couple compute devices, including robotic devices 102 and 110, server 120, and compute device(s) 150. As described in further detail herein, in some embodiments, for example, the compute devices are computers connected to each other via an Internet Service Provider (ISP) and the Internet (e.g., network 105). In some embodiments, a connection can be defined, via network 105, between any two compute devices. As shown in FIG. 1, for example, a connection can be defined between robotic device 102 and any one of robotic device 110, server 120, or additional compute device(s) 150. In some embodiments, the compute devices can communicate with each other (e.g., send data to and/or receive data from) and with the network 105 via intermediate networks and/or alternate networks (not shown in FIG. 1). Such intermediate networks and/or alternate networks can be of a same type and/or a different type of network as network 105. Each compute device can be any type of device configured to send data over the network 105 to send and/or receive data from one or more of the other compute devices.

Figure 2:
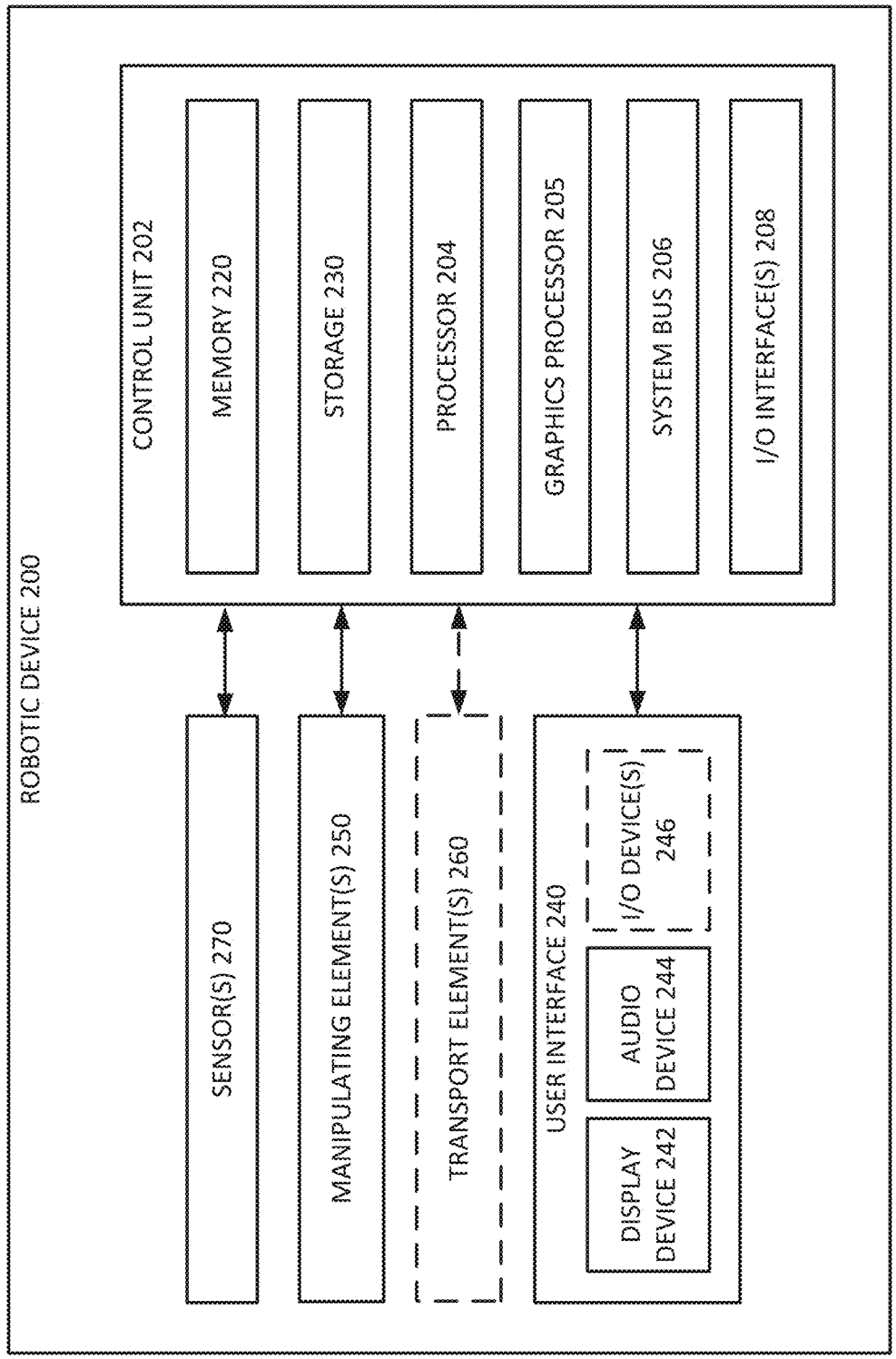
FIG. 2 is a block diagram illustrating a configuration of a robotic device, according to some embodiments.

In some embodiments, system 100 includes a single robotic device, e.g., robotic device 102. Robotic device 102 can be configured to perceive information about an environment, learn skills via human demonstration and interactions, explorations, etc. Robotic device 102 can be configured to interact with the environment and/or learn environmental constraints via human demonstrations and inputs, exploration, and/or execute those skills in the environment. In some embodiments, robotic device 102 can engage in self-exploration and/or request user input to learn additional information with respect to a skill and/or environment. A more detailed view of an example robotic device is depicted in FIG. 2.

In other embodiments, system 100 includes multiple robotic devices, e.g., robotic devices 102 and 110. Robotic device 102 can send and/or receive data to and/or from robotic device 110 via network 105. For example, robotic device 102 can send information that it perceives about an environment (e.g., a location of an object) to robotic device 110, and can receive information about the environment from robotic device 110. Robotic devices 102 and 110 can also send and/or receive information to and/or from one another to learn and/or execute a skill. For example, robotic device 102 can learn a skill in an environment and send a model representing that learned skill to robotic device 110, and robotic device 110, upon receiving that model, can use it to execute the skill in the same or a different environment. Robotic device 102 can be in a location that is the same as or different from robotic device 110. For example, robotic devices 102 and 110 can be located in the same room of a building (e.g., a hospital building) such that they can learn and/or execute a skill together (e.g., moving a heavy or large object). Alternatively, robotic device 102 can be located on a first floor of a building (e.g., a hospital building), and robotic device 110 can be located on a second floor of a building, and the two can communicate with one another to relay information about the different floors to one another (e.g., where objects are located on those floors, where a resource may be, etc.).

In some embodiments, system 100 includes one or more robotic devices, e.g., robotic device 102 and/or 110, and a server 120. Server 120 can be a dedicated server that manages robotic device 102 and/or 110. Server 120 can be in a location that is the same as or different from robotic device 102 and/or 110. For example, server 120 can be located in the same building as one or more robotic devices (e.g., a hospital building), and be managed by a local administrator (e.g., a hospital administrator). Alternatively, server 120 can be located at a remote location (e.g., a location associated with a manufacturer or provider of the robotic device).

In some embodiments, system 100 includes one or more robotic devices, e.g., robotic device 102 and/or 110, and an additional compute device 150. Compute device 150 can be any suitable processing device configured to run and/or execute certain functions. In a hospital setting, for example, a compute device 150 can be a diagnostic and/or treatment device that is capable of connecting to network 105 and communicating with other compute devices, including robotic device 102 and/or 110.

In some embodiments, one or more robotic devices, e.g., robotic device 102 and/or 110, can be configured to communicate via network 105 with a server 120 and/or compute device 150. Server 120 can include component(s) that are remotely situated from the robotic devices and/or located on premises near the robotic devices. Compute device 150 can include component(s) that are remotely situated from the robotic devices, located on premises near the robotic devices, and/or integrated into a robotic device. Server 120 and/or compute device 150 can include a user interface that enables a user (e.g., a nearby user or a robot supervisor), to control the operation of the robotic devices. For example, the user can interrupt and/or modify the execution of one or more actions performed by the robotic devices. These actions can include, for example, navigation behaviors, manipulation behaviors, head behaviors, sounds/lights, and/or other components of a robotic device. In some embodiments, a robot supervisor can remotely monitor the robotic devices and control their operation for safety reasons. For example, the robot supervisor can command a robotic device to stop or modify an execution of an action to avoid endangering a human or causing damage to the robotic device or another object in an environment. In some embodiments, a nearby user can guide or demonstrate to a robotic device an action. In some embodiments, a robotic device can be configured to solicit user intervention at specific points during its execution of an action. For example, the robotic device can solicit user intervention at points when the robotic device cannot confirm certain information about itself and/or environment around itself, when the robotic device cannot determine a trajectory for completing an action or navigating to a specific location, when the robotic device has been programmed in advance to solicit user input (e.g., during learning using an interactive learning template, as further described below), etc. In some embodiments, a robotic device can request feedback from a user at specific points during learning and/or execution. For example, the robotic device can prompt a user to specify what information it should collect (e.g., information associated with a manipulation element or a transport element, information associated with the surrounding environment) and/or when to collect information (e.g., the timing of keyframes during a demonstration). Alternatively or additionally, the robotic device can request that a user tag the robotic device's past or current behavior in a specific context as a positive or negative example of an action. The robotic device can be configured to use this information to improve future execution of the action in the specific context.

Systems and Devices

FIG. 2 schematically illustrates a robotic device 200, according to some embodiments. Robotic device 200 includes a control unit 202, a user interface 240, at least one manipulating element 250, and at least one sensor 270. Additionally, in some embodiments, robotic device 200 optionally includes at least one transport element 260.

Control unit 202 includes a memory 220, a storage 230, a processor 204, a graphics processor 205, a system bus 206, and at least one input/output interface ("I/O interface") 208. Memory 220 can be, for example, a random access memory (RAM), a memory buffer, a hard drive, a database, an erasable programmable read-only memory (EPROM), an electrically erasable read-only memory (EEPROM), a read-only memory (ROM), and/or so forth. In some embodiments, memory 220 stores instructions that cause processor 204 to execute modules, processes, and/or functions associated with sensing or scanning an environment, learning a skill, and/or executing a skill. Storage 230 can be, for example, a hard drive, a database, a cloud storage, a network-attached storage device, or other data storage device. In some embodiments, storage 230 can store, for example, sensor data including state information regarding one or more components of robotic device 200 (e.g., manipulating element 250), learned models, marker location information, etc.

Processor 204 of control unit 202 can be any suitable processing device configured to run and/or execute functions associated with viewing an environment, learning a skill, and/or executing a skill. For example, processor 204 can be configured to generate a model for a skill based on sensor information, or execute a skill by generating, using a model, a trajectory for performing a skill, as further described herein. More specifically, processor 204 can be configured to execute modules, functions, and/or processes. In some embodiments, processor 204 can be a general purpose processor, a Field Programmable Gate Array (FPGA), an Application Specific Integrated Circuit (ASIC), a Digital Signal Processor (DSP), and/or the like.

Graphics processor 205 can be any suitable processing device configured to run and/or execute one or more display functions, e.g., functions associated with display device 242. In some embodiments, graphics processor 205 can be a low-powered graphics processing unit such as, for example, a dedicated graphics card or an integrated graphics processing unit.

System bus 206 can be any suitable component that enables processor 204, memory 220, storage 230, and/or other components of control unit 202 to communicate with each other. I/O interface(s) 208, connected to system bus 206, can be any suitable component that enables communication between internal components of control unit 202 (e.g., processor 204, memory 220, storage 230) and external input/output devices, such as user interface 240, manipulating element(s) 250, transport element(s) 260, and sensor(s) 270.

User interface 240 can include one or more components that are configured to receive inputs and send outputs to other devices and/or a user operating a device, e.g., a user operating robotic device 200. For example, user interface 240 can include a display device 242 (e.g., a display, a touch screen, etc.), an audio device 244 (e.g., a microphone, a speaker), and optionally one or more additional input/output device(s) ("I/O device(s)") 246 configured for receiving an input and/or generating an output to a user.

Figure 4:
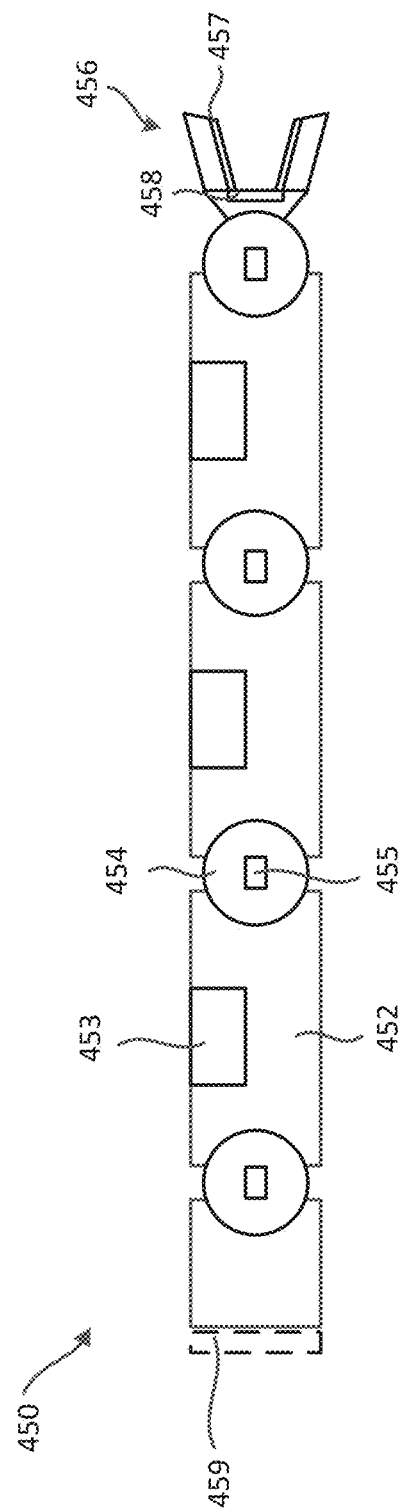
FIG. 4 is a schematic illustration of a manipulating element of a robotic device, according to some embodiments.

Manipulating element(s) 250 can be any suitable component that is capable of manipulating and/or interacting with a stationary and/or moving object, including, for example, a human. In some embodiments, manipulating element(s) 250 can include a plurality of segments that are coupled to one another via joints that can provide for translation along and/or rotation about one or more axes. Manipulating element(s) 250 can optionally include an end effector that can engage with and/or otherwise interact with objects in an environment. For example, manipulating element can include a gripping mechanism that can releasably engage (e.g., grip) objects in the environment to pick up and/or transport the objects. Other examples of end effectors include, for example, vacuum engaging mechanism(s), magnetic engaging mechanism(s), suction mechanism(s), and/or combinations thereof. In some embodiments, one or more manipulating element(s) 250 can be retractable into a housing of the robotic device 200 when not in use to reduce one or more dimensions of the robotic device. In some embodiments, manipulating element(s) 250 can include a head or other humanoid component configured to interact with an environment and/or one or more objects within the environment, including humans. In some embodiments, manipulating element(s) 250 can include a transport element or base (e.g., transport element(s) 260). A detailed view of an example manipulating element is depicted in FIG. 4.

Transport element(s) 260 can be any suitable components configured for movement such as, for example, a wheel or a track. One or more transport element(s) 260 can be provided on a base portion of robotic device 200 to enable robotic device 200 to move around an environment. For example, robotic device 200 can include a plurality of wheels that enable it to navigate around a building, such as, for example, a hospital. Transport element(s) 260 can be designed and/or dimensioned to facilitate movement through tight and/or constrained spaces (e.g., small hallways and corridors, small rooms such as supply closets, etc.). In some embodiments, transport element(s) 260 can be rotatable about an axis and/or movable relative to one another (e.g., along a track). In some embodiments, one or more transport element(s) 260 can be retractable into a base of the robotic device 200 when not in use to reduce one or more dimensions of the robotic device. In some embodiments, transport element(s) 260 can be or form part of a manipulating element (e.g., manipulating element(s) 250).

Sensor(s) 270 can be any suitable component that enables robotic device 200 to capture information about the environment and/or objects in the environment around robotic device 200. Sensor(s) 270 can include, for example, image capture devices (e.g., cameras, such as a red-green-blue-depth (RGB-D) camera or a webcam), audio devices (e.g., microphones), light sensors (e.g., light detection and ranging or lidar sensors, color detection sensors), proprioceptive sensors, position sensors, tactile sensors, force or torque sensors, temperature sensors, pressure sensors, motion sensors, sound detectors, etc. For example, sensor(s) 270 can include at least one image capture device such as a camera for capturing visual information about objects and the environment around robotic device 200. In some embodiments, sensor(s) 270 can include haptic sensors, e.g., sensors that can convey forces, vibrations, touch, and other non-visual information to robotic device 200.

In some embodiments, robotic device 200 can be have humanoid features, e.g., a head, a body, arms, legs, and/or a base. For example, robotic device 200 can include a face with eyes, a nose, a mouth, and other humanoid features. These humanoid feature can form and/or be part of one or more manipulating element(s). While not schematically depicted, robotic device 200 can also include actuators, motors, couplers, connectors, power sources (e.g., an onboard battery), and/or other components that link, actuate, and/or drive different portions of robotic device 200.

Figure 3:
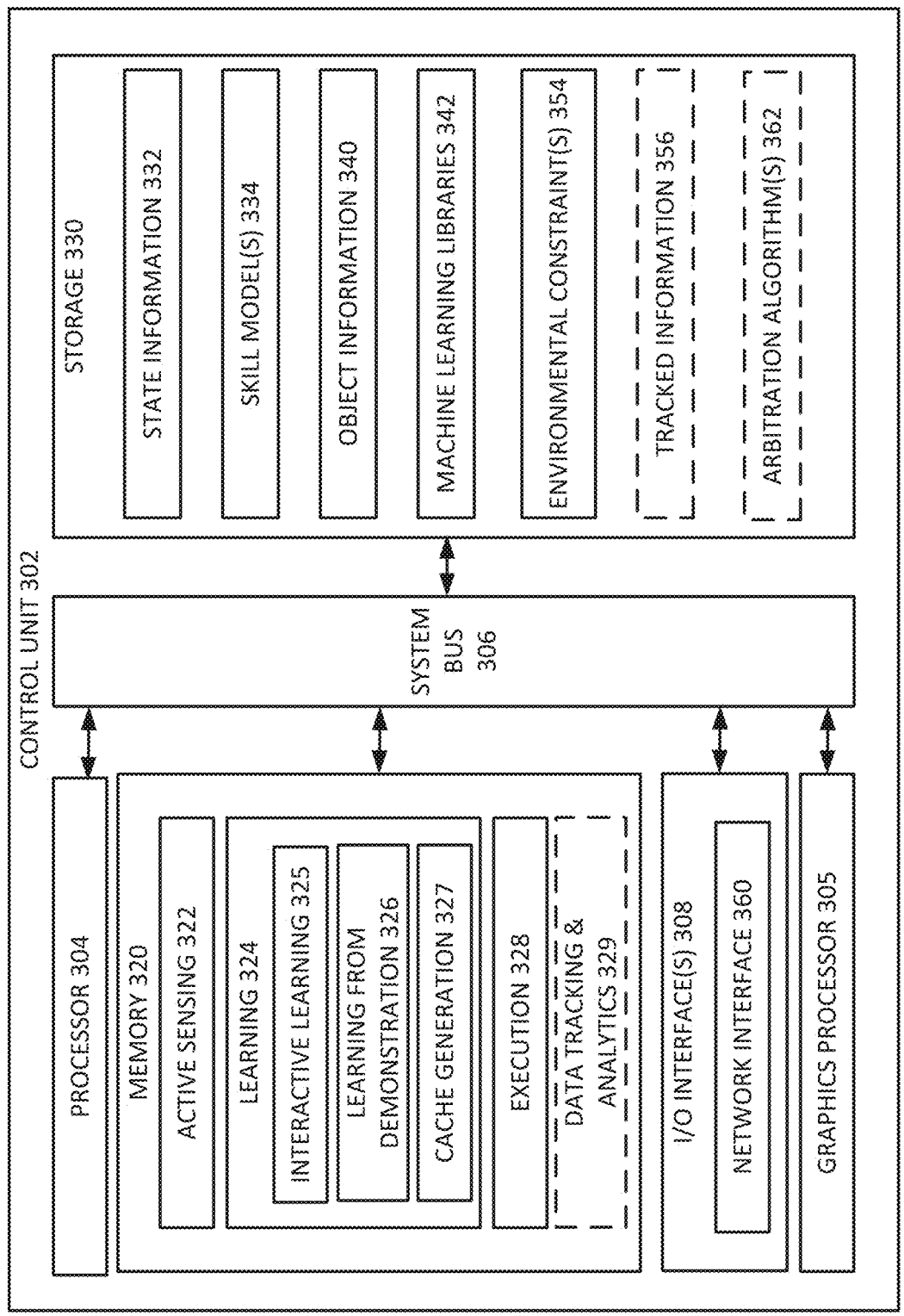
FIG. 3 is a block diagram illustrating a configuration of a control unit associated with a robotic device, according to some embodiments.

FIG. 3 is a block diagram that schematically illustrates a control unit 302, according to some embodiments. Control unit 302 can include similar components as control unit 202, and can be structurally and/or functionally similar to control unit 202. For example, control unit 302 includes a processor 304, a graphics processor 305, a memory 320, I/O interface(s) 308, a system bus 306, and a storage 330, which can be structurally and/or functionally similar to processor 204, memory 220, I/O interface(s) 208, system bus 206, and storage 230, respectively. Control unit 302 can be located on a robotic device and/or at a remote server that is connected to one or more robotic devices.

Memory 320 stores instructions that can cause processor 304 to execute modules, processes, and/or functions, illustrated as active sensing 322, learning 324, execution 328, and optionally data tracking and analytics 329. Active sensing 322, learning 324, execution 328, and data tracking and analytics 329 can be implemented as one or more programs and/or applications that are tied to hardware components (e.g., a sensor, a manipulating element, an I/O device, a processor, etc.). Active sensing 322, learning 324, execution 328, and data tracking and analytics 329 can be implemented by one robotic device or multiple robotic devices. For example, a robotic device can be configured to implement active sensing 322, learning 324, execution 328, and data tracking and analytics 329. As another example, a robotic device can be configured to implement active sensing 322, learning 324, and optionally execution 328. As another example, a robotic device can be configured to implement active sensing 322, learning 324, execution 328, and optionally data tracking and analytics 329. While not depicted, memory 320 can also store programs and/or applications associated with an operating system, and general robotic operations (e.g., power management, memory allocation, etc.).

In some embodiments, active sensing 322 can include active sensing or scanning of an environment, as described herein. In some embodiments, active sensing 322 can include active scanning of an environment and/or sensing or perceiving information associated with the environment, object(s) within the environment (e.g., including humans within the environment), and/or one or more conditions associated with a robotic device or system.

Learning 324 can include modules, processes, and/or functions, that when implemented cause the robotic device to learn actions or skills. In some embodiments, skill model(s) 334 can be generated and/or updated based on learning 324. Execution 328 can cause the skill model(s) 334 to be implemented, thereby causing the robotic device to perform actions or skills. For example, learning from demonstration 326 can be configured to enable humans to demonstrate an action or a skill. Interactive learning 325 can be configured to receive inputs from a user that enable learning an action and/or updating a skill. Cache generation 327 can be configured to prompt a user to teach one or more pose that enable execution of a skill.

In some embodiments, execution 328 can be configured to cause the robotic device to execute an action and/or a skill learned from interactive learning 325, learning from demonstration 326, and/or cache generation 327. In some embodiments, execution 328 can include implementing one or more skill model(s) 334 to perform the action and/or the skill. Execution 328 can include modules, processes, and/or functions to determine joint configurations for the manipulating element (e.g., manipulating element 250) of the robotic device. In some embodiments, execution 328 can include modules, processes, and/or functions to implement one or more trajectories for the robotic device based on the learning 324.

In some embodiments, control unit 302 can also optionally include a data tracking & analytics element 329. Data tracking & analytics element 329 can be, for example, a computing element (e.g., a processor) configured to perform data tracking and/or analytics of the information collected by one or more robotic devices, e.g., information contained within state information 332 as further described below. For example, data tracking & analytics element 329 can be configured to manage inventory, e.g., tracking expiration dates, monitoring and recording the use of inventory items, ordering new inventory items, analyzing and recommending new inventory items, etc. In a hospital setting, data tracking & analytics element 329 can manage the use and/or maintenance of medical supplies and/or equipment. In some embodiments, data tracking & analytics element 329 can generate aggregate data displays (e.g., reports, charts, etc.), which can be used to comply with formal laws, regulations, and/or standards. In some embodiments, data tracking & analytics element 329 can be configured to analyze information associated with humans, such as patients within a hospital. For example, a robotic device can be configured to collect information on patient(s) within a hospital and to pass that information to data tracking & analytics element 329 to analyze and/or summarize for use in various functions, including, for example, diagnostic tests and/or screening. In some embodiments, data tracking & analytics element 329 can be configured to access and/or obtain information from third-party systems (e.g., hospital electronic medical records, security system data, insurance data, vendor data, etc.), and use and/or analyze that data, with or without data collected by one or more robotic devices, to perform data tracking and/or analytics functions.

Storage 330 stores information relating to an environment and/or objects within the environment, and learning and/or execution of skills (e.g., tasks and/or social behaviors). Storage 330 stores, for example, state information 332, skill model(s) 334, object information 340, machine learning libraries 342, and/or environmental constraints 354. Optionally, storage 330 can also store tracked information 356 and/or arbitration algorithm(s) 362.

State information 332 can include information regarding a state of a robotic device (e.g., robotic device 200) and/or an environment in which the robotic device is operating (e.g., a building, such as, for example, a hospital). In some embodiments, state information 332 can indicate a location of the robotic device within the environment, such as, for example, a room, a floor, an enclosed space, etc. For example, state information 332 can include a map of the environment, and indicate a location of the robotic device within that map. State information 332 can also include the location(s) of one or more objects (or markers representing and/or associated with objects) within the environment, e.g., within a map. Thus, state information 332 can identify a location of a robotic device relative to one or more objects. Objects can include any type of physical object that is located within the environment, including objects that define a space or an opening (e.g., surfaces or walls that define a doorway). Objects can be stationary or mobile. Examples of objects in an environment, such as, for example, a hospital, include equipment, supplies, instruments, tools, furniture, and/or humans (e.g., nurses, doctors, patients, etc.).

Figure 6:
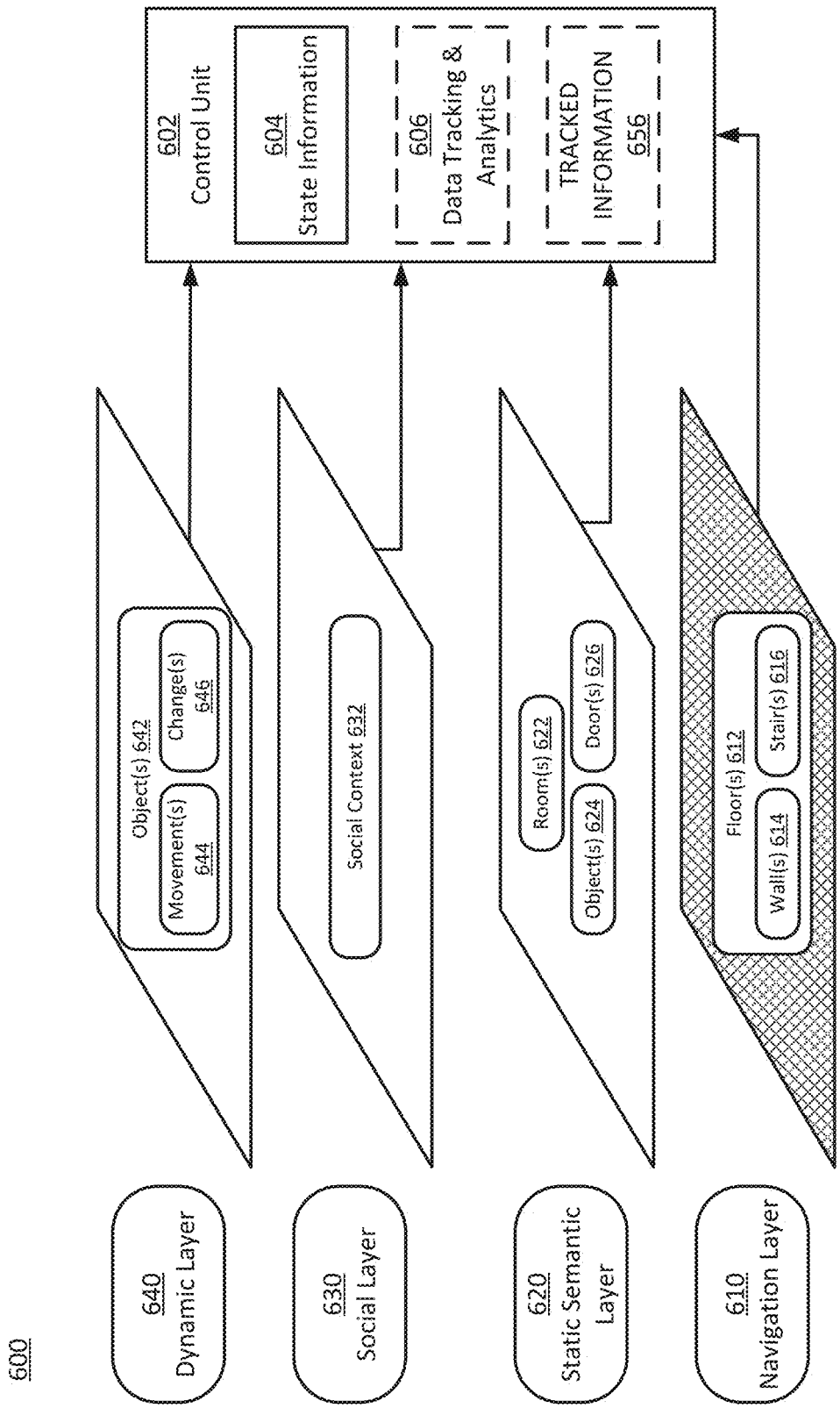
FIG. 6 is a schematic illustration of layers of a map of an environment generated by a robotic device, according to some embodiments.

In some embodiments, state information 332 can include a representation or map of the environment along with static and/or dynamic information regarding objects (e.g., supplies, equipment, etc.) within the environment and social context information associated with humans and/or social settings within the environment, such as depicted in FIG. 6. The map (e.g., map 600 in FIG. 6) of the environment can include, for example, a navigation layer 610, a static semantic layer 620, a social layer 630, and a dynamic layer 640. Navigation layer 610 provides a general layout or map of the building, which may identify a number of floor(s) 612 with wall(s) 614, stair(s) 616, and other elements built into the building (e.g., hallways, openings, boundaries). Static semantic layer 620 identifies objects and/or spaces within the building, such as room(s) 622, object(s) 624, door(s) 626, etc. Static semantic layer 620 can identify which room(s) 622 or other spaces are accessible or not accessible to a robotic device. In some embodiments, static semantic layer 620 can provide a three dimensional map of the objects located within a building. Social layer 630 provides social context information 632. Social context information 632 includes information associated with humans within the building, such as past interactions between robotic device(s) and human(s). Social context information 632 can be used to track interactions between robotic device(s) and human(s), which can be used to generate and/or adapt existing models of skills involving one or more interactions between a robotic device and a human. For example, social context information 632 can indicate that a human is typically located at a particular location, such that a robotic device having knowledge of that information can adapt its execution of a skill that would require the robotic device to move near the location of the human. Dynamic layer 640 provides information on object(s) and other elements within a building that may move and/or change over time. For example, dynamic layer 640 can track movement(s) 644 and/or change(s) 646 associated with object(s) 642. In an embodiment, dynamic layer 640 can monitor the expiration date of an object 642 and identify when that object 642 has expired.

Map and/or representation 600 can be accessible to and/or managed by a control unit 602 (e.g., structurally and/or functionally similar to control unit 302), e.g., of a robotic device. Control unit 602 can include similar components as other control units described herein (e.g., control units 202 and/or 302). Control unit 602 can include a storage (similar to other storage elements described herein, such as, for example, storage 330) that stores state information 604, including map and/or representation 600 as well as information associated with one or more robotic devices (e.g., a configuration of an element of a robotic device, a location of the robotic device in a building, etc.). Control unit 602 can be located on a robotic device and/or at a remote server that is connected to one or more robotic devices. Robotic device(s) can be configured to update and maintain state information 604, including information associated with representation 600 of the environment, as the robotic device(s) collect information on their surrounding environment.

Information learned by a robotic device, e.g., from interactive learning 325, learning from demonstration 326, and/or cache generation 327 can feed into the different layers of the map 600 and be organized for future reference by the robotic device (and/or other robotic devices). For example, a robotic device may rely on information learned about different objects within an environment (e.g., a door) to decide how to arbitrate between different behaviors (e.g., waiting for a door to a tight doorway to be opened before going through the doorway, seeking assistance to open a door before going through a tight doorway), as further described herein.

Referring back to FIG. 3, object information 340 can include information relating to physical object(s) in an environment. For example, object information 340 can include information identifying or quantifying different features of an object, such as, for example, location, color, shape, and surface features. Object information 340 can also identify codes, symbols, and other markers that are associated with a physical object, e.g., Quick Response or "QR" codes, barcodes, tags, etc. In some embodiments, object information 340 can include information characterizing an object within the environment, e.g., a doorway or hallway as being tight, a door handle as being a type of door handle, etc. Object information 340 can enable control unit 302 to identify physical object(s) in the environment.

Skill model(s) 334 are models that have been generated for performing different actions, and represent skills that have been learned (e.g., by implementing learning 324) by a robotic device. In some embodiments, skill model(s) 334 are models that can be used to learn and/or execute various actions or skills, including tasks and/or behaviors. For example, model(s) 334 can include information associated with object(s) that are involved in the execution of a skill (e.g., an object that is manipulated by the robotic device, an object that a robotic device interacts with during execution of a skill, an object that a robotic device takes into account while executing a skill). In some embodiments, each model 334 is associated with a set of markers that are tied to different physical objects in an environment. Marker information can indicate which markers are associated with a particular model 334. Each model 334 can also be associated with sensory information that is collected, e.g., via one or more sensors of a robotic device, during kinesthetic teaching and/or other demonstrations of a skill. Sensory information can optionally include manipulating element information associated with a manipulating element of a robotic device as it performs an action during a demonstration. Manipulating element information can include, for example, joint positions and configurations, end effector positions and configurations, base or transport element positions and configurations, and/or forces and torques acting on joints, end effectors, transport elements, etc. Manipulating element information can be recorded at specific points during a demonstration and/or execution of a skill (e.g., keyframes), or alternatively, throughout a demonstration and/or execution of a skill. Sensory information can also include information associated with an environment in which a skill is demonstrated and/or executed, e.g., location of markers in the environment. In some embodiments, each model 334 can be associated with success criteria. Success criteria can be used to monitor the execution of a skill. In some embodiments, success criteria can include information associated with visual and haptic data that are perceived using one or more sensors, e.g., cameras, force/torque sensors, etc. Success criteria can be, for example, tied to visually detecting movement of an object, sensing a force that is acting on a component of the robotic device (e.g., a weight from an object), sensing an engagement between a component of the robotic device and an object (e.g., a change in pressure or force acting on a surface), etc. Examples of using haptic data in robotic learning of manipulation skills is described in the article entitled "Learning Haptic Affordances from Demonstration and Human-Guided Exploration," authored by Chu et. al., published in 2016 IEEE Haptics Symposium (HAPTICS), Philadelphia, PA, 2016, pp. 119-125, accessible at http://ieeexplore.ieee.org/document/7463165/, incorporated herein by reference. Examples of using visual data in robotic learning of manipulating skills is described in the article entitled "Simultaneously Learning Actions and Goals from Demonstration," authored by Akgun et al., published in Autonomous Robots, Volume 40, Issue 2, February 2016, pp. 211-227, accessible at http s://doi.org/10.1007/s10514-015-9448-x ("Akgun article"), incorporated herein by reference.

Optionally, sensory information can include transport element information. Transport element information can be associated with movements of a transport element (e.g., transport element(s) 260) of a robotic device as the robotic device undergoes a demonstration of a skill (e.g., navigation through a doorway, transport of an object, etc.). Transport element information can be recorded at specific points during a demonstration and/or execution of a skill, such as at keyframes associated with the skill, or alternatively, through a demonstration and/or execution of a skill.

Machine learning libraries 342 can include modules, processes, and/or functions relating to different algorithms for machine learning and/or model generation of different skills. In some embodiments, machine learning libraries can include methods such as Hidden Markov Models or "HMMs." An example of an existing machine learning library in Python is scikit-learn. Storage 330 can also include additional software libraries relating to, for example, robotics simulation, motion planning and control, kinematics teaching and perception, etc.

Environmental constraints 354 include information associated with objects and/or conditions within an environment that may restrict the operation of a robotic device within the environment. For example, environmental constraints 354 can include information associated with the size, configuration, and/or location of objects within an environment (e.g., supply bin, room, doorway, etc.), and/or information that indicates that certain areas (e.g., a room, a hallway, etc.) have restricted access. Environmental constraints 354 may affect the learning and/or execution of one or more actions within an environment. As such, an environmental constraint 354 may become part of each model for a skill that is executed within a context including the environmental constraint.

In some embodiments, an initial set of environmental constraints 354 (e.g., state information 331, object information 340, etc.) and/or skills (e.g., model(s) 334) can be provided to a robotic device, e.g., via a remote administrator or supervisor. The robotic device can adapt and/or add to its knowledge of environmental constraints 354 and/or skills 334 based on its own interactions, demonstrations, etc. with an environment or humans within the environment (e.g., patients, nurses, doctors, etc.) and/or via additional user input. Alternatively or additionally, a robot supervisor can update the robotic device's knowledge of environmental constraints 354 and/or skills 334 based on new information collected by the robotic device or other robotic device(s) (e.g., other robotic device(s) within similar or the same environment, e.g., a hospital) and/or provided to the robotic supervisor by external parties (e.g., suppliers, administrators, manufacturers, etc.). Such updates can be periodically and/or continuously provided, as new information about an environment or skill is provided to the robotic device and/or robot supervisor.

Tracked information 356 includes information associated with a representation of an environment (e.g., map and/or representation 600) and/or information that is obtained from third-party systems (e.g., hospital electronic medical records, security system data, insurance data, vendor data, etc.) that is tracked and/or analyzed, e.g., by a data tracking & analytics element, such as data tracking & analytics element 329 or processor 302 executing data tracking & analytics 329. Examples of tracked information 356 include inventory data, supply chain data, point-of-use data, and/or patient data, as well as any aggregate data compiled from such data.

Arbitration algorithm(s) 362 include algorithms for arbitrating or selecting between different actions to execute (e.g., how to use different resources or components of a robotic device). Arbitration algorithm(s) 362 can be rules and, in some embodiments, can be learned, as further described with reference to FIG. 19. These algorithms can be used by a robotic device to select between different actions when the robotic device has multiple resources and/or objectives to manage. For example, a robotic device operating in an unstructured and/or dynamic environment, e.g., an environment including humans, may be exposed to a number of conditions at any point in time that may demand different behaviors or actions from the robotic device. In such instances, the robotic device can be configured to select between the different actions based on one or more arbitration algorithms 362, which may assign different priorities to the various actions based on predefined rules (e.g., affective states, environmental constraints, socially defined constraints, etc.). In an embodiment, an arbitration algorithm 362 can assign different scores or values to actions based on information collected by a robotic device about its surrounding environment, its current state, and/or other factors.

Similar to I/O interface(s) 208, I/O interface(s) 308 can be any suitable component(s) that enable communication between internal components of control unit 302 and external devices, such as a user interface, a manipulating element, a transport element, and/or compute device. I/O interface(s) 308 can include a network interface 360 that can connect control unit 302 to a network (e.g., network 105, as depicted in FIG. 1). Network interface 360 enables communications between control unit 302 (which can be located on a robotic device or another network device in communication with one or more robotic devices) and a remote device, such as a compute device that can be used by a robot supervisor to monitor and/or control one or more robotic devices. Network interface 360 can be configured to provide a wireless and/or wired connection to a network.

FIG. 4 schematically illustrates a manipulating element 450, according to some embodiments. Manipulating element 450 can form a part of a robotic device, such as, for example, robotic device 102 and/or 200. Manipulating element 450 can be implemented as an arm that includes two or more segments 452 coupled together via joints 454. Joints 454 can allow one or more degrees of freedom. For example, joints 454 can provide for translation along and/or rotation about one or more axes. In an embodiment, manipulating element 450 can have seven degrees of freedom provided by joints 454. While four segments 452 and four joints 454 are depicted in FIG. 4, one of ordinary skill in the art would understand that a manipulating element can include a different number of segments and/or joints.

Manipulating element 450 includes an end effector 456 that can be used to interact with objects in an environment. For example, end effector 456 can be used to engage with and/or manipulate different objects. Alternatively or additionally, end effector 456 can be used to interact with movable or dynamic objects, including, for example, humans. In some embodiments, end effector 456 can be a gripper that can releasably engage or grip one or more objects. For example, end effector 456 implemented as a gripper can pick up and move an object from a first location (e.g., a supply closet) to a second location (e.g., an office, a room, etc.).

A plurality of sensors 453, 455, 457, and 458 can be disposed on different components of manipulating element 450, e.g., segments 452, joints 454, and/or end effector 456. Sensors 453, 455, 457, and 458 can be configured to measure sensory information, including environmental information and/or manipulating element information. Examples of sensors include position encoders, torque and/or force sensors, touch and/or tactile sensors, image capture devices such as cameras, temperature sensors, pressure sensors, light sensors, etc. In some embodiments, sensor 453 disposed on a segment 452 can be a camera that is configured to capture visual information about an environment. In some embodiments, sensor 453 disposed on a segment 452 can be an accelerometer configured to enable measurement of an acceleration, and/or calculation of speed of movement, and/or a position, of segment 452. In some embodiments, sensor 455 disposed on a joint 454 can be a position encoder configured to measure a position and/or configuration of joint 454. In some embodiments, sensor 455 disposed on a joint 454 can be a force or torque sensor configured to measure a force or torque applied to joint 454. In some embodiments, sensor 458 disposed on end effector 456 can be a position encoder and/or a force or torque sensor. In some embodiments, sensor 457 disposed on end effector 456 can be a touch or tactile sensor configured to measure an engagement between end effector 456 and an object in the environment. Alternatively or additionally, one or more of sensors 453, 455, 457, and 458 can be configured to record information about one or more objects and/or markers in the environment. For example, sensor 458 disposed on end effector 456 can be configured to track a location of an object in the environment and/or a position of the object relative to end effector 456. In some embodiments, one or more of sensors 453, 455, 457, and 458 can also track whether an object, such as a human, has moved in the environment. Sensors 453, 455, 457, and 458 can send the sensory information that they record to a compute device located on a robotic device (e.g., an onboard control unit such as, for example, control unit 202 and/or 302), or sensors 453, 455, 457, and 458 can send the sensory information to a remote compute device (e.g., a server such as, for example, server 120).

Figure 5:
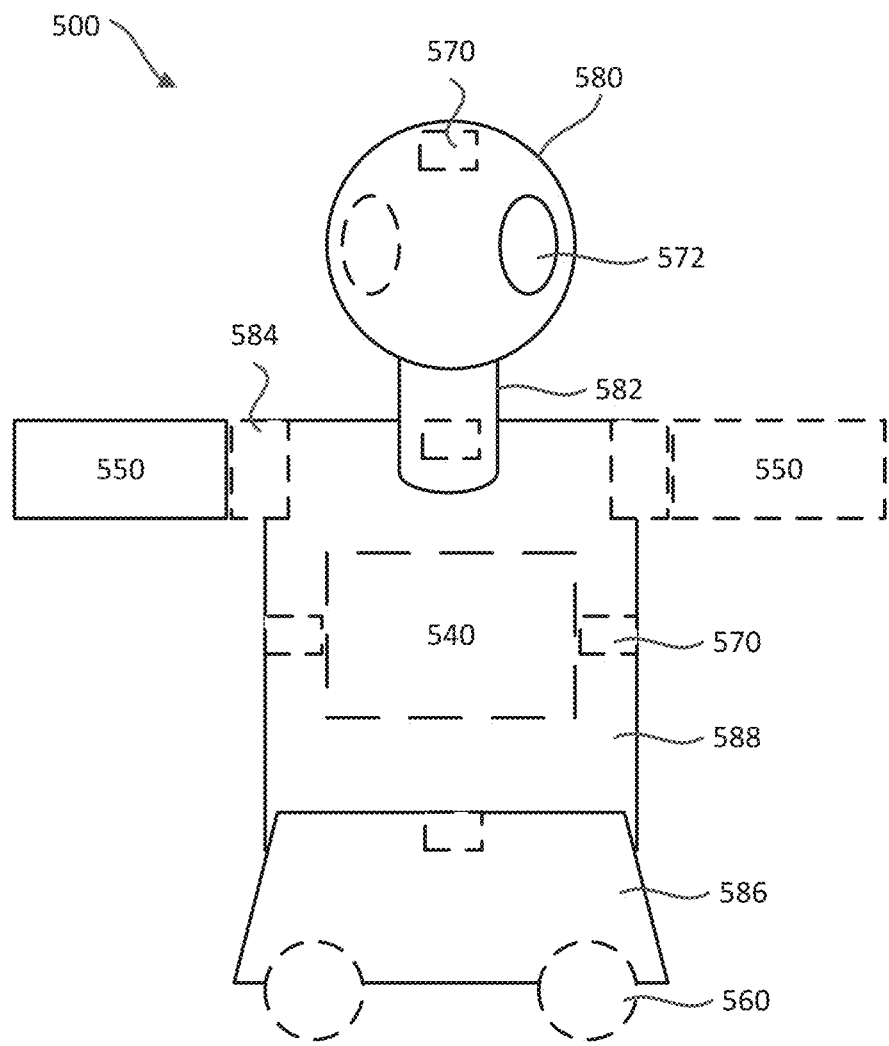
FIG. 5 is a schematic illustration of a robotic device, according to some embodiments.

Manipulating element 450 can optionally include a coupling element 459 that enables manipulating element 450 to be releasably coupled to a robotic device, such as any of the robotic devices described herein. In some embodiments, manipulating element 450 can be coupled to a fixed location of the robotic device and/or be capable of being coupled to multiple locations of the robotic device (e.g., a right side or a left side of a body of robotic device, as shown in FIG. 5). Coupling element 459 can include any type of mechanism that can couple manipulating element 350 to the robotic device, such as, for example, a mechanical mechanism (e.g., a fastener, a latch, a mount), a magnetic mechanism, a friction fit, etc.

FIG. 5 schematically illustrates a robotic device 500, according to some embodiments. Robotic device 500 includes a head 580, a body 588, and a base 586. Head 580 can be connected to body 588 via a segment 582 and one or more joints (not depicted). Segment 582 can be movable and/or flexible to enable head 580 to move relative to body 588. Head 580, segment 582, etc. can be examples of manipulating element(s), and include similar functionality and/or structure as other manipulating element(s) described herein.

Head 580 includes one or more image capture devices 572 and/or other sensors 570. Image capture device 572 and/or other sensors 570 (e.g., lidar sensors, motion sensors, etc.) can enable robotic device 500 to scan an environment and obtain a representation (e.g., a visual representation or other semantic representation) of the environment. In some embodiments, image capture device 572 can be a camera. In some embodiments, image capture device 572 can be movable such that it can be used to focus on different areas of the environment around robotic device 500. Image capture device 572 and/or other sensors 570 can collect and send sensory information to a compute device or processor onboard robotic device 500, such as, for example, control unit 202 or 302. In some embodiments, head 580 of robotic device 500 can have a humanoid shape, and include one or more human features, e.g., eyes, nose, mouth, ears, etc. In such embodiments, image capture device 572 and/or other sensors 570 can be implemented as one or more human features. For example, image capture device 572 can be implemented as eyes on head 580.

In some embodiments, robotic device 500 can use image capture device 572 and/or other sensors 570 to scan an environment for information about objects in the environment, e.g., physical structures, devices, articles, humans, etc. Robotic device 500 can engage in active sensing, or robotic device 500 can initiate sensing or scanning in response to a trigger (e.g., an input from a user, a detected event or change in the environment). In some embodiments, robotic device 500 can engage in adaptive sensing where sensing can be performed based on stored knowledge and/or a user input. For example, robotic device 500 can identify an area in the environment to scan for an object based on prior information that it has on the object.

In some embodiments, robotic device 500 can also know to sense or scan different areas of a scene more closely based on an input by a human. For example, a human can indicate to robotic device 500 that a certain area of a scene includes one or more objects of interest, and robotic device 500 can scan those areas more closely to identify those objects. In such embodiments, robotic device 500 can include an input/output device 540, such as a display with a keyboard or other input device, and/or a touchscreen, as schematically depicted in FIG. 1*n* some embodiments, robotic device 500 can scan an environment and identify that an object, such as, for example, a human, is moving in the environment. In some embodiments, robotic device 500 can engage in active sensing such that it can adjust its actions in near real-time.

As schematically depicted in FIG. 5, base 586 optionally can include one or more transport elements implemented as wheels 560. Wheels 560 can enable robotic device 500 to move around an environment, e.g., a hospital. Robotic device 500 also includes at least one manipulating element implemented as arms 550. Arms 550 can be structurally and/or functionally similar to other manipulating elements described herein, e.g., manipulating element 450. Arms 550 can be fixedly attached to body 588 of robotic device 500, or optionally, manipulating element 550 can be releasably coupled to body 588 via a coupling element (e.g. coupling element 459) that can attach to a coupling portion 584 of robotic device 500. Coupling portion 584 can be configured to engage with coupling element 459, and provide an electrical connection between arm 550 and an onboard compute device (e.g., control unit 202 or 302), such that the onboard compute device can power and/or control components of arm 550, and receive information collected by sensors disposed on manipulating element 550 (e.g., sensors 453, 455, 457, and 458).

Optionally, robotic device 500 can also include one or more additional sensor(s) 570 located on segment 582, body 588, base 586, and/or other parts of robotic device 500. Sensor(s) 570 can be, for example, image capture devices, force or torque sensors, motion sensors, light sensors, pressure sensors, and/or temperature sensors. Sensors 570 can enable robotic device 500 to capture visual and non-visual information about the environment.

Methods

FIGS. 7-10 are flow diagrams illustrating a method 700 that can be performed by a robotic system (e.g., robotic system 100) including one or more robotic devices, according to some embodiments. For example, all or a part of method 700 can be performed by one robotic device, such as any of the robotic devices described herein. Alternatively, all of method 700 can be performed sequentially by multiple robotic devices, each performing, in turn, a part of method 700. Alternatively, all or a part of method 700 can be performed concurrently by multiple robotic devices.

Figure 7:
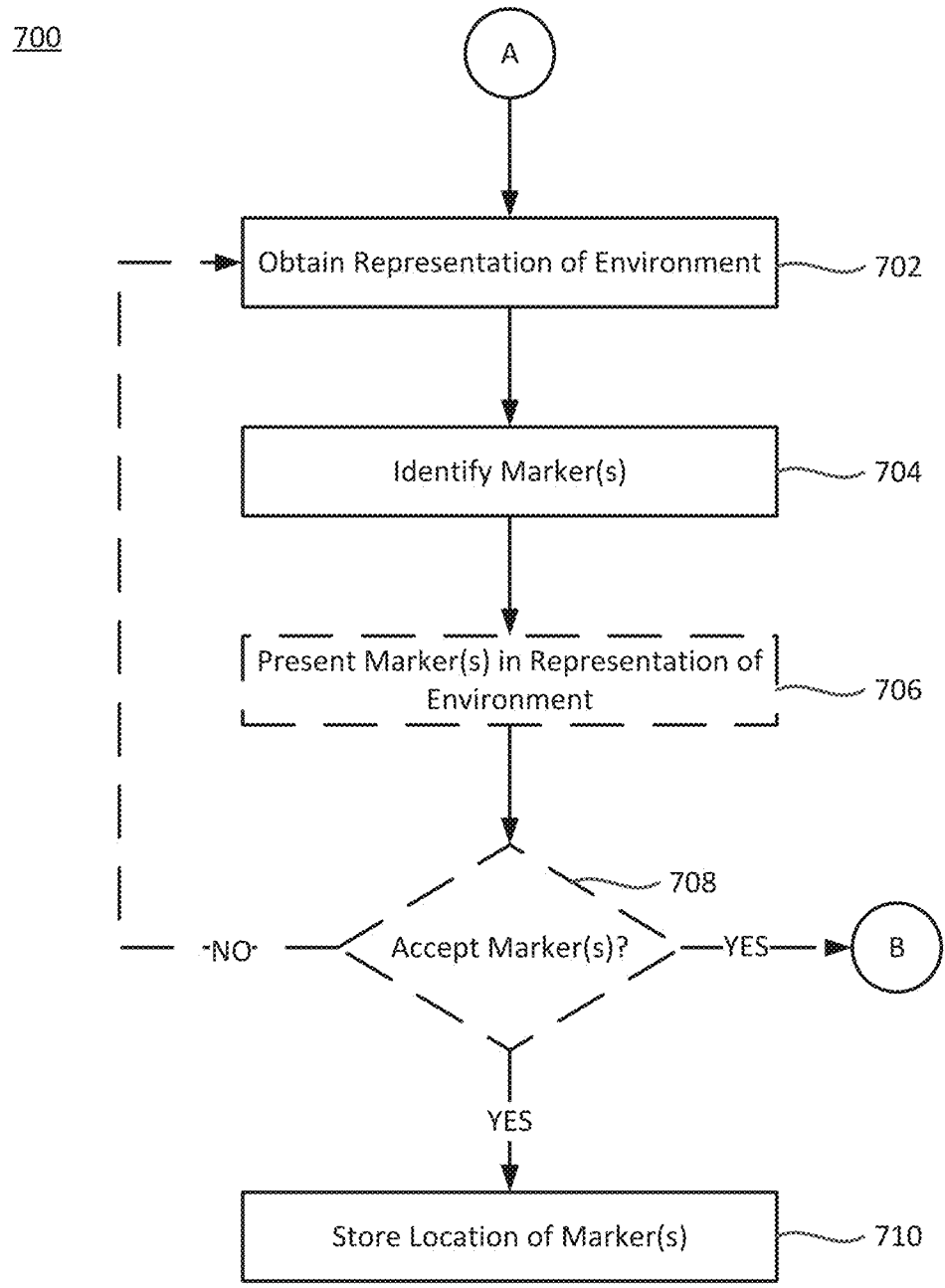
FIG. 7 is a flow diagram illustrating a method of sensing or scanning an environment performed by a robotic device, according to some embodiments.

As depicted in FIG. 7, a robotic device can scan an environment and obtain a representation of the environment, at 702. The robotic device can scan the environment using one or more sensors (e.g., sensor(s) 270 or 470, and/or image capture device(s) 472). In some embodiments, the robotic device can scan the environment using a movable camera, where the position and/or focus of the camera can be adjusted to capture areas in a scene of the environment. At 704, based on the information collected during the sensing, the robotic device can analyze the data to identify marker(s) in the captured representation of the environment. The markers can be associated with one or more objects in the scene that have been marked using visual or fiducial markers, e.g., a visible marker such as a QR code, a barcode, a tag, etc. Alternatively or additionally, the robotic device can identify markers associated with one or more objects in the environment via object recognition using object information (e.g., object information 340) that is stored in a memory on the robotic device (e.g., storage 330). Object information can include, for example, information indicating different features of an object, such as location, color, shape, and surface features. In an embodiment, object information can be organized as numerical values that represent different features of an object, which can be referred to as a feature space.

After identifying the marker(s), the robotic device can optionally present the marker(s) in a representation of the environment, at 706. In some embodiments, the representation of the environment can be a visual representation such as, for example, an augmented view of the environment. In such embodiments, the robotic device can display the visual representation of the environment, e.g., on a display screen, and display the locations of the marker(s) in the visual representation of the environment. Alternatively or additionally, the representation of the environment can be a semantic representation of the environment, with the locations of the marker(s), represented by semantic markers, in the environment.

In some embodiments, the robotic device can present the representation of the environment with the marker(s) to a user, and optionally prompt the user, e.g., via a user interface or other type of I/O device, to accept or reject the marker(s) in the representation of the environment, at 708. If the user does not accept the marker(s) (708: NO), then method 700 returns to 702, and the robotic device can rescan the environment to obtain a second representation of the environment. If the user accepts the marker(s) (708: YES), then method 700 proceeds to 708, where the robotic device can store information associated with the markers (e.g., location, features, etc.) in a memory (e.g., storage 330). For example, the robotic device can store the location of the marker(s) in an internal map of the environment (e.g., map 332).

In some embodiments, the robotic device can identify the marker(s) at 704 and proceed directly to store the location of the marker(s) and/or other information associated with the markers, at 710, without prompting a user to accept the marker(s). In such embodiments, the robotic device can analyze the location of the marker(s) prior to storing their location. For example, the robotic device can have previously stored information on the location of the marker(s) (e.g., that was acquired during a previous scan of the environment and/or inputted in the robotic device by a user or compute device), and can compare the location of the marker(s) to that previously stored information to check for accuracy and/or identify changes in marker locations. In particular, if the previously stored information indicates that a particular marker should be located in a location that is different from the location identified by the robotic device, then the robotic device may initiate an additional scan of the environment to verify the location of the marker before storing its location. Alternatively or additionally, the robotic device can send a notification to a user indicating that the location of a marker has changed. In such instances, the robotic device can store the new location of the marker but also store a message indicating that there has been a change in the marker location. A user or compute device can then, at a later point in time, review the message and reconcile the change in marker location.

Figure 8:
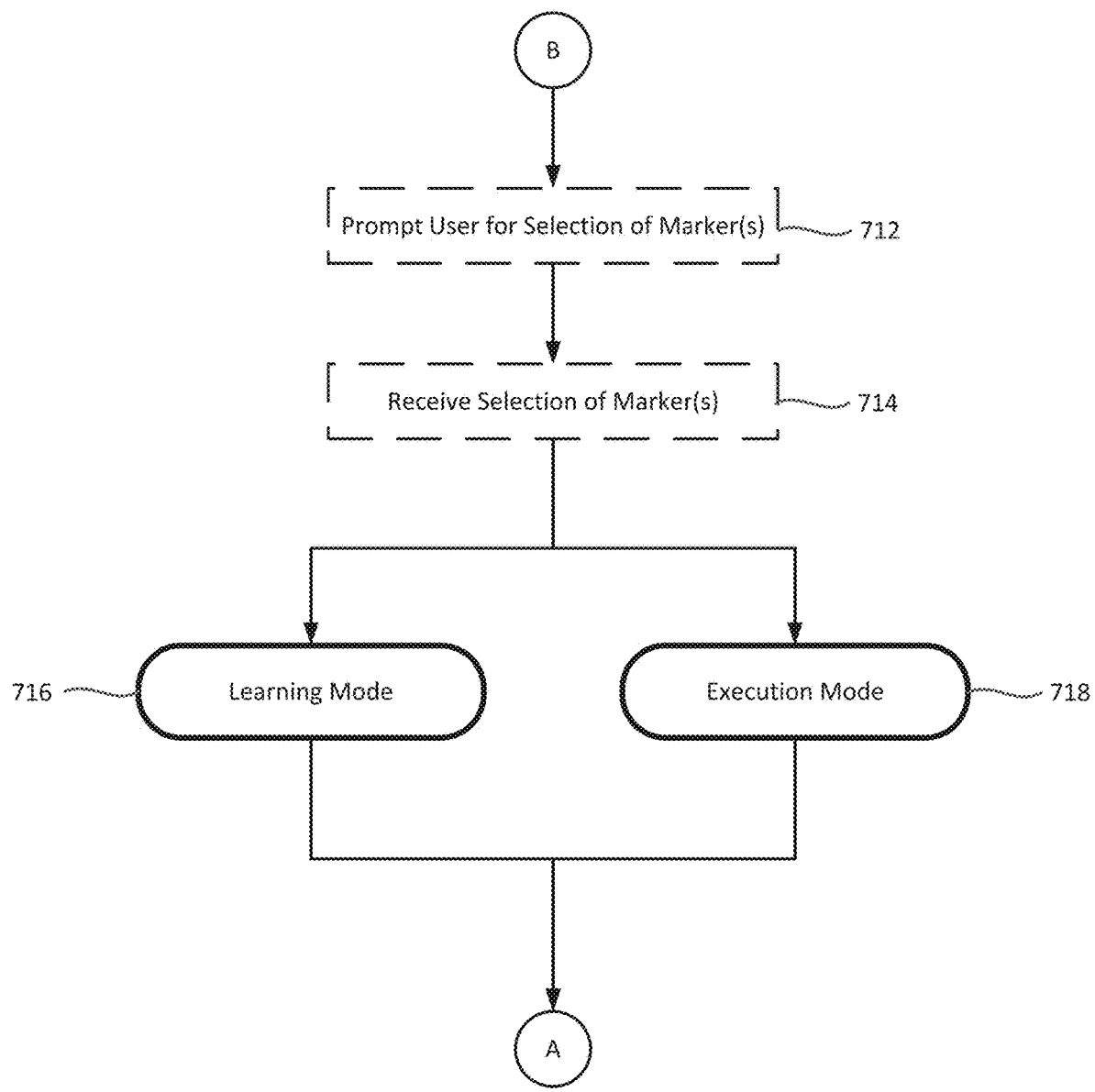
FIG. 8 is a flow diagram illustrating a method of learning and execution of skills performed by a robotic device, according to some embodiments.

Optionally, method 700 can proceed to 712, where the robotic device can prompt a user e.g., via a user interface or other type of I/O device, to select a set of markers from the marker(s) identified in the representation of the environment, as depicted in FIG. 8. The user can make a selection, and the robotic device can receive the selection from the user, at 714. Alternatively, in some embodiments, the robotic device can automatically select a set of markers instead of prompting a user to make a selection. The robotic device can be programmed to select a marker based on certain predefined or learned rules and/or conditions. For example, the robotic device can be instructed to select a marker that is associated with a particular type of object (e.g., a supply item) during certain hours of the day, or when traffic in a building is low. In the latter case, the robotic device can determine when traffic in a building is low by actively moving through the building (e.g., patrolling and monitoring hallways and rooms) and sensing or scanning the environment. The robotic device can then know to select markers that are associated with particular objects at times when traffic in the building is lower than a majority of other times.

Figure 9:
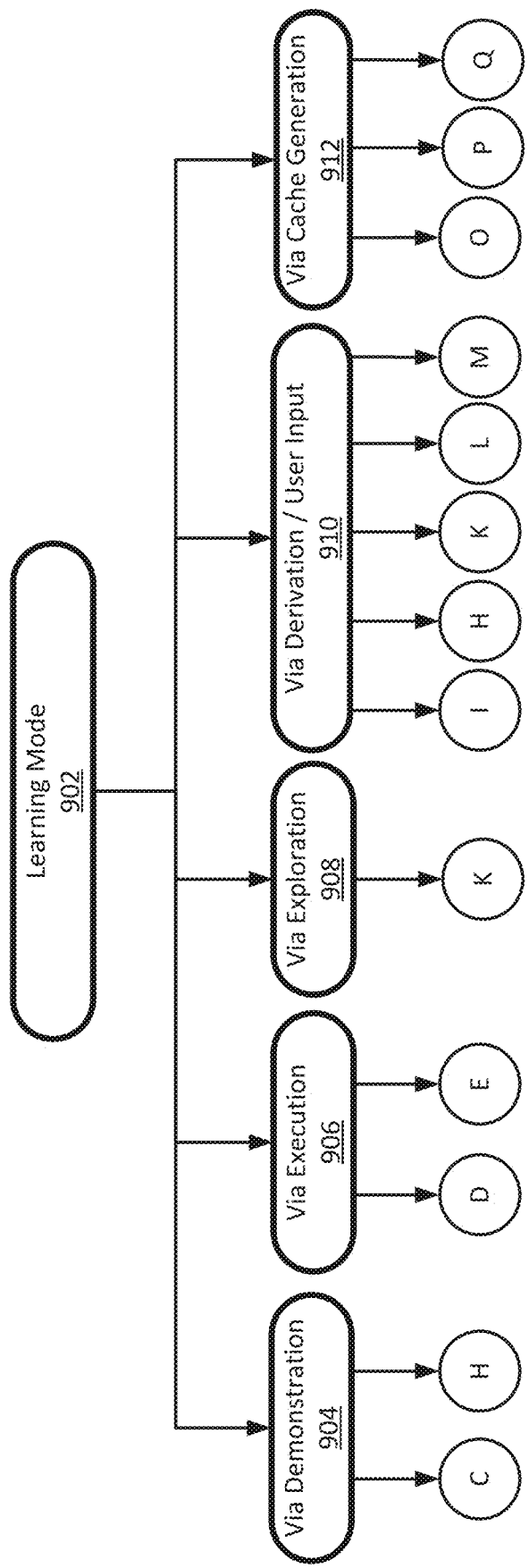
FIG. 9 depicts a flow diagram illustrating different learning modes of a robotic device, according to some embodiments.
Figure 10:
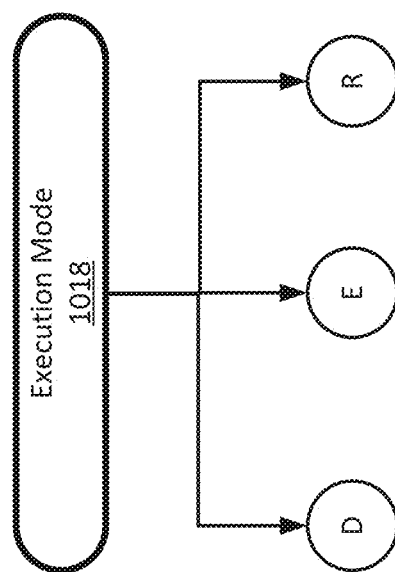
FIG. 10 depicts a flow diagram illustrating different execution modes of a robotic device, according to some embodiments.

After scanning the environment and identifying the marker(s), the robotic device can initiate learning, at 716, or execution, at 718. FIG. 9 depicts the various ways that the robotic device can learn information about its environment, its current state, and/or one or more behaviors or skills. FIG. 10 depicts the various ways that the robotic device can execute one or more behaviors or skills.

As depicted in FIG. 9, a robotic device (e.g., any of the robotic devices described herein including, for example, robotic device 102, 110, 200, 400, etc.) operating in a learning mode 902 can learn skill(s), environmental constraint(s), etc. through one or more processes. In some embodiments, a robotic device operating according to the methods described herein can be constantly learning (e.g., operating in a learning mode). For example, the robotic device can be collecting, storing, analyzing, and/or updating information on a continuous basis, and be adapting and/or adding to its library of learned information (e.g., skills, behaviors, environmental constraints, map, etc.), as it navigates through an environment and/or engages in certain behavior or actions. In other embodiments, a robotic device can switch between operating in a learning mode or in an execution mode. While operating in learning mode 902, a robotic device such that those described herein can learn via demonstration 904, via execution 906, via exploration 908, via derivation/user input 910, via cache generation 912, and/or any combination thereof.

In some embodiments, the robotic device can learn through demonstration. For example, to acquire a manipulation skill, the robotic device can be taught using LfD (e.g., kinesthetic teaching), whereby a user (e.g., nearby user or remotely situated robot supervisor) or other robotic device can demonstrate skills to the robotic device. For example, a manipulating element such as an arm of the robotic device can be moved through a sequence of waypoints to interact with an object. As another example, a mobile base of a robotic device (e.g., a base with a transport element such as wheels, tracks, crawlers, etc.) can be navigated around objects within an environment by a user, e.g., by using a joystick, a user interface, or some other type of physical or virtual control device, or by physically guiding or moving (e.g., pulling, pushing) the robotic device.

In the case of kinesthetic teaching, a user can physically demonstrate skills to the robotic device. The training or teaching can be performed in a mass-production setting, such as, for example, a manufacturing environment, in which the robotic device can be taught using an aggregate model representing a generic performance of a skill. Alternatively or additionally, the teaching can occur onsite after the robotic device has been deployed (e.g., at a hospital), such that the robotic device can learn to perform the skill in the specific site environment. In some embodiments, a robotic device can be taught in an onsite setting, and can then send information associated with the learned skill to one or more additional robotic devices, such that those additional robotic devices can also have the knowledge of the taught skill when operating in the same onsite setting. Such embodiments can be useful when multiple robotic devices are being deployed at a single site. Each robotic device can then receive and send information to other robotic devices such that they can collectively learn a set of skills for that onsite environment.

In some embodiments, the robotic device can learn a new skill or an environmental constraint through a demonstration of a skill using the LfD teaching process. The robotic device can analyze and extract information from past demonstrations of a skill in a human environment. As an example, a user can demonstrate to the robotic device how to move its manipulation element (e.g., an arm) in a supply room with a human and the robotic device. From the demonstration(s), the robotic device can define one or more environmental constraints that limit its motion when planning and/or executing the skill in the future to the motion of the existing demonstration(s). The robotic device can generate motions and construct a graph, where the environment constraints are encoded, using existing demonstrations (e.g., sequences of keyframe(s)) each offering a node and path through an nth dimensional space of motion. When the robotic device is then presented with a new environment and needs to adapt the skill to that new environment, the robotic device can efficiently sample from its existing set of demonstrated motions using the constructed graph to plan a motion for the new environment. By building in the learning of such environmental constraints into the initial demonstrations of a skill, the robotic device can quickly adapt to new environments without requiring new environmental constraints to be defined. In the new environment, the robotic device can scan the environment to obtain additional information regarding that environment and/or object(s) (e.g., humans, supplies, doors, etc.) within the environment, and then use its existing skill model to plan a motion trajectory through the new environment without deviating significantly from its existing set of demonstrated motions. Further details of learning from demonstration 904 are described with reference to FIG. 11 and FIG. 16.

In some embodiments, the robotic device can learn through demonstration 904 and user input 910. For example, the robotic device can engage in interactive learning with a user, e.g., with an interactive learning template. As described above, with interactive learning, the robotic device can be provided an initial set of skill models. The initial set of models can be developed in a factory setting, by other robotic device, and/or the robotic device itself in one or more settings. While operating in a specific environment, the robotic device can adapt or specialize this initial set of skills via interactive learning sessions, where the robotic device can autonomously perform certain portions of a skill while leaving other portions to be demonstrated by a user. Further details of such interactive learning process are described with reference to FIGS. 16-20.

In some embodiments, the robotic device can learn new information, skills, etc. while executing skills 906. For example, the robotic device can collect, store, analyze, and/or update information, as the robotic device executes a behavior, an action, etc. In an embodiment, a robotic device can execute a skill that requires the robotic device to move through a hallway several times a day. The robotic device can learn that, at certain times of day, the hallway has greater traffic. The robotic device can then adapt its behavior, for example, to avoid going through the hallway during those times of high traffic (e.g., by going an alternative route and/or waiting to go through the hallway at times of low traffic). Further details of such learning via execution process are described with reference to FIGS. 12-13.

In some embodiments, the robotic device can learn through exploration 908. For example, the robotic device can scan and collect information on the environment and/or objects within the environment. To execute a skill, the robotic device can select an existing skill model, plan the execution of the skill, and execute the skill. In some embodiments, the robotic device can compare the information collected on the environment and/or objects within the environment to previous information collected on the environment and/or objects within the environment. In some embodiments, the robotic device can re-select, re-plan, or re-execute the skill based on the comparison. For example, the robotic device can scan a hallway with a doorway and can collect information on the hallway and/or the doorway. The robotic device can select a plan to navigate through the doorway. As the robotic device is navigating through the doorway, the robotic device can determine whether the interaction with the doorway was successful. If the interaction was unsuccessful, the robotic device can scan the hallway and/or the doorway again. The robotic device can compare the information to previously collected information. The robotic device can then re-plan and/or re-execute navigating through the doorway based on this comparison. For instance, the robotic device can determine that the doorway is crowded based on the comparison. The robotic device can then re-select another skill model, re-plan execution of the skill, and/or re-execute the skill based on the comparison. Further details of such learning via exploration process is described with reference to FIG. 18.

In some embodiments, the robotic device can learn via cache generation 912. For example, the robotic device can prompt a user to teach one or more poses (e.g., starting positions) for executing a skill, e.g., relative to one or more markers in the environment. The robotic device can save the poses and the manipulation data associated with the skill. The robotic device can also generate and save cached plans to execute the one or more skills. In an example implementation, to navigate through a door and/or doorway, the robotic device can prompt a user to identify the door type. If the door type is known (e.g., if manipulation data for a door type has been saved), the robotic device can select manipulation data for that door type, and generate and save cached plans to navigate through the door and/or doorway. If the door type is not known, the robotic device can prompt the user to teach one or more target pose to navigate through the door. The robotic device can generate and save a cached plan to navigate through the door based on the teaching. Further details of such learning via cache generation is described with reference to FIGS. 23-25.

FIG. 10 is a flow diagram that depicts different processes through which a robotic device (e.g., any of the robotic devices described herein including, for example, robotic device 102, 110, 200, 400, etc.) operating in an execution mode 1018 can execute skill(s). In some embodiments, the robotic device can receive or select a plan to execute a skill (e.g., from a cache of previously generated plans). The plan can be generated during a learning process, such as during implementation of one or more learning modes described in FIG. 9. Additionally or alternatively, an initial plan can be received from a user via a user interface. The plan can later be updated by the robotic device. In some embodiments, a plan can include a trajectory for the robotic device to follow so as to execute the skill. In some embodiments, a robotic device can switch between operating in execution mode and operating in learning mode. For example, during execution, the robotic device can continuously scan and collect information of the environment. The robotic device can use this information collected during execution to generate and/or update plans to execute a skill. Further details of such execution is described with reference to FIGS. 12-13 and FIG. 26.

Figure 11:
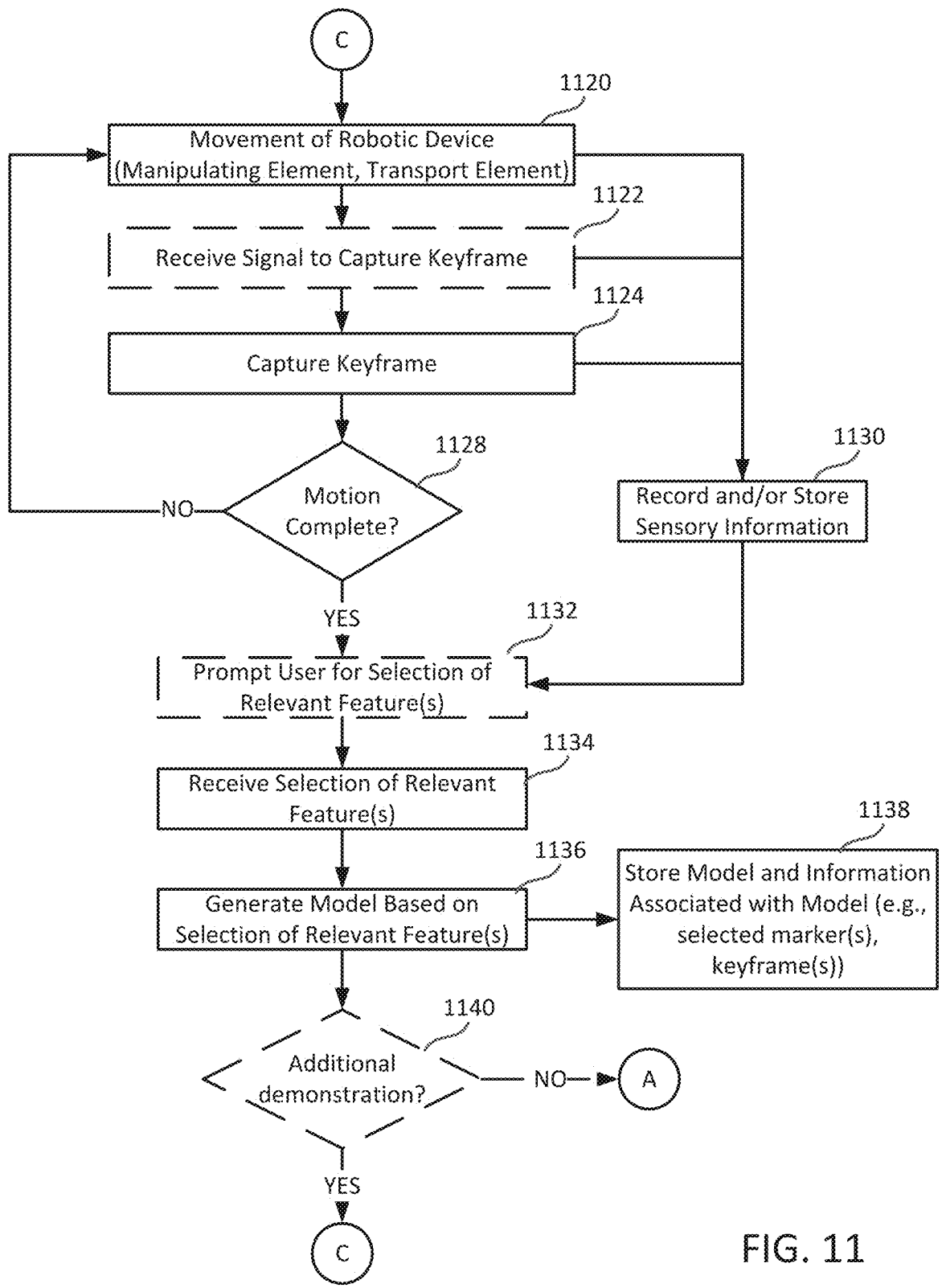
FIG. 11 is a flow diagram illustrating a method of learning a skill performed by a robotic device, according to some embodiments.

FIG. 11 is a flow diagram illustrating a method of learning a skill performed by a robotic device, according to some embodiments. In the learning mode, depicted in FIG. 11, method 700 proceeds to 1120-1124, where a user can use a LfD teaching process to teach the robotic device a skill. In an embodiment, a skill can be defined as gripping an object located at a particular location, picking up the object, moving the object to a different location, and setting the object down in the different location. In another embodiment, a skill can involve interactions with an environment surrounding the robotic device, e.g., a door.

At 1120, a user (or another robotic device) can guide the robotic device, including a manipulating element (e.g., manipulating element 250, 450, or 550) and/or a transport element (e.g., transport element(s) 260, 560), through a movement. For example, a user can guide the manipulating element of the robotic device (and/or other component of the robotic device, e.g., a transport element) through a demonstration associated with executing a particular skill, e.g., an interaction with a human, an engagement with and/or manipulation of an object, and/or other interactions with human(s) and/or a surrounding environment. In an embodiment, a user can demonstrate to the robotic device how to interact with and/or navigate through a door. The user can demonstrate how the robotic device, e.g., via its manipulating element(s), how to interact with a handle of the door. For example, a manipulating element of the robotic device, such as an arm, can be guided through a series of motions relative to the door handle (e.g., as placed or identified by a visual input or fiducial marker). While or after the door handle is turned, e.g., using the manipulating element, the robotic device can be guided via demonstration to push the door open, e.g., by moving its transport element(s). The combination of motions of the manipulating element(s) and transport element(s) can be used, as further explained below, to construct a model for executing a skill or behavior for future interactions with the door and/or similar doors.

In some embodiments, the robotic device can be guided by a user that is locally present, e.g., by the user physically moving and/or providing inputs to the robotic device. In some embodiments, the robotic device can be guided by a user located remotely from the robotic device (e.g., a robot supervisor) via, for example, a remote or cloud interface.

While guiding the manipulating element (and/or other component of the robotic device) through the movement, the user can indicate to the robotic device when to capture information about the state of the manipulating element (e.g., joint configurations, joint forces and/or torques, end effector configuration, end effector position), another component of the robotic device, and/or the environment (e.g., a location of an object associated with a selected marker and/or other objects in the environment). For example, the robotic device can receive a signal from a user to capture information about the manipulating element and/or environment at a waypoint or keyframe during the movement of the manipulating element, at 1122. In response to receiving a signal, at 1124, the robotic device can capture the information about the manipulating element, other component of the robotic device, and/or environment at that keyframe. The manipulating element information can include, for example, joint configurations, joint torques, end effector positions, and/or end effector torques. The environmental information can include, for example, the position of a selected marker relative to the end effector, and can indicate to the robotic device when objects in the environment may have moved. If the movement is still ongoing (1128: NO), then the robotic device can wait to capture information about the manipulating element and/or environment at additional keyframes. In some embodiments, the robotic device can be programmed to capture keyframe information without receiving a signal from a user. For example, while the manipulating element is being moved by a user, the robotic device can monitor changes in the segments and joints of the manipulating element, and when those changes exceed a threshold, or when there is a directional change in a trajectory of a segment or joint, the robotic device can autonomously select that point to be keyframe and record information about the manipulating element and/or environment at that keyframe.

During the movement of the manipulating element (and/or other component of the robotic device, e.g., transport element), the robotic device can also continuously or periodically, without receiving a signal from a user, record sensory information, e.g., information about the manipulating element, other element(s) of the robotic device (e.g., transport element), and/or environment, at 1130. For example, the robotic device can record information about the trajectories of segments and joints, as well their configurations, as the user moves the manipulating element through the demonstration. During the demonstration, the robotic device can also record information about one or more environmental constraints, e.g., static information about object(s) within the environment (e.g., a location or size of a doorway, a supply bin, etc.) and/or dynamic information about object(s) within the environment (e.g., a level of traffic in a room, movements of users around the robotic device, etc.). In some embodiments, the sensory information recorded by the robotic device during the demonstration can add to and/or modify one or more layers of a map of the environment, e.g., as depicted in FIG. 6.

In some embodiments, the robotic device can include an audio device (e.g., 244) such as, for example, a microphone, and the demarcation of keyframes can be controlled by speech commands. For example, a user can indicate to the robotic device that it plans to give a demonstration by speaking, "I will guide you." The demonstration can begin when the user indicates the first keyframe by speaking "start here." Intermediate keyframes can be indicated by speaking "go here." And a final keyframe representing the end of the demonstration can be indicated by speaking "end here." Suitable examples of demonstration teaching are provided in the Akgun article.

In some embodiments, while demonstrating a skill to the robotic device, a user can indicate which portion(s) of the skill are generic and which portion(s) of the skill are more specific to a particular environment or situation, e.g., via one or more inputs into the robotic device. For example, while demonstrating to a robotic device how to move supplies from a first location to a second location (e.g., a room) and to drop those supplies off at the second location, the user can indicate to the robotic device that the action of navigating from the first location to the second location is generic while the action of dropping off the supplies at the second location is unique and requires more information specific to an environment to implement (e.g., a specific tag or marker to drop off the supplies relative to). When the robotic device later uses a model for that skill to move supplies between different locations, the robotic device can know to request specific information regarding the drop off and/or scan for that specific information before executing the skill (e.g., request and/or scan for information regarding a specific tag to determine its location before performing the drop off).

In some embodiments, a user can indicate after demonstrating a skill to a robotic device those portions of the skill that are generic or specific and/or modify those portions of the skill that the user has previously indicated to be generic or specific. In some embodiments, a robotic device after learning a set of skills may determine that portions of the set of skills are generic or specific. In some embodiments, the robotic device can recommend that portions of the set of skills are generic or specific to a user, and request confirmation from the user. Based on the user's confirmation, the robotic device can store the information for reference when learning and/or executing future skills associated with the set of skills. Alternatively, the robotic device can automatically determine and label different portions of skills as being generic or specific without user input.

Once the movement or demonstration is complete (1128: YES), the robotic device can generate a model for the demonstrated skill based on a subset of all the sensory information (e.g., manipulating element information, transport element information, environmental information) that has been recorded. For example, at 1132, the robotic device can optionally prompt a user, e.g., via a user interface or other type of I/O device, for a selection of features that are relevant to learning the skill, and at 1134, the robotic device can receive the selection of features from the user. Alternatively or additionally, the robotic device can know to select certain features to use in generating the model based on previous instructions from a user. For example, the robotic device can recognize that it is being demonstrated to pick up an object, e.g., based on the sensory information, and can automatically select one or more features of the sensory information (e.g., joint configuration, joint torques, end effector torques) to include as relevant features for generating the skill model, e.g., based on past demonstrations of picking up the same or different objects.

At 1136, the robotic device can generate the model of the skill using the selected features. The model can be generated using stored machine learning libraries or algorithms (e.g., machine learning libraries 342). In some embodiments, the model can be represented as a HMM algorithm that includes a plurality of parameters, such as, for example, a number of hidden states, a feature space (e.g., features included in a feature vector), and emission distributions for each state modeled as a Gaussian distribution. In some embodiments, the model can be represented as a support vector machine or "SVM" model, which can include parameters such as, for example, a kernel type (e.g., linear, radial, polynomial, sigmoid), a cost parameter or function, weights (e.g., equal, class balanced), a loss type or function (e.g., hinge, square-hinge), and a solving or problem type (e.g., dual, primal). The model can be associated with the relevant sensory information and/or other sensory information recorded by the robotic device during the skill demonstration. The model can also be associated with marker information indicating the set of markers that were manipulated during the skill demonstration and/or features associated with one or more physical objects tied to those markers. The robotic device can store the model in a memory (e.g., storage 230 or 330), at 1138.

Figure 21:
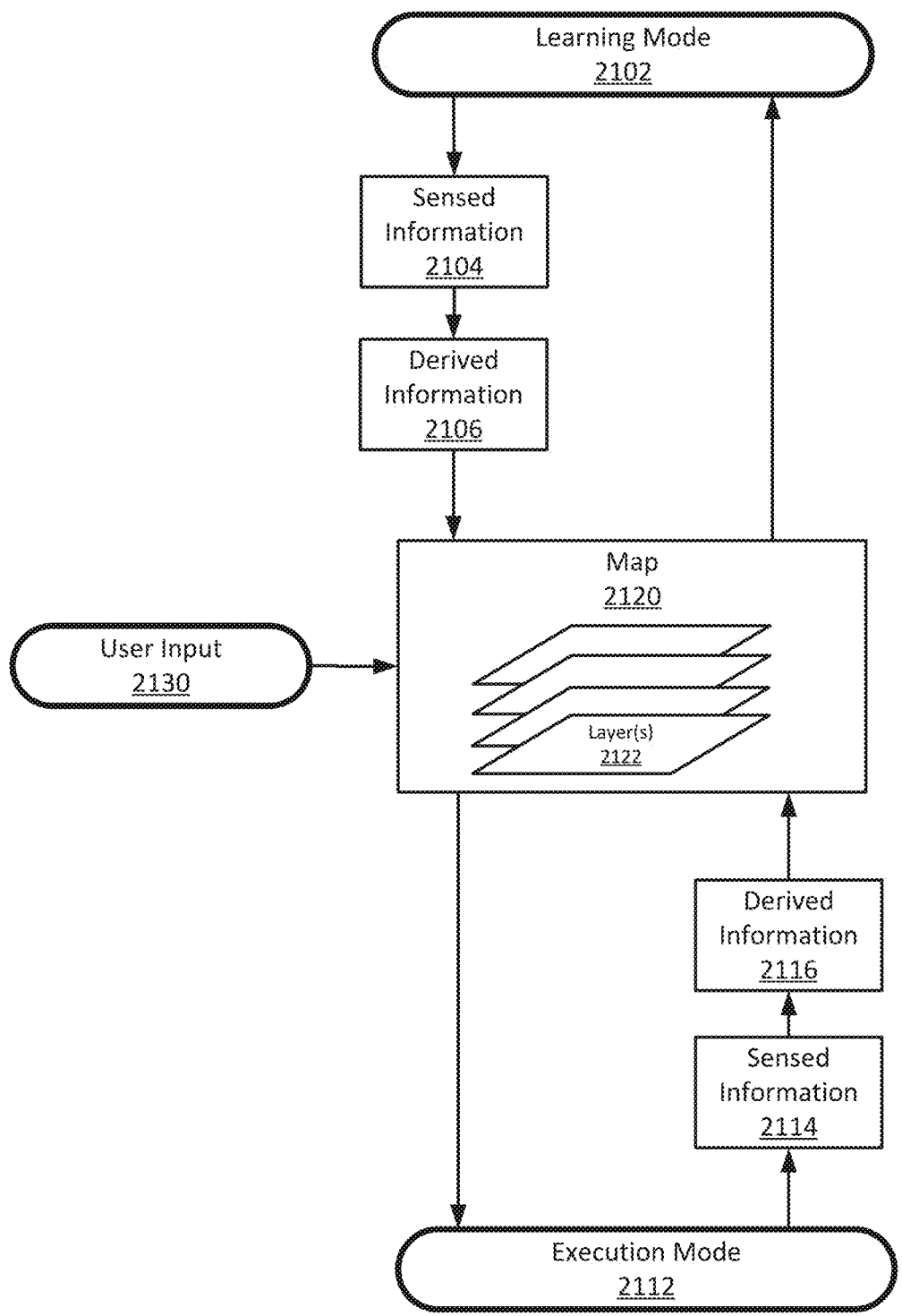
FIG. 21 depicts flow of information that a robotic device provides to and received from a map maintained by the robotic device, according to some embodiments.

In some embodiments, information associated with a demonstration (e.g., sensory information, model, etc.) can be used to add to and/or modify the layers of a map or representation of the environment, e.g., such as the representation 600 depicted in FIG. 6. For example, FIG. 21 depicts an example of information that flows from and feeds into a map (e.g., map 2120). FIG. 21 is described in further detail below.

Optionally, at 1140, the robotic device can determine whether the user will be performing another demonstration of the skill. If another demonstration is to be performed (1140: YES), then method 700 can return to 1120, where a user (or other robotic device) can guide the robotic device through an additional demonstration. If the demonstrations are complete (1140: NO), then method 700 can optionally return to the beginning and perform a new scan of the environment. Alternatively, in some embodiments, method 700 can terminate.

In another embodiment, a skill can be a navigation behavior, such as navigating between two locations or navigating around and/or through an object in the environment. Similar to learning a skill with a manipulation element, such as described herein, a user (or other robotic device) can guide the robotic device including a set of transport elements (e.g., transport element(s) 260, 560) through the navigation behavior, at 1120. For example, a user can use a joystick or other control device to control the movement of the set of transport elements (and/or other components of the robotic device, e.g., a manipulation element) and/or physically guide such elements (e.g., push or pull on the robotic device) such that the robotic device can perform the navigation behavior. While controlling the movement of the set of transport elements (and/or other components of the robotic device), the user can signal to the robotic device when to capture sensory information, such as information about the state of the set of transport elements (e.g., angles of each transport element, configurations of each transport element, spacing between transport elements if movable relative to one another, etc.), other components of the robotic device, and/or the environment (e.g., location of the robotic device in a map, location and/or boundary of an object in the environment). The user can signal to the robotic device at keyframes during the movement of the set of transport elements (and/or other components of the robotic device), e.g., at a starting point, an ending point, and/or transition points between moving the set of transport elements in a first direction and a second direction. In response to receiving a signal from the user, at 1122, the robotic device can capture a snapshot of movement (including information about the set of transport elements, other components of the robotic device, and/or the environment) at the keyframe. Alternatively or additionally, the robotic device can be configured to autonomously select points during the movement of the set of transport elements (and/or other components of the robotic device) to capture a snapshot of the movement. For example, the robotic device can monitor the angle and/or configuration of the set of transport elements (e.g., such as when a user takes over control of the robotic device, for example, by controlling the robotic device suing a control device or pushing on the robotic device) and automatically capture a snapshot of that information whenever the robotic device detects a change in the angle and/or configuration. In some embodiments, the robotic device can be configured to continuously collect information on the set of transport elements, other components of the robotic device, and/or the environment while the user controls the movement of the robotic device.

Similar to learning a skill with a manipulating element, as described herein, the robotic device can continue to capture sensory information associated with the movement of the transport elements (and/or other components of the robotic device) until the movement is completed (1128: YES). The robotic device can optionally receive a selection of features that are relevant to learning the navigation behavior and/or autonomously identify relevant features in the collected sensory information (e.g., by recognizing that it is being demonstrated a particular navigation skill and identifying those features that are relevant to learning that skill), at 1132-1134. The robotic device can then generate a model for the navigation behavior based on the sensory information associated with the relevant features, at 1136, and store that model and the sensory information such that it can be used to generate a trajectory for the robotic device to execute at a later point in time, at 1138.

An example of a navigation behavior is to navigate through a doorway. The robotic device can be configured to navigate through standard doorways within a building, but the robotic device may not be capable of navigating through a non-standard doorway, e.g., a small or oddly shaped doorway. Accordingly, the robotic device may prompt a user to demonstrate to the robotic device how it can safely navigate through the doorway. The robotic device can navigate to one side of the doorway and then have a user demonstrate to the robotic device how to pass through the doorway to the other side. During the demonstration, the robotic device can passively record information such as a location of the robotic device in a map and/or sensor data (e.g., a boundary of the door, a configuration of the transport elements and/or manipulation elements, and other sensory information as described herein). In some embodiments, the robotic device can learn how to navigate through the doorway using an interactive learning template, as further discussed herein with reference to FIG. 16.

In some embodiments, the user can be onsite near the robotic device. In other embodiments, the user can be located at a remote location and can control the robotic device from a compute device (e.g., server 120, compute device 150) via a network connection to the robotic device (e.g., such as depicted in FIG. 1 and described above).

In some embodiments, as described herein, the robotic device can actively scan its surrounding environment to monitor changes in the environment. Accordingly, during learning and/or execution, the robotic device can engage in continuous sensing or scanning of the environment, and update the representation of the environment accordingly, as well as the environmental information that it has stored.

In some embodiments, the robotic device can be configured to learn socially appropriate behaviors, i.e., actions that account for interactions with humans. For example, the robotic device can be configured to learn a manipulation or navigation skill that is performed around humans. The robotic device can learn the socially appropriate behavior via a demonstration by a human operator (e.g., a nearby user or a remotely situated robot supervisor). In some embodiments, the robotic device can be configured to learn the behavior in an interactive setting, e.g., via a human operator intervening in the autonomous execution of a skill by the robotic device and then demonstrating to the robotic device how to execute the skill. The robotic device, upon detecting an intervention by the human operator (e.g., a nurse pushing the robotic device to one side), can be configured to switch to a learning mode where the robotic device is controlled by the human operator and passively records information associated with the demonstration and the perceptual context in which the demonstration is performed. The robotic device can use this information to generate a modified model of the skill and to associate that model with the appropriate social context in which the robotic device should execute that skill at a later point in time. As an example, a robotic device may detect that a human operator has intervened in its autonomous execution of a navigation plan and, in response to detecting the intervention, switch to a learning model of being controlled by the human operator. The robotic device can record information about its surrounding environment and its own movements as the human operator demonstrates how the navigation plan should be modified in the presence of humans, e.g., that the robotic device should move aside in a hallway to let a human pass instead of waiting for the hallway to clear. Further details regarding interactive learning is described herein, with reference to FIGS. 16-20.

Figure 12:
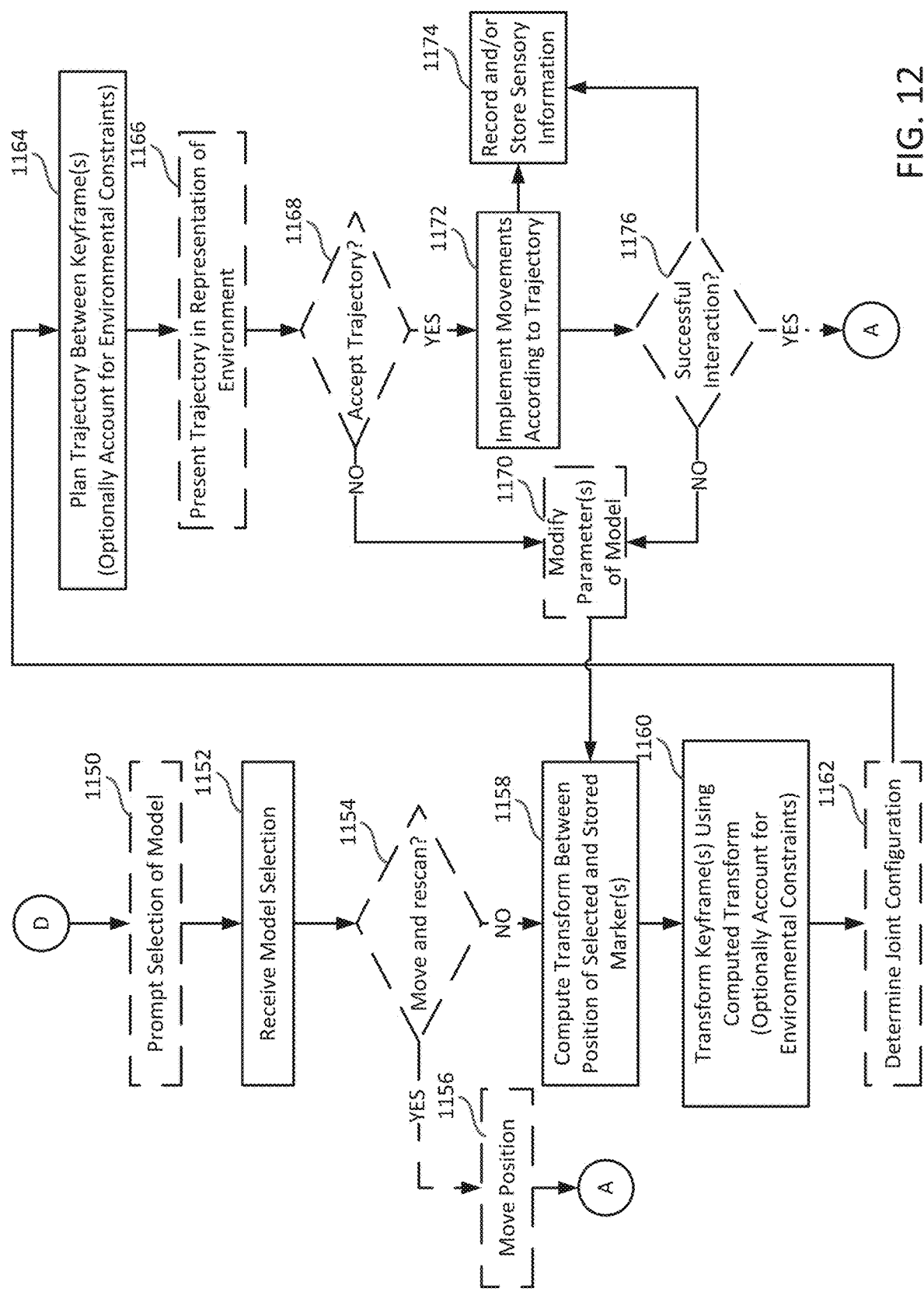
FIG. 12 is a flow diagram illustrating a method of executing a skill performed by a robotic device, according to some embodiments.

In the execution mode, depicted in FIG. 12, the robotic device can optionally prompt, e.g., via a user interface or other type of I/O device, a user to select a model, such as a model that was previously generated by the robotic device in the learning mode, at 1150. The robotic device can receive the model selection, at 1152. In some embodiments, the robotic device can receive the model selection from a user, or alternatively, the robotic device can automatically select a model based on certain rules and/or conditions. For example, the robotic device can be programmed to select a model when it is in a certain area of a building (e.g., when it is in a certain room or floor), during certain times or day, etc. Alternatively or additionally, the robotic device can know to select a certain model based on the selected set of markers. At 1154, the robotic device can determine whether to move closer to a selected marker prior to generating a trajectory and executing a skill with respect to the selected marker. For example, the robotic device can determine based on the selected set of markers and the selected model whether it should move to be better positioned to execute the skill (e.g., to be closer or more proximate to the marker, to be facing the marker from a certain angle). The robotic device may make this determination based on the sensory information that was recorded during a demonstration of the skill. For example, the robotic device may recognize that it was positioned closer to the marker when it was demonstrated the skill and accordingly adjust its position.

If the robotic device determines to move with respect to the selected marker (1154: YES), the robotic device can move its position (e.g., adjust its location and/or orientation), at 1156, and method 700 can return to 702, where the robotic device scans the environment again to obtain a representation of the environment. Method 700 can proceed back through the various steps to 1154. If the robotic device determines not to move with respect to the selected marker (1154: NO), then the robotic device can generate an action trajectory, e.g., for a manipulating element of the robotic device.

Specifically, at 1158, the robotic device can compute a function that transforms (e.g., translates) between a selected set of markers and a set of markers associated with the selected model (e.g., the marker(s) that were selected when the robotic device learned the skill, i.e., generated the selected model), referred to herein as a "stored marker" or "stored set of markers." For example, the robotic device can be taught a skill using a first set of markers that were at specific location(s) and/or orientation(s) relative to a portion of the robotic device, such as, for example, the end effector, and later, the robotic device can be executing the skill with a second set of markers that are at different location(s) and/or orientation(s) relative to the manipulating element. In such instances, the robotic device can compute a transformation function that transforms between the position(s) and/or orientation(s) of first set of markers and the second set of markers.

At 1160, the robotic device can use the computed transformation function to transform the position and orientation of a portion of the manipulating element, e.g., the end effector of the manipulating element, in each keyframe that was recorded when the skill was taught. Optionally, at 1162, the robotic device can account for any environmental constraints, e.g., a feature of an object and/or an area within the environment, such as a size, configuration, and/or location. The robotic device can limit the movement of the manipulating element based on the environmental constraints. For example, if the robotic device recognizes that it will be executing the skill in a supply room, the robotic device can take into account a size of the supply room when transforming the position and orientation of the manipulating element to avoid having a portion of the manipulating element come into contact with a wall or other physical structure within the supply closet. The robotic device can also take into account other environmental constraints associated with the supply room, such as, for example, a size of a bin within the supply room, a location of a shelf within the supply room, etc. The robotic device can be provided information regarding environmental constraint(s) and/or taught environmental constraint(s) in advance of executing skills in a setting with the environmental constraint(s), as further described herein with reference to FIG. 17.

Optionally, at 1162, the robotic device can use inverse kinematic equations or algorithms to determine the configuration of the joints of the manipulating element for each keyframe, at 1162. The position and orientation of the end effector and the set of markers can be provided in a task space (e.g., the Cartesian space where the robotic device is operating), while the orientation of the joints can be provided in a joint or configuration space (e.g., a nth dimensional space associated with the configuration of the manipulating element, where the robotic device is represented as a point and n is the number of degrees of freedom of the manipulating element). In some embodiments, the inverse kinematic calculations can be guided by the joint configuration information recorded when the robotic device was taught the skill (e.g., the configuration of the joints recorded during a teaching demonstration using the manipulating element). For example, the inverse kinematics calculations can be seeded (e.g., provided with an initial guess for the calculation, or biased) with the joint configurations that were recorded at each keyframe. Additional conditions can also be imposed on the inverse kinematics calculations, such as, for example, requiring that the calculated joint configurations do not deviate more than a predefined amount from a joint configuration in an adjacent keyframe. At 1164, the robotic device can plan the trajectory between the joint configurations from one keyframe to the next keyframe, e.g., in the joint space, to generate a complete trajectory for the manipulating element to execute the skill. Optionally, the robotic device can take into account environmental constraints, as discussed herein.

In some embodiments, after the robotic device transforms the position and orientation of the portion of the manipulating element (e.g., the end effector), the robotic device can plan the trajectory for the manipulating element in the task space. In such embodiments, method 700 can proceed from 1160 directly to 1164.

At 1166 and 1168, the robotic device can optionally present the trajectory to a user and prompt the user, e.g., via a user interface or other I/O device, to accept or reject the trajectory. Alternatively, the robotic device can accept or reject the trajectory based on internal rules and/or conditions, and by analyzing relevant sensory information. If the trajectory is rejected (1168: NO), then the robotic device can optionally modify one or more parameters of the selected model, at 1170, and generate a second trajectory, at 1158-1164. The parameters of the model can be modified, for example, by selecting different features (e.g., different sensory information) to include in the model generation. In some embodiments, where the model is a HMM model, the robotic device can change the parameters of the model based on a determined success or failure, in which the robotic device tracks a log likelihood of different models having different parameters and selects the model with a higher log likelihood than the other models. In some embodiments, where the model is a SVM model, the robotic device can change the parameters by changing the feature space or configuration parameters (e.g., kernel type, cost parameter or function, weights), as described herein.

If the trajectory is accepted (1168: YES), then the robotic device can move the manipulating element to execute the generated trajectory, at 1172. While the manipulating element is executing the planned trajectory, the robotic device, e.g., via one or more sensors on the manipulating element and other components of the robotic device, can record and/or store sensory information, such as, for example, information about the manipulating element and/or environment, at 1174.

Optionally, at 1174, the robotic device can determine whether the execution of the skill was successful (e.g., whether an interaction with an object meets predefined success criteria). For example, the robotic device can scan the environment and determine whether the current state of the environment and the robotic device, including, for example, the locations of one or more objects, and/or the position or orientation of those objects relative to the manipulating element or another component of robotic device, and determine whether that current state aligns with predefined success criteria. The predefined and/or learned success criteria can be provided by a user, or, in some embodiments, provided by a different robotic device and/or compute device. The predefined and/or learned success criteria can indicate information about different features of the environment and/or the robotic device that are associated with success. In some embodiments, a user may also provide an input indicating to the robotic device that the execution was successful.

In a particular example, where a skill is defined as gripping an object at a particular location and picking up the object, success for the skill can be taught and/or defined as detecting that one or more markers associated with the object are in a specific relationship with each other and/or the robotic device, or detecting that a sufficient force or torque is being experienced (or was experienced) by the end effector or a joint of the manipulating element (e.g., a wrist joint), signifying that the manipulating element is supporting the weight of the object and therefore has picked up the object. If the execution was not successful (1176: NO), then the robotic device may optionally modify the parameters of the model, at 1170, and/or generate a new trajectory, at 1158-1164. If the execution was successful (1176: YES), then the data associated with the successful interaction (e.g., data indicating that the execution was successful and how it was successful) can be recorded, and method 700 can optionally return to the beginning and perform a new scan of the environment. Alternatively, in some embodiments, method 700 can terminate.

In some embodiments, a robotic device is configured to execute a skill involving operation of one or more of a manipulating element, a transport element, and/or another components of the robotic device (e.g., a head, eyes, a sensor, etc.). The robotic device can be configured to plan a trajectory for the skill, similar to that described above with respect to a manipulating element. For example, at 1150-1152, the robotic device can prompt and receive a user selection of a model for the skill, or alternatively, autonomously select a model for the skill. At 1158, the robotic device can compute a function that transforms between a set of markers currently identified in the environment and a set of stored markers associated with the selected model (e.g., the marker(s) that were identified and stored with the model for the skill when the robotic device learned the skill). Such transformation can involve a transformation of keyframes associated with a transport element or other component of the robotic device. At 1160, the robotic device can use the computed function to transform the configuration of the one or more components of the robotic device at each keyframe. At 1164, the robotic device can plan a trajectory for the one or more components of the robotic device between each transformed keyframe. While transforming the keyframes and/or planning the trajectory, the robotic device can optionally take into account any environmental constraints associated with the setting in which the skill is being executed. At 1172, the robotic device can implement movements of the one or more components of the robotic device according to the planned trajectory. In some embodiments, the robotic device can determine a joint configuration, at 1162, present the planned trajectory to a user, at 1166, and/or perform other optional steps as illustrated in FIG. 12. An example of a skill involving the operation of a transport element can be opening a door. A user (e.g., a nearby user or a remotely situated robot supervisor) can guide a robotic device to open a door using its base, e.g., by pushing open the door. The user can guide the robotic device, e.g., using a control device such as a joystick or by physically guiding the robotic device (e.g., pushing or pulling on the robotic device), through the action of opening the door using the base. The robotic device can sense and record information while the user guides its movements, and use that information generate a skill model. The robotic device can later use that skill model to execute the action of opening the door or other doors in the environment, e.g., by transforming keyframes associated with the transport element during the user's demonstration of the skill.

Figure 13:
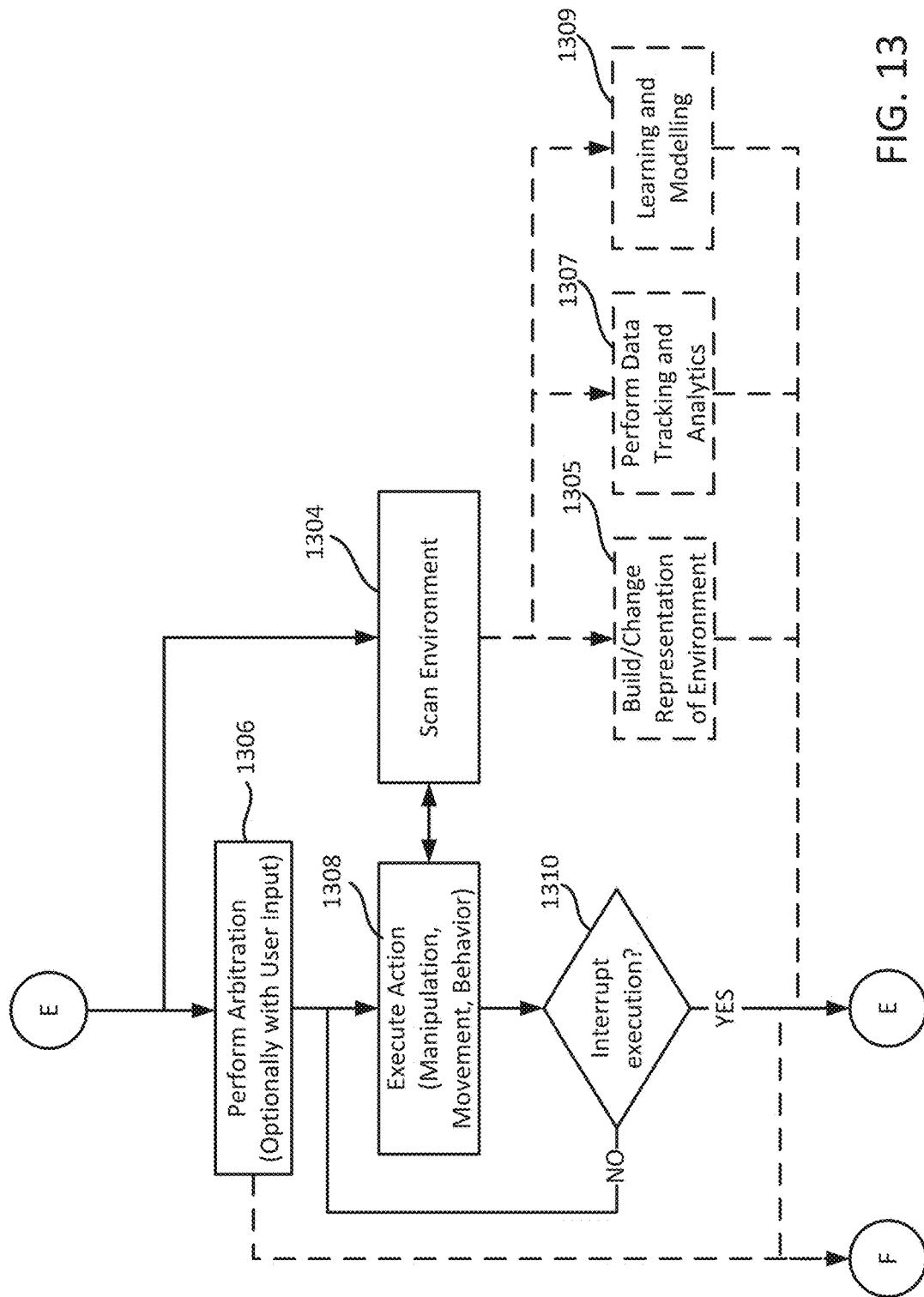
FIG. 13 is a flow diagram illustrating an operation of a robotic device within an environment, according to some embodiments.

FIGS. 13-17 are flow diagrams illustrating methods 1300 and 1400 that can be performed by a robotic system (e.g., robotic system 100) including one or more robotic devices, according to embodiments described herein. For example, methods 1300 and/or 1400 can be performed by a single robotic device and/or multiple robotic devices. FIG. 13 illustrates a flow diagram of a robotic device operating in an execution mode. In the execution mode, the robotic device can autonomously plan and execute actions within an environment. To determine which actions to execute and/or plan how to execute an action, the robotic device can scan the environment and collect information on the environment and/or objects within the environment, at 1304, and use that information to build and/or change a representation or map of the environment (e.g., map and/or representation 600), at 1305. The robotic device can repeatedly (e.g., at predefined times and/or time internals) or continuously scan the environment and update its representation of the environment based on the information that it collects on the environment. Similar to methods described above, the robotic device can collect information on the environment using one or more sensors (e.g., sensor(s) 270 or 570, and/or image capture device(s) 572).

In some embodiments, the robotic device can repeatedly and/or continuously scan the environment, at 1304, for data tracking and/or analytics, at 1307. For example, the robotic device can move through an environment (e.g., a building such as a hospital), autonomously or remotely driven (e.g., by a robot supervisor), and collect data regarding the environment, objects within the environment, etc. This information can be used, for example, by a data tracking & analytics element (e.g., data tracking & analytics element 329) that manages supplies and/or equipment for a hospital. In some embodiments, the robotic device can collect information on various humans (e.g., patients) to track the behavior of such patients (e.g., compliance with medications and/or treatments), run diagnostic tests, and/or conduct screening, etc.

In some embodiments, the robotic device can repeatedly and/or continuously scan the environment, at 1304, for modelling and learning purposes, at 1309. For example, the robotic device can collect data regarding its environment and/or objects within that environment (e.g., including humans and their behavior in response to robot actions), and use that information to develop new behavior and/or actions. In some embodiments, the robotic device can collect large amounts of information about an environment, which can be used by the robotic device to further refine and/or generate models specific to that environment. In some embodiments, the robotic device can provide this information to a robot supervisor (e.g., a remote user) that can use the information to further adapt the robotic device to a specific environment, e.g., by generating and/or modifying skill models and/or behaviors within that environment. The robot supervisor can in repeatedly (e.g., at specific intervals of time) and/or continuously (e.g., in real time) tweak the information that is collected by the robotic device and/or other robotic devices and/or the parameters of the models that the robotics are using. In some embodiments, the robot supervisor via this active exchange of information with the robotic device can repeatedly and/or continuously adapt the robotic device for a particular environment. For example, the robotic supervisor can modify planned paths that a robotic device may be using to navigate through an environment, which can in turn change the information and/or model(s) used by the robotic device to generate motion for its transport element. These changes, both provided by the robot supervisor and/or made by the robotic device, can feed into one or more layers of a map (e.g., map 600) of the environment, such as, for example, a social or semantic layer of the map.

At 1306, the robotic device can determine which action(s) to execute within the environment, i.e., perform arbitration on a set of resources or components capable of executing certain actions. The robotic device can select between different actions based on one or more arbitration algorithms (e.g., arbitration algorithm(s) 362). The robotic device can perform arbitration autonomously and/or with user input. For example, the robotic device can be configured to request user input when the robotic device cannot determine a current state of one or more of its components and/or an object within the environment, or when the robotic device cannot determine which action to execute and/or plan how to execute a selected skill. In some embodiments, the robotic device can be configured to autonomously select among a set of actions when the robotic device is familiar with a particular setting (e.g., has previously learned and/or executed actions in the setting) and to request user input when the robotic device encounters a new setting. When the robotic device encounters the new setting, the robotic device can request that a user select the appropriate action for the robotic device to execute or, alternatively, select an action and prompt a user to confirm the selection of the action.

In some embodiments, a human operator (e.g., a robot supervisor) can also monitor the robotic device and send a signal to the robotic device when the human operator wants to intervene in the execution of an action by the robotic device. The human operator can be located near the robotic device and/or at a remote compute device that is connected via a network to the robotic device or a nearby device that can be used to monitor the robotic device. The human operator may decide to intervene in the execution of an action by the robotic device, e.g., when the human operator wants to teach the robotic device a new skill or behavior, for safety reasons (e.g., to prevent harm to a human or the environment surrounding a robotic device), and/or to prevent injury to the robotic device.

In response to determining that user input is needed (e.g., because of an unfamiliar setting or in response to a signal from a user) (1312: YES), the robotic device can optionally prompt a user to provide a user input, at 1314. For example, the robotic device may cause an onboard display or a display located at a remote device (e.g., via a remote or cloud interface) to display a prompt to the user requesting the user input. The robotic device can receive a user input, at 1315, and perform arbitration based on that user input. When user input is not needed (1312: NO), the robotic device continues to autonomously perform arbitration.

After the robotic device has selected an action to execute, the robotic device can plan and execute the action, at 1308. As discussed above, the action can be associated with a task, such as a manipulation action (e.g., involving a manipulating element such as those described herein) or a movement (e.g., involving a transport element such as those described herein), and/or a social behavior. While executing the action, the robotic device can continue to scan its surrounding environment, at 1304. When the robotic device detect a change in its current state and/or a state of the environment (e.g., location of objects within the environment), the robotic device can evaluate the change to determine whether it should interrupt execution of the action, at 1310. For example, the robotic device can determine to interrupt execution of the action in response to detecting a physical engagement between one or more of its components and a human or other object in the environment (e.g., when a human operator touches a manipulating element, transport element, etc.), or when detecting the presence of a human or other object nearby. Additionally or alternatively, the robotic device can determine to interrupt execution of the action in response to receiving a signal from a user, e.g., a robot supervisor. In some embodiments, the robotic device can be configured in advance to interrupt execution of an action at specific points during the execution of an action, e.g., when the robotic device may need a user to demonstrate a part of the action, as defined in an interactive learning template. Further details regarding learning using interactive learning templates is explained herein, with reference to FIG. 15.

Figure 14:
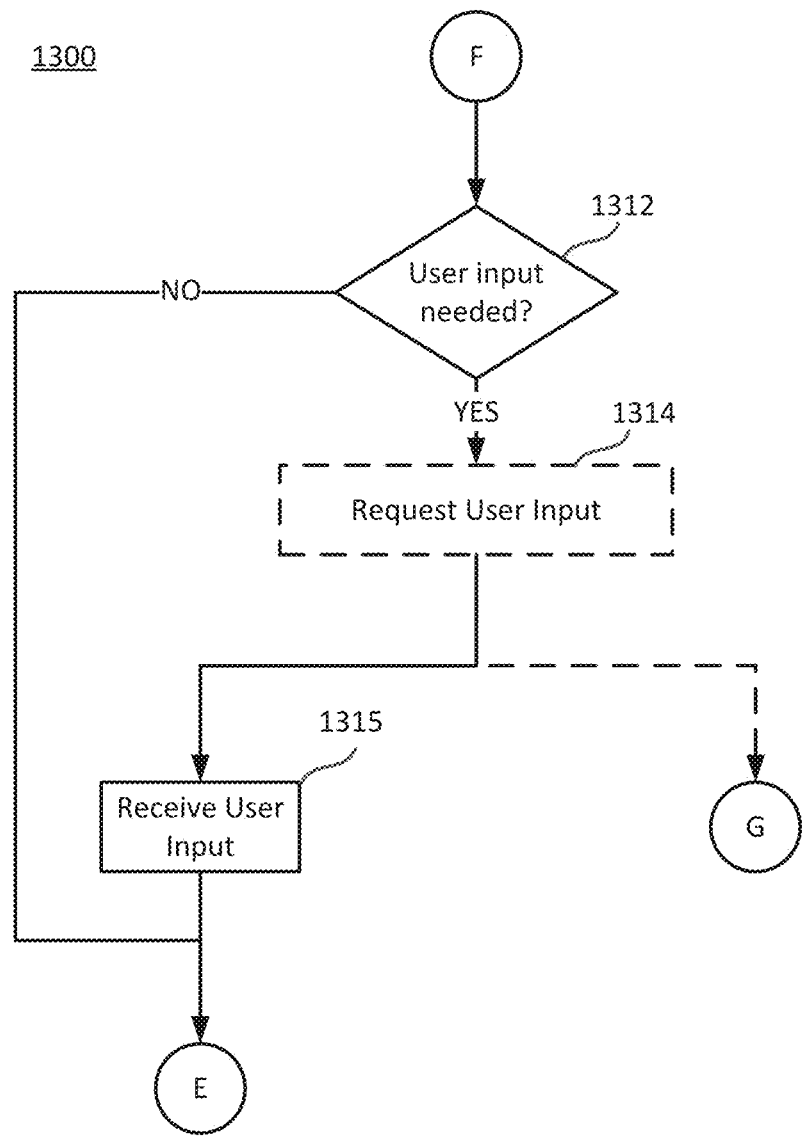
FIG. 14 is a flow diagram illustrating a method of requesting and receiving input from a user, such as a robot supervisor, according to some embodiments.
Figure 15:
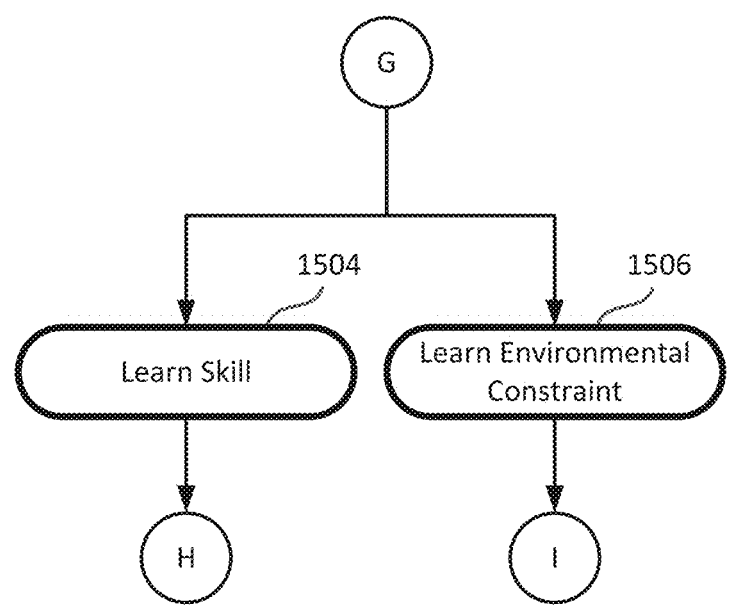
FIG. 15 is a flow diagram illustrating a method of learning skills and environmental constraints performed by a robotic device, according to some embodiments.

If the robotic device determines to interrupt execution of the action (1310: YES), then the robotic device may determine whether user input is needed, at 1312. As discussed above, if the robotic device determines that user input is required (1312: YES), then the robotic device may optionally prompt for a user input and/or receive a user input, at 1314-1315. The robotic device can then return to sensing or scanning its surrounding environment, at 1304, performing arbitration on a set of resources, at 1306, and/or executing an action, at 1308. Optionally, as depicted in FIGS. 14 and 15, when the robotic device determines that user input is required, the robotic device can switch to a learning mode, and then proceed to learn a skill, at 1504, or to learn an environmental constraint, at 1506. If the robotic device determines that user input is not needed (1312: NO), then the robotic device can return to sensing or scanning its surrounding environment, at 1304, performing arbitration on a set of resources, at 1306, and/or executing an action, at 1308. If the robotic device determines that the action does not need to be interrupted (1310: NO), then the robotic device can continue to execute the action, at 1308.

In some embodiments, the robotic device can be configured to determine when it may need to ask for user input, e.g., to help the robotic device execute a particular task or behavior. Such assistance can be requested both during execution of certain actions and/or while the robotic device is navigating through an environment. The robotic device can be configured to use its learned models and information regarding the environment and objects within that environment to determine when it needs to ask for user input and how to ask for that user input, at 1312. For example, the robotic device can use its knowledge of types of doors and different users in its environment to determine when and how to ask for help, e.g., asking different users to help with opening different types of doors (e.g., doors with keypads that require specific permissions or knowledge), and knowing to ask certain types of users who may be more inclined to provide assistance versus others (e.g., nurses vs. doctors).

In some embodiments, the user input received by the robotic device, e.g., at 1315, can include feedback from a user regarding whether the selection and/or execution of a skill was appropriate and/or successful. For example, a user can tag an action (e.g., a task or behavior) being executed by the robotic device (or having previously been executed by the robotic device) as a positive or negative example of the action. The robotic device can store this feedback (e.g., as success criteria associated with the action and/or other actions) and use it to adjust its selection and/or execution of that action or other actions in the future.

In some embodiments, the robotic device is configured to engage in socially appropriate behavior. The robotic device may be designed to operate in an environment with humans. When operating around humans, the robotic device can be configured to continually plan for how its actions may be perceived by a human, at 1306-1308. For example, when the robotic device is moving, the robotic device can monitor its surrounding environment for humans, at 1304, and engage in social interactions with any humans that it encounters, at 1308. When the robotic device is not executing any task (e.g., is stationary), the robotic device can continue to monitor its surrounding environment for humans, at 1304, and determine whether it may need to execute one or more socially appropriate behaviors based on how a human may perceive its presence, at 1306. In such embodiments, the robotic device may be configured with an underlying framework (e.g., one or more arbitration algorithms) that plans for and executes behavior that is socially appropriate given any particular context or setting. The robotic device can be configured to manage multiple resources (e.g., a manipulating element, a transport element, a humanoid component such as a head or eyes, a sound generator, etc.) and to generate appropriate behavior based on one or more of these resources.

Figure 16:
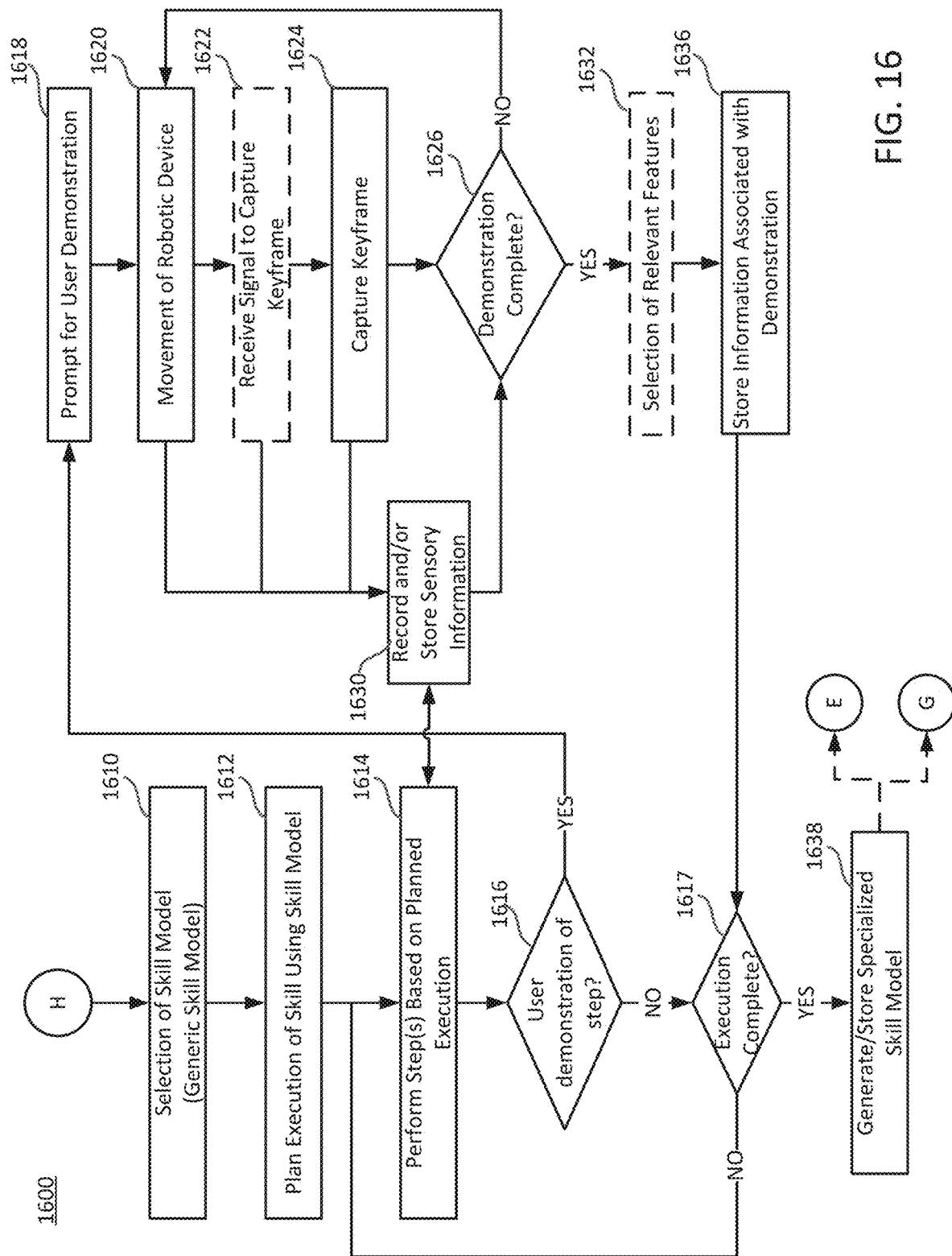
FIG. 16 is a flow diagram illustrating a method of learning a skill from a generic skill model performed by a robotic device, according to some embodiments.
Figure 17:
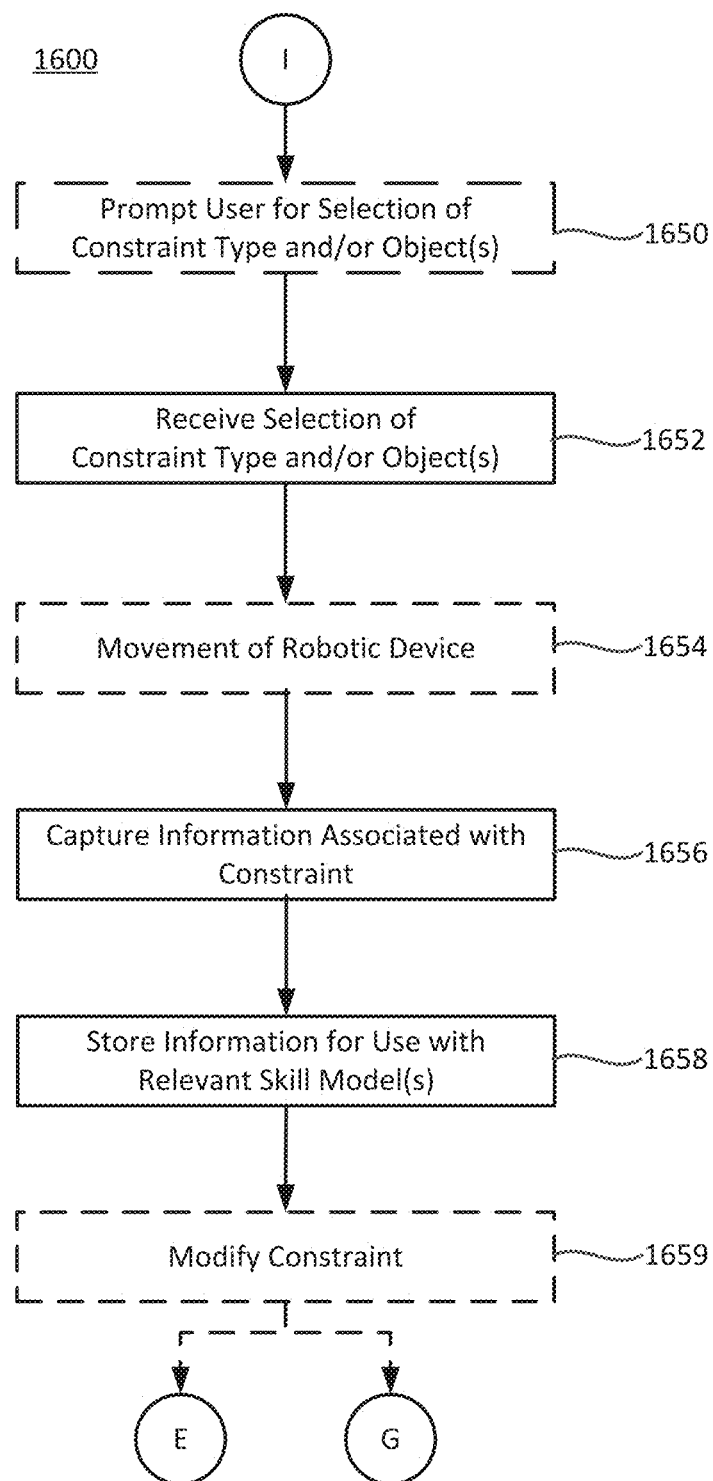
FIG. 17 is a flow diagram illustrating a method of learning an environmental constraint performed by a robotic device, according to some embodiments.

FIGS. 15-17 illustrate flow diagrams of a robotic device operating in a learning mode. As discussed above, a robotic device can operate in an execution mode and switch to operating in a learning mode, e.g., when the robotic device determines that it requires user input, at 1312. Alternatively or additionally, a robotic device can be set to operate in a learning mode, e.g., when the robotic device is initially deployed in a new environment (e.g., a new area, building, etc.). The robotic device can operate in the learning mode until a user indicates to the robotic device that it can switch to operating in the execution mode and/or the robotic device determines that it can switch to operating in the execution mode.

When operating in the learning mode, the robotic device can learn a skill, at 1504, and/or learn an environmental constraint, at 1506. The robotic device can be configured to learn a skill with or without an existing model of the skill (e.g., a generic model of the skill). When learning a skill without an existing model (e.g., learning a skill without relying prior knowledge), the robotic device can generate a model for the skill after being guided through a demonstration of the skill, as described herein with respect to FIG. 11. When learning a skill with an existing model (e.g., a generic model of the skill), the robotic device can initiate execution of the skill with the existing model and request user input when the robotic device needs a user to demonstrate a part of the skill. The existing model of the skill can be or form a part of an interactive learning template, i.e., a template for guiding the robotic device to learn a skill with input from a user at specified points during the execution of the skill.

FIG. 16 depicts a process for learning a skill using an interactive learning template. A robotic device may be deployed in a specific setting, e.g., a building. The robotic device may make a selection of an existing model of a skill, at 1610. The existing model of the skill may be a generic model of the skill that is not specialized to the environment or setting in which the robotic device is operating. At 1612, the robotic device can generate a plan for executing the skill using the skill model, according to a process similar to the process discussed herein with reference to FIG. 12. At 1614, the robotic device can initiate the execution of the skill by performing one or more steps or parts of the skill that do not require user input and/or specialization. Upon reaching a part of the skill (e.g., a part where the robotic device cannot determine how to execute, or a part of the skill that requires specialization to the setting in which the robotic device is executing the skill) (1616: YES), the robotic device can prompt a user to provide a demonstration of that part of the skill, at 1618. In some embodiments, the interactive learning template may indicate to the robotic device when it should prompt a user for a demonstration. Alternatively or additionally, the robotic device may autonomously determine that it requires user input to be able execute a part of the skill, e.g., when the robotic device cannot determine the state of an object in the environment and/or generate a plan to execute a particular part of the skill given constraints imposed by the environment. In some embodiments, a user (e.g., a robot supervisor) may also be monitoring the robotic device's execution of the skill and send a signal to the robotic device when the user wants to demonstrate a part of the skill to the robotic device. The robotic device, upon receiving the signal from the user, can then determine to proceed to 1618.

At 1620, a user can guide the robotic device through a movement. For example, the user can move one or more components of the robotic device (e.g., a manipulating element, a transport element, etc.) to demonstrate the part of the skill. While guiding the robotic device through the movement, the user can optionally indicate to the robotic device when to capture information about the state of one or more of its components and/or the environment, at 1622. For example, the robotic device can receive a signal from the user to capture sensory information, including information about the manipulating element, transport element, and/or environment, at a keyframe during the movement of the robotic device. Alternatively, the robotic device can autonomously determine when to capture sensory information. For example, while the robotic device is being moved by a user, the robotic device can monitor changes in one or more of its components, and when those changes exceed a threshold, or when there is a directional change in a trajectory of a component, the robotic device can autonomously select that point to be keyframe and record information about the robotic device and/or environment at that keyframe. In response to receiving a signal from a user or autonomously determining to capture sensory information, the robotic device can capture sensory information using one or more of its sensors, at 1624. During the movement of the robotic device, the robotic device can also continuously or periodically, without receiving a signal from a user, record sensory information, at 1630.

Once the movement or demonstration is complete (1626: YES), the robotic device can optionally receive a selection of features that are relevant to learning the part of the skill that has been demonstrated, at 1632. In some embodiments, the robotic device can autonomously make a selection of features and/or prompt a user to confirm the selection made by the robotic device, at 1632. At 1636, the robotic device can store the information associated with the demonstration. If the execution of the skill is not complete (1617: NO), then the robotic device continues with its execution of the skill, at 1614, and can prompt the user for additional demonstrations of parts of the skill, as needed, at 1618. The robotic device can continue to cycle through the interactive learning process until the execution of the action is complete (1617: YES), at which point the robotic device can generate a model for the skill with parts that are specialized to the setting in which the robotic device executed the skill, at

1638. The robotic device can then learn another skill and/or environmental constraint. Alternatively, if the robotic device does not need to learn another skill and/or environmental constraint, the robotic device can switch into its execution mode, and begin sensing or scanning an environment, performing arbitration, and/or executing actions.

With interactive learning templates, a robotic device taught and/or provided an initial set of models for skills. The initial set of models can be developed before the robotic device is deployed on-site in a specific environment (e.g., a hospital). For example, this initial set of models can be developed in a factory setting or at a training location, and made available to the robotic device. Once deployed on-site, the robotic device can adapt or specialize the initial set of models to the environment, e.g., via an interactive learning session, as described herein. Moreover, as new models are developed (e.g., off site at a factory or training location), the new models can be made available to the robotic device, e.g., via a network connection. Accordingly, systems and methods described herein enable a user and/or entity to continue to develop new models for skills and provide those to robotic devices, even after those robotic devices have been deployed on-site.

An example of an interactive learning session can involve adapting a generic model for moving an item into a room. The robotic device can be equipped with the generic model and deployed on-site at a hospital. When deployed at the hospital, the robotic device can autonomously initiate execution of the skill to move an item into a patient room, at 1612-1614. For example, the robotic device can autonomously navigate to the patient room using a map of the hospital. Once the robotic device has navigated to the patient room, the robotic device can determine that it needs a user to demonstrate where to drop off the item in the patient room (1616: YES).

The robotic device can prompt a user to move it to the specific drop-off location, at 1618. The user can control the movement of the robotic device, e.g., using a joystick or other type of control device, at 1620. As discussed above, the user can be located on-site near the robotic device or located at a remote location. While the user moves the robotic device to the drop-off location, the robotic device can capture sensory information about its current state and/or its surrounding environment, at 1624 and/or 1630. Once at the drop-off location, the robotic device can switch back to autonomous execution, at 1614. For example, the robotic device can execute a known arm motion, e.g., locating the item in a container on-board the robotic device, grabbing the item using a manipulating element, and positioning its manipulating element in a generic position for releasing the item. The robotic device can determine for a second time that it needs a user to demonstrate a part of the skill, e.g., dropping the item on a shelf (1616: YES). The robotic device can prompt the user for another demonstration, at 1618, and the user can move the manipulating element such that the item is in position over the shelf. The robotic device can capture sensory information again during the movement of the manipulating element, at 1624 and/or 1630. The robotic device can regain control once again and autonomously open a gripper of the manipulating element to drop off the item on the shelf and then retract its manipulating element back into a resting position, at 1614. The robotic device can then determine that execution is complete (1617: YES) and generate a specialized model of the skill based on the information it captured during the two user demonstrations, at 1638.

Other examples of interactive learning session can include adapting a navigation action, e.g., to navigate through a specific hallway and/or doorway, as discussed above.

In some embodiments, a user (or robotic device) can modify a model for a skill after the skill is demonstrated and/or a model for the skill is generated. For example, a user can iterate through keyframes captured during a demonstration of the skill and determine whether to keep, modify, and/or delete those keyframes. By modifying and/or deleting one or more keyframes, the user can modify a model for the skill generated based on those keyframes. Examples of using iterative and adaptive versions of keyframe-based demonstrations are described in the article entitled "Trajectories and keyframes for kinesthetic teaching: a human-robot interaction perspective," authored by Akgun et al., published in Proceedings of the 7th Annual ACM/IEEE International Conference on Human-Robot Interaction (2012), pp. 391-98, which is incorporated herein by reference. As another example, an interactive graphical user interface ("GUI") can be used to display keyframes captured during a demonstration of a skill to a user such that the user can indicate how much variance associated with a position, orientation, etc. of the components of the robotic device is acceptable during a planned execution. Examples of using a GUI with keyframes are described in the article entitled "An Evaluation of GUI and Kinesthetic Teaching Methods for Constrained-Keyframe Skills," authored by Kurenkov et al., published in IEEE/RSJ International Conference on Intelligent Robots and Systems (2015), accessible at http://sim.ece.utexas.edu/static/papers/kurenkov_iros 2015.pdf, which is incorporated herein by reference. These examples enable modification of a model for a skill after the skill is learned. Systems and methods described herein further provide a learning template that enables a robotic device to plan and execute certain parts of the skill while leaving other parts of the skill to user demonstration during an on-going execution of the skill. Moreover, systems and methods described herein provide a robotic device that can determine when to collect data and/or request demonstration of a part of a skill, e.g., autonomously or based on information provided to the robotic device in advance of the learning process.

FIG. 17 depicts a process for learning an environmental constraint. As noted above, a robotic device can be configured to learn an environmental constraint, which may be applicable to a set of skills that are learned and/or executed in a setting including the environmental constraint. At 1650, the robotic device can optionally prompt a user for a selection of a type of constraint and/or an object associated with the constraint. The constraint type can be, for example, a barrier (e.g., a wall, a surface, a boundary), a size and/or dimension, a restricted area, a location of an object, a time constraint, etc. At 1652, the robotic device can receive a selection of a constraint type and/or object. Optionally, at 1654, a user (or other robotic device) can guide the robotic device through a movement to demonstrate the environmental constraint. For example, a user can demonstrate the size of a supply bin to a robotic device by moving a manipulating element of the robotic device along one or more edges of the bin. As another example, a user can demonstrate a location of a shelf by moving a manipulating element of the robotic device along a surface of the shelf. During a movement of the robotic device, the robotic device can capture information associated with the constraint using one or more sensors (e.g., camera, laser, tactile, etc.), at 1656. At 1658, the robotic device can store the captured information associated with the environmental constraint for use with models of any skills executed in a setting including the environment constraint. In some embodiments, the robotic device may include the information associated with the environmental constraint in each model for a skill that is executed in the setting. Alternatively, the robotic device can be configured to reference the information associated with the environmental constraint when planning and/or executing a skill in the setting. In some embodiments, the environmental constraint may be added to a representation of the environment (e.g., representation and/or map 600).

In some embodiments, the robotic device can learn the environmental constraint without requiring a user demonstration or movement of the robotic device. For example, after receiving a selection of a constraint type and/or object, at 1652, the robotic device can be configured to scan the environment for relevant information associated with the environmental constraint, at 1656. In some embodiments, the robotic device can present the information that it captures and/or determines to be relevant to the environmental constraint to a user such that the user can confirm and/or modify what information is relevant to the environmental constraint. The robotic device can then store the relevant information, at 1658.

In some embodiments, the robotic device can use a transport element (e.g., wheels or tracks) to move about an environment and learn one or more environmental constraints. For example, the robotic device can move through a corridor or hallway, e.g., while undergoing a demonstration and/or executing a skill, and learn that the corridor is busy during certain time frames. In some embodiments, the robotic device can learn and associate various environmental constraints and/or behaviors with different conditions (e.g., time, location, etc.). For example, the robotic device can recognize that a corridor is busy based on information collected by its sensor(s), user input, and/or information derived from sensed information (e.g., during a demonstration and/or execution of a skill). As another example, the robotic device can determine that it should respond with a "hello" or "good night" at different times of day when a user enters a particular room.

In some embodiments, the robotic device can learn environmental constraints autonomously and interactively. For example, the robotic device can acquire an initial set of environmental constraints by moving through an environment (e.g., moving through a corridor or hallway), at 1658. A user (e.g., a robot supervisor or local user) can review the constraint and determine whether to adjust the constraint by directly modifying the constraint and/or via demonstration, at 1659. For example, some constraints can be provided through an interaction with the robotic device (e.g., a demonstration), while other constraints (e.g., a location of an object such as, for example, a distance a shelf extends from a wall) can be provided through an input (e.g., to a user interface such as, for example, user interface 240).

Figure 18:
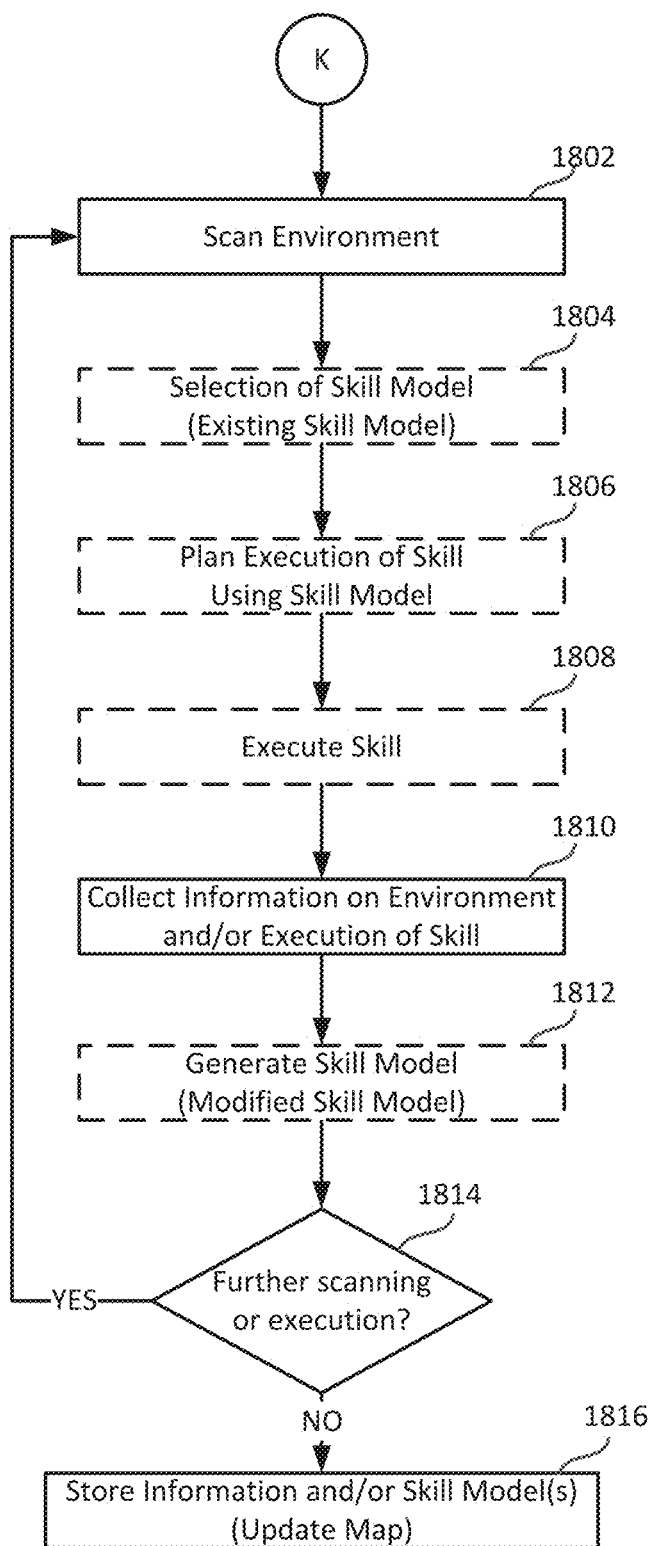
FIGS. 18-20 depict flow diagrams illustrating example learning behaviors of a robotic device, according to some embodiments.

In some embodiments, the robotic device can learn via exploration. FIG. 18 is a flow diagram depicting an example method of learning through exploration. The robotic device can scan an environment and collect information on the environment and/or objects within the environment, at 1802. Optionally, based on the information the robotic device has collected, the robotic device can determine to explore the environment by executing a skill. To execute the skill, the robotic device can select an existing skill model, at 1804, plan the execution of the skill using the skill model, at 1806, and execute the skill, at 1808. For example, the robotic device can scan an environment and identify a doorway. The robotic device can determine to execute a skill including steps of opening a door and moving through the doorway. At 1804, the robotic device can select an existing skill model that it has been provided and/or learned to navigate through doorways. At 1806, the robotic device can generate a plan for opening the door and moving through the doorway using the existing skill, e.g., according to a process similar to the process discussed with reference to FIG. 10. And at 1808, the robotic device can execute the skill according to the generated plan. While executing the skill, the robotic device can collect information on the environment and/or its execution of the skill, and compare such information to information collected during previous interactions with doorways, at 1810. The robotic device can evaluate, based on this comparison, whether its interaction with the doorway was a success or failure (e.g., based on success criterion, as described above). The robotic device can optionally generate a skill model that is specific to the doorway based on its execution of the skill, at 1812.

In some embodiments, the robotic device may initiate execution of a skill and determine that user input is required to further complete the skill. For example, as described above with reference to FIG. 16, the robotic device can initiate the execution of a skill and, upon reaching a part of the skill that the robotic device cannot determine how to execute, solicit user input to build on its execution of the skill.

In some embodiments, the robotic device may execute a skill and determine that its execution has failed. For example, the robotic device can plan and/or execute a movement through a doorway but detect that it was not able to move through the doorway (e.g., due to a failed attempt to open the door or navigate across a tight doorway). The robotic device can determine to scan the environment again (1814: YES), and then re-plan and re-execute the skill, at 1806-1808. In some embodiments, the robotic device may select a different skill (e.g., a skill more specific to a tight doorway), at 1804, and then re-plan and re-execute based on the different skill. The robotic device can continue to learn via exploration by re-sensing, re-planning, and re-executing a skill until the robotic device determines that it has met a certain objective (e.g., successfully executed the skill a predetermined number of times or ways, learned sufficient information regarding the environment, etc.). At 1816, the robotic device can store the information it has collected of the environment and/or objects within the environment and optionally any models that it has adapted or generated based on executing skills within the environment.

In some embodiments, the robotic device may engage in learning by exploration with user input. For example, the robotic device can explore a particular environment and/or execute one or more skills in that environment to learn more information about that environment. While the robotic device is exploring, a user (e.g., a remote supervisor or a local user) can provide inputs to the robotic device based on information that the user perceives and/or learned about the environment (e.g., directly by being in the environment and/or through the robotic device). The user can then provide one or more inputs into the robotic device that further guide its exploration of the environment. For example, a robotic device that encounters a doorway may plan one or more movements to navigate through the doorway. The robotic device, upon executing the movements, may fail to navigate through the doorway. A user can view the failed attempt by the robotic device and provide input(s) into the robotic device to guide the robotic device in a second attempt to navigate through the doorway. For example, the user can determine that the doorway is a tight doorway and indicate to the robotic device that it should seek a nearby user or robotic device to first open the door before navigating through the doorway. The robotic device, upon receiving the user input, can then seek a user to open the door before navigating through the doorway.

In some embodiments, the robotic device can learn via user input by receiving information regarding an environment and/or objects within the environment from a user, or receiving initial sets of models, rules, etc. from a user. In some embodiments, a robotic device may initially learn a skill through a demonstration (e.g., as described above with reference to FIG. 11) and learn to adapt that skill based on a user input. For example, a robotic device can learn a skill for moving a supply from a first location to a second location and then dropping off the supply at the second location. During a user demonstration of the skill, the user can indicate to the robotic device that dropping off the supply at the second location requires specific information unique to an environment or situation. The user can later provide inputs to the robotic device specifying, for different supplies and/or different locations, the unique information that the robotic device should observe while dropping off the supply. For example, the user can provide information regarding a tag or a marker that identifies where the robotic device should drop off the supply.

Figure 19:
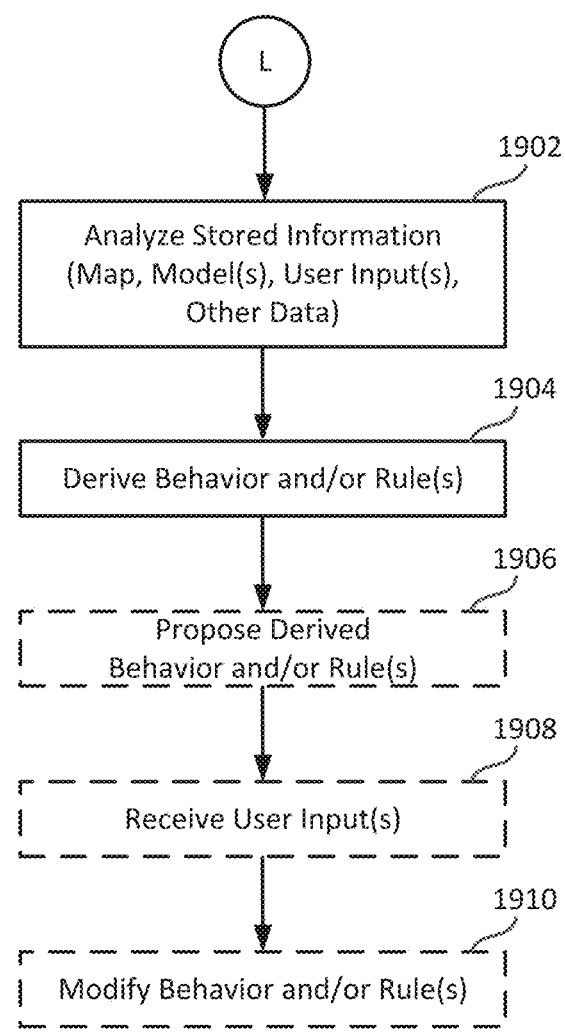

In some embodiments, the robotic device can learn behavior or rules (e.g., arbitration algorithm(s) 362, as described above) based on stored information and/or user inputs. FIG. 19 is a flow chart of an example method of robotic learning of behavior and/or rules. The robotic device can analyze stored information (e.g., map(s), model(s), user input(s)), at 1902. The robotic device can derive behavior and/or rules based on its analysis of stored information, at 1904. For example, a user (e.g., robot supervisor or local user) can define a rule for a robotic device to be more conversational when more humans are near the robotic device. The robotic device may determine, based on its analysis of stored information, that more humans are near it during a certain time of day (e.g., around lunchtime). Therefore, the robotic device may further derive that it should be more conversational during that time of day. In some embodiments, the robotic device can automatically implement this behavior as a new rule. Alternatively, the robotic device can propose being more conversational at that time of day as a new rule to the user, at 1906. The robotic device can receive a user input in response to proposing the rule, at 1908. For example, the user may view the rule on a local and/or remote display of the robotic device and select to accept or reject it. Based on the user input, the robotic device can modify its behavior and/or rules, at 1910. For example, if the user indicates that the rule is acceptable, the robotic device can store the new rule and implement it in the future. Alternatively, if the user indicates that the rule is acceptable but with a further tweak or change (e.g., being more conversational around lunchtime but only in a cafeteria), then the robotic device can adapt the rule and store the adapted rule for future implementation.

Figure 20:
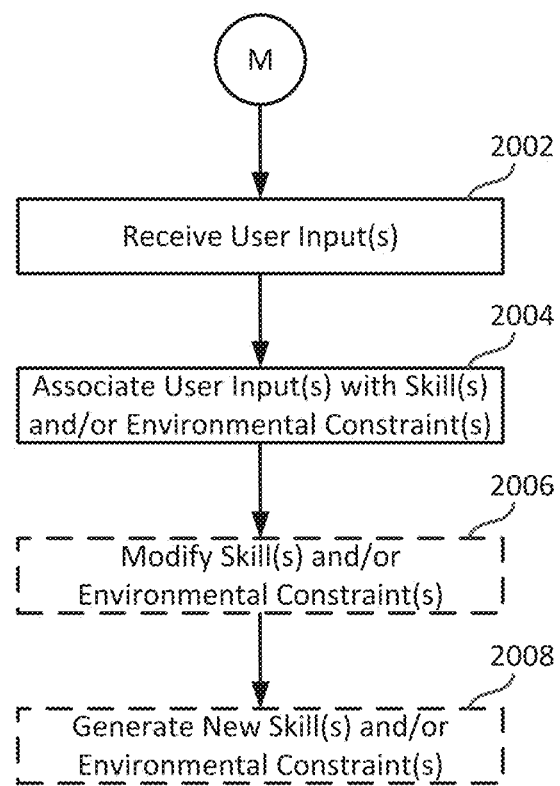

In some embodiments, the robotic device can learn a skill and/or environmental constraint by adapting an existing skill and/or environmental constraint based on a user input. FIG. 20 is a flow diagram of an example method of adapting a skill and/or environmental constraint based on a user input. The robotic device can receive a user input, at 2002. The robotic device can associate the user input with one or more skill(s) and/or environmental constraints, at 2004. Such association can be based on, for example, a further input by the user (e.g., the user specifying the skill and/or environmental constraint that the input relates to) and/or a derivation by the robotic device (e.g., the robotic device determining that such an input is associated with a particular skill or environmental constraint based on one or more rules, attributes, etc. associated with the input and/or particular skill or environmental constraint. For example, a user can provide a robotic device with new information for identifying an object, such as a QR code, a barcode, a tag, etc. The user can specify that this new information is for a particular object, and the robotic device can associate the new information with that object. The robotic device can further associate the new information for that object with one or more skills that involve interactions with that object, e.g., a grabbing or moving skill. The robotic device can optionally modify and/or generate a skill or environmental constraint based on the input, at 2006-2008.

In some embodiments, the robotic device can enable a user to retroactively label information associated with a skill and/or environmental constraint. For example, the robotic can present a skill or environmental constraint to a user, e.g., via a user interface (e.g., user interface 240) and/or a remote interface. The user can select to add, modify, and/or remove a label associated with the skill or environmental constraint, and such input can be received at the robotic device, at 2002. The robotic device can then associate the input with the skill or environmental constraint, at 2004, and modify and/or generate a new skill or environmental constraint based on the input, at 2006-2008.

FIG. 21 depicts an example of information that flows from and feeds into a map 2120 (e.g., a map of a building such as, for example, a hospital). The map 2120 can be stored and/or maintained by one or more robotic devices, such as any of the robotic devices as described herein. The map 2120 can be similar to map 600, as depicted in FIG. 6. For example, the map 2120 can include one or more layer(s) 2122 such as, for example, a navigation layer, a static layer, a dynamic layer, and a social layer.

The map 2120 can provide information that a robotic device can use while operating in a learning mode 2102 or an execution mode 2112. For example, a robotic device operating in the learning mode 2102 can access the map 2120 to obtain information regarding environmental constraint(s), object(s), and/or social context(s) (e.g., similar to state information 332, object information 340, environmental constraint(s) 354, etc.). Such information can enable the robotic device to determine a location of object(s), identify characteristic(s) of object(s), analyze one or more environmental constraint(s), select skill model(s) to use, prompt user(s) for input(s), etc., as described herein. Additionally or alternatively, a robotic device operating in the execution mode 2112 can access the map 2120 to obtain information regarding environmental constraint(s), object(s), and/or social context(s), and use that information to evaluate an environment, arbitrate between different behaviors or skills, determining which skills to execute, and/or adapt behavior or skills to suit a particular environment.

A robotic device operating in the learning mode 2102 can also provide information that adds to and/or changes information within the map 2120. For example, the robotic device can incorporate sensed information 2104 (e.g., information collected by one or more sensor(s) of the robotic device) and/or derived information 2106 (e.g., information derived by the robotic device based on, for example, analyzing sensed information 2104) into the map 2120. The robotic device can incorporate such information by adding the information to the map 2120 and/or adapting existing information in the map 2120. Additionally, the robotic device operating in the execution mode 2112 can provide information (e.g., sensed information 2114, derived information 2116) that adds to and/or changes information within the map 2120.

As an example, a robotic device undergoing a demonstration (e.g., such as that depicted in FIGS. 11 and 16) of how to navigate through a doorway can collect information during the demonstration that feeds into the layer(s) 2122 of the map 2120. The doorway can be a specific doorway that exists at various locations throughout a building, e.g., as represented in the map 2122. Characteristics and/or properties of the doorway can be recorded by various sensors on the robotic device and/or derived by the robotic device based on sensed information. For example, the robotic device can sense a size of the doorway and determine that the doorway is a tight doorway. The robotic device can add this information regarding the doorway to the map 2120, e.g., using one or more semantic labels, as raw or processed sensor information, as a derived rule, etc. The robotic device can also use the information to adapt a contextual layer of the map (e.g., a social or behavioral layer of the map, e.g., such as social layer 630 depicted in FIG. 6). For example, the robotic device can determine to engage in specific behavior(s) and/or action(s) based on the doorway being a tight doorway, including, for example, going through the doorway when the doorway has been opened by a user (or other robotic device(s)) instead of going through the doorway following and/or alongside a user (or other robotic device(s)), seeking a specific user familiar with the doorway to assist the robotic device with navigating through that doorway (e.g., by holding open the doorway and/or guiding the robotic device through various action(s)), etc.

In some embodiments, the map 2120 can be centrally maintained for one or more robotic devices described herein. For example, the map 2120 can be stored on a remote compute device (e.g., a server) and centrally hosted for a group of robotic devices that operate together, e.g., in a hospital. The map 2120 can be updated as information (e.g., sensed information 2104, 2114 and derived information 2106, 2116) is received from the group of robotic devices as those robotic devices operate in learning mode 2102 and/or execution mode 2112, and be provided to each of the robotic devices as needed to execute actions, behavior, etc. As individual robotic devices within the group learn new information such that one or more layer(s) 2122 of the map 2120 are adapted, this information can be shared with the other robotic devices when they encounter a similar environment and/or execute a similar skill (e.g., action, behavior). In some embodiments, a local copy of the map 2120 can be stored on each robotic device, which can be updated or synchronized (e.g., at predetermined intervals, during off hours or downtime) with a centrally maintained copy of the map 2120. By regularly updating the map (e.g., with newly collected information, such as sensed information 2104, 2114 and derived information 2106, 2116) and/or sharing the map between robotic devices, each robotic device can have access to a more comprehensive map that provides it with more accurate information for interacting with and/or executing skills within its surrounding environment.

In some embodiments, the map 2120 can be a mixed initiative map where information (e.g., environmental constraint(s), rule(s), skill(s), etc.) can be learned (e.g., during learning 2102 and/or execution 2112) and/or provided by a user (e.g., via user input 2130). For example, the robotic device can build on the map 2120 by incorporating information directly given by a user (e.g., a robot supervisor or local user), learned through demonstration and/or execution, or interactively provided through a combination of demonstration and/or execution and user input (e.g., requested by a robotic device about an interaction in real-time or retroactively). For example, a user can indicate to a robotic device that it should move slower through a region on the map 2120 (e.g., a narrow or busy hallway). In some embodiments, the robotic device can present a map to the user, and the user can draw the region on the map and indicate that the robotic should move slower through that region. The robotic device may attempt moving through the region on the map 2120 for a number of times, and learn that the region should be avoided at certain times of day (e.g., due to overcrowding). Alternatively or additionally, the robotic device can encounter a new situation that the robotic device is not familiar with handling autonomously (e.g., the hallway being sectioned off). In such instances, the robotic device can communicate with a user (e.g., a robot supervisor and/or local user) to gain more information about the region and/or determine how to navigate around the region. When requesting the user's input, the robotic device can ask broadly regarding the situation and/or provide a list of examples for a user to label (e.g., to enable the robotic device to autonomously derive an appropriate behavior). In some embodiments, the robotic device can detect and/or derive information regarding a region without user input, and propose one or more rules associated with that region to a user for confirmation. In some embodiments, a user, upon viewing a proposed rule and/or other information from a robotic device, can modify the rule and/or other information before accepting it. FIG. 19, described herein, provides a more detailed description of such a process.

Robotics devices as described herein can be configured to perform behaviors or skills that include a navigation component and a manipulation component, such as, for example, navigating through a door. In particular, robotic devices as described herein can navigate to, open, and navigate through doors. As discussed above, a robotic device can be taught skills such as navigating through doors, prior to the robotic device executing the skills (referred to herein as a "pre-execution phase"). While the following processes are described with respect to navigating through a door, it can be appreciated that such processes can be applied to other behaviors or skills that require navigation and/or manipulation. For example, in some embodiments, the processes described herein can be applied to pressing one or more elevator buttons, for example, to open an elevator. In particular, such processes can be used to generate plans for executing various behavior or skills (e.g., a cache of plans for executing a behavior or skill) when the robotic device is offline (e.g., in a pre-execution phase), such that the robotic device can quickly retrieve those plans for executing when the robotic device is operating live.

Figure 22:
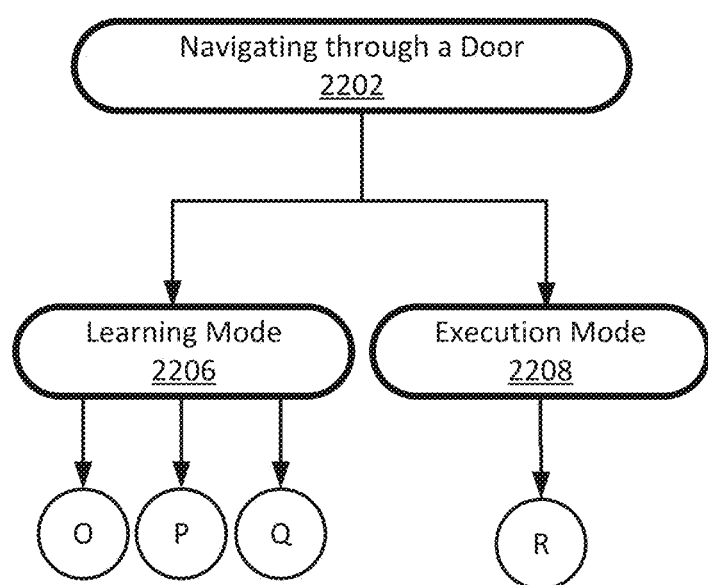
FIG. 22 is a flow diagram that depicts different learning modes and execution modes for a robotic device for navigating through doors, according to some embodiments.

FIG. 22 is a flow diagram that depicts different processes through which a robotic device (e.g., any of the robotic devices described herein including, for example, robotic device 102, 110, 200, 500, etc.) can learn how to navigate through doors and execute navigation through doors. In some embodiments, the robotic device can be configured to use semantic data relating to a door and surrounding environment to determine a trajectory or plan for opening and navigating through a door. The robotic device can be configured to undergo learning (e.g., at learning mode 2206) prior to executing the navigation (e.g., in a pre-execution phase). While operating in learning mode 2206, a robotic device can associate semantic data to doors and the surrounding environment. For instance, the robotic device can associate fiducials, door device pose, reference pose, collision primitives, plan groups, target pose, a combination thereof, as further described below with a doorway or door. The robotic device can generate and save cached plans as described in FIGS. 23-25 based on the semantic data to navigate through the doorway. Then while operating in execution mode 2208, the robotic device can quickly access and execute the cached plans to open and/or navigate through a door. The robotic device can execute the cached plans as described in FIG. 26. Additionally or alternatively, a robotic device can implement fast button pushing (e.g., by accessing cached plans) to navigate through a door. Further details of such processes are described below.

In the learning mode 2206 (e.g., prior to executing the skill of navigating through a door and/or in the pre-execution phase), a robotic device can undergo learning and/or teaching of semantic data associated with a door. For example, the robotic device can undergo learning of fiducials, reference poses, static obstacles, arm motions, and/or button pushing (e.g., fast button pushing) as further described below. In some embodiments, the robotic device can undergo learning and/or teaching using a guided teaching tool as described herein.

The robotic device can learn information (e.g., semantic data) associated with a door based on the type of door that the robotic device has to navigate through. For instance, in some embodiments, a robotic device can open, access, and/or navigate through automatic doors. An automatic door can be a door that can open upon activation of one or more of a radio-frequency identification (RFID) scanner, wave sensor, and/or button. For example, the door may be opened upon activation of an activation device. FIG. 28 illustrates example variations of activation devices. For example, 2730a illustrates an example RFID scanner. An example wave sensor is shown as wave sensor 2730b in FIG. 28. Similarly, an example button is shown in FIG. 28 as button 2730c. Since FIG. 28 illustrates example variations of activation devices, by extension, FIG. 28 also illustrates example variations of different door types. For each type of activation device, the robotic device can execute a stored plan that indicates to the robotic device the type of manipulation required by the robotic device to activate the activation device (e.g., scan a RFID badge, push a button, etc.) to open the door.

Figure 29:
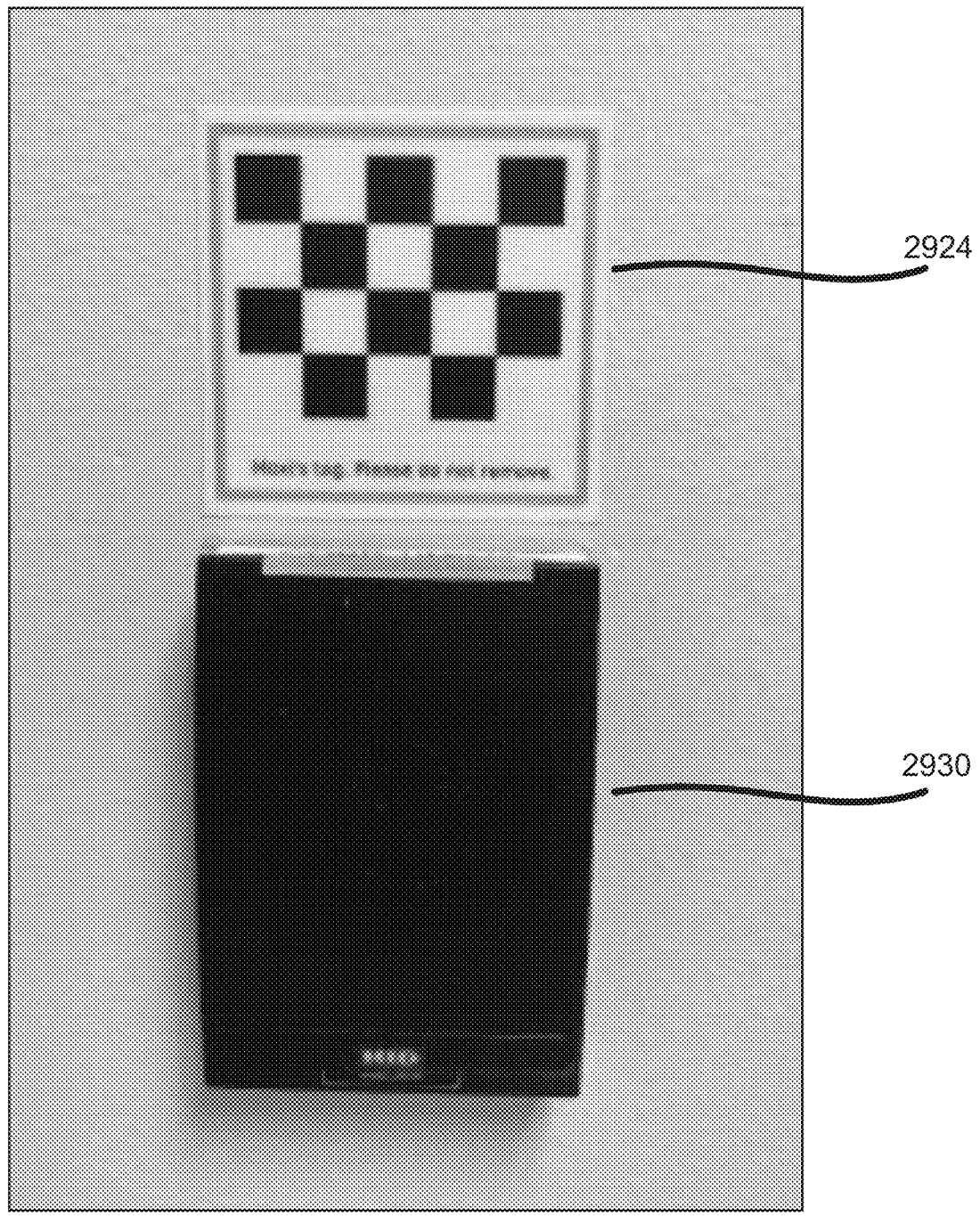
FIG. 29 illustrates an example fiducial tag that is placed near an activation device, according to some embodiments.

In some embodiments, to teach a robotic device to activate an activation device, a marker such as a fiducial tag can be placed near the activation device. FIG. 29 illustrates an example fiducial tag 2924 that is placed near (e.g., above) an activation device 2930 (e.g., structurally and/or functionally similar to RFID scanner 2730a in FIG. 28). Although, FIG. 29 illustrates the fiducial tag 2924 as being placed above the activation device 2930, it should be readily understood that the fiducial tag 2924 can be placed in any suitable position near the activation device 2930. For example, in some embodiments, the fiducial tag 2924 can be placed below the activation device 2930. Additionally or alternatively, the fiducial tag 2924 can be placed to the right of or to the left of the activation device 2930. In some embodiments, instead of using a fiducial tag as a marker, the marker can be the activation device itself. In some embodiments, data for opening different doors (e.g., data for opening multiple doors) can be stored and accessed by the robotic device as shared manipulation data. In some embodiments, to use shared manipulation data, the fiducial tag 2924 can be placed in the same location relative to the activation device 2930 across multiple doors. In other embodiments, to use shared manipulation data, the fiducial tag 2924 can be placed in different locations relative to the activation device 2930 across multiple doors. In still other embodiments, to use shared manipulation, instead of placing a fiducial tag near the activation device 2930, the activation device 2930 can itself be used as the marker. In some embodiments, the back of a fiducial tag can include an adhesive (e.g., glue). The fiducial tag 2924 can be attached to the wall by peeling back on the fiducial tag 2924 and placing it on the wall. In some embodiments, the fiducial tag 2924 can be placed within a predetermined distance from the activation device 2930, e.g., at a distance of between about 0 cm (i.e., on the device) and about 30 cm from the activation device 2930. It should be readily understood that the activation device 2930 is shown to be an RFID scanner in FIG. 29 solely for illustrative purposes. The fiducial marker 2924 can be placed near any suitable activation device such as activation devices described in FIG. 28. While examples herein are provided with respect to opening a door, it can be appreciated that such can be extended to other types of activation devices and buttons, e.g., for activating and/or controlling devices other than a door.

As discussed above, the marker to teach a robotic device to activate and/or trigger an activation device can be activation device itself. For example, instead of placing a fiducial tag or any other type of physical marker near the activation device, the robotic device can be configured to identify the activation device (e.g., based on object information, as described with reference to FIG. 3) and register the activation device itself as a marker for teaching the robotic device to activate an activation device and for execution of the activating the activation device. The process of obtaining an representation of an environment and identifying one or more marker(s) within that environment (e.g., the activation device) can be implemented based on method 700, as described with reference to FIG. 7.

In addition to example door types, described herein are example information (e.g., semantic data, pose data, object data, or manipulation data) that can be used to teach door manipulation to the robotic device so that the robotic device can open, access, and/or navigate through an automatic door. The object/pose/manipulation data can be stored on an onboard memory of the robotic device and/or on a remote storage device (e.g., at a remote compute device such as compute device 150 in FIG. 1 or server such as server 120 in FIG. 1). In some embodiments, the data can be stored in a data structure or file (e.g., a corresponding field of a data structure) associated with a particular door and/or task. In some embodiments, the stored data and/or files can refer to other data and/or files stored in different libraries, e.g., associated with different cached plans, keyframes, etc.

In some embodiments, data for opening different doors (e.g., data for opening multiple doors) can be stored more efficiently as shared object/pose/manipulation data. For example, instead of different sets of object/pose/manipulation data being stored for each door within an environment, one set of object/pose/manipulation data can be stored for a plurality of doors within the environment when such doors are substantially similar or the same. This can allow a robotic device to store more data (and therefore be equipped to traverse more doors) onboard without having to rely on downloading data from a network resource (e.g., a server), which can slow down the operation of the robotic device and/or be unreliable.

Figure 30:
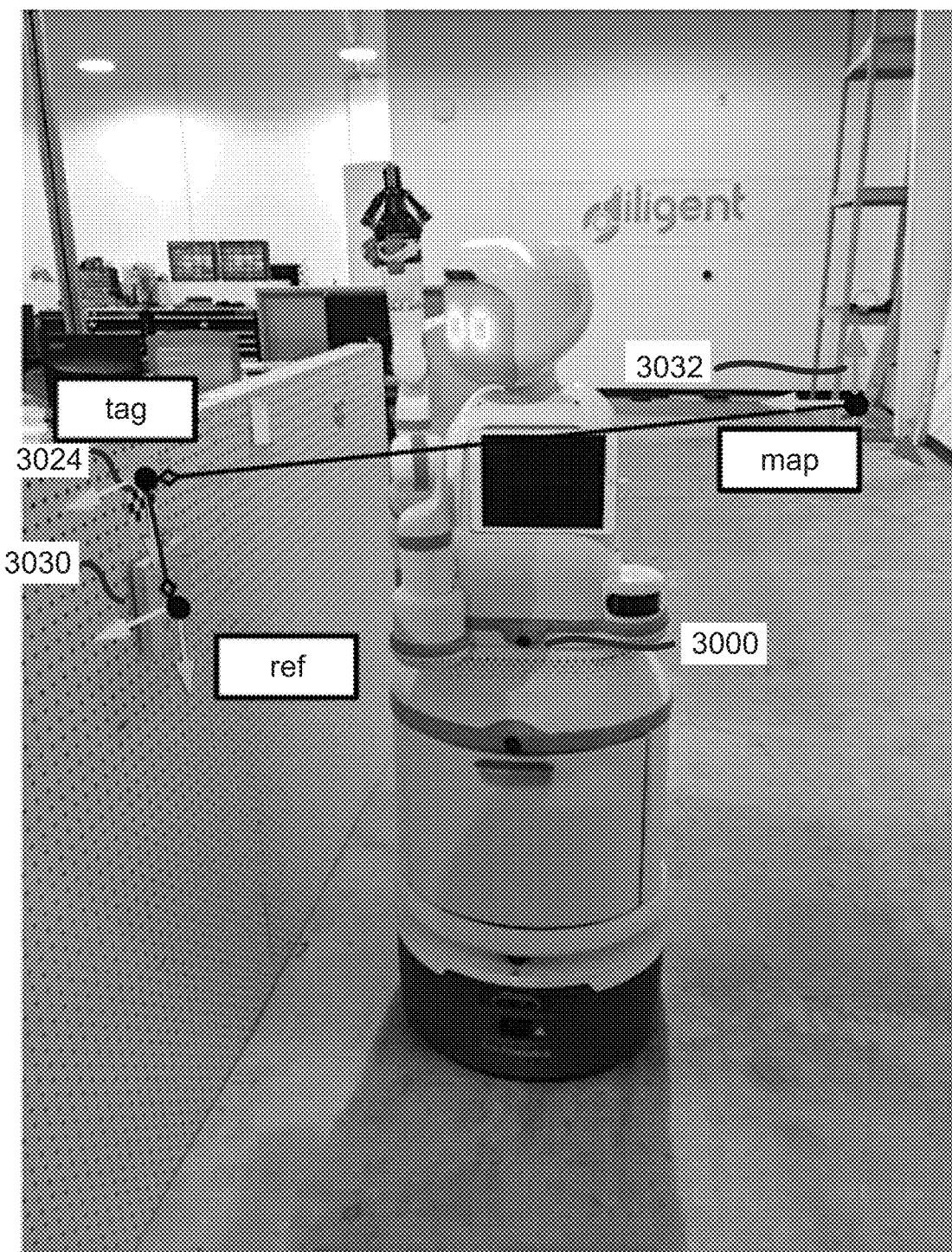
FIG. 30 illustrates an example fiducial, according to some embodiments.

Example object/pose/manipulation data associated with a door can include fiducial, door device pose, reference pose, collision primitive, plan group, target pose, manipulation, a combination thereof, and/or the like. In some embodiments, a fiducial can be a pose of the fiducial tag (e.g., fiducial tag 2924 in FIG. 29) associated with an activation device (e.g., activation devices 2730a, 2730b, and 2730c in FIG. 28), with respect to a map of the environment (e.g., map 600 in FIG. 6). For example, if the robotic device is operating in a hospital environment, a fiducial can be a pose of the fiducial tag with respect to the map of the hospital. In some embodiments, a door device pose can be a pose of the activation device (e.g., activation devices 2730a, 2730b and 2730c in FIG. 28), with respect to a map of the environment (e.g., map 600 in FIG. 6). FIG. 30 illustrates an example fiducial and a door device pose, according to some embodiments. For example, FIG. 30 includes an example fiducial tag 3024. The fiducial tag 3024 is positioned near (e.g., above) an activation device 3030. FIG. 30 depicts the fiducial tag 3024 with respect to a central coordinate system or origin of a map 3032. FIG. 30 also depicts the activation device 3030 with respect to the central coordinate system or origin of a map 3032.

Figure 31:
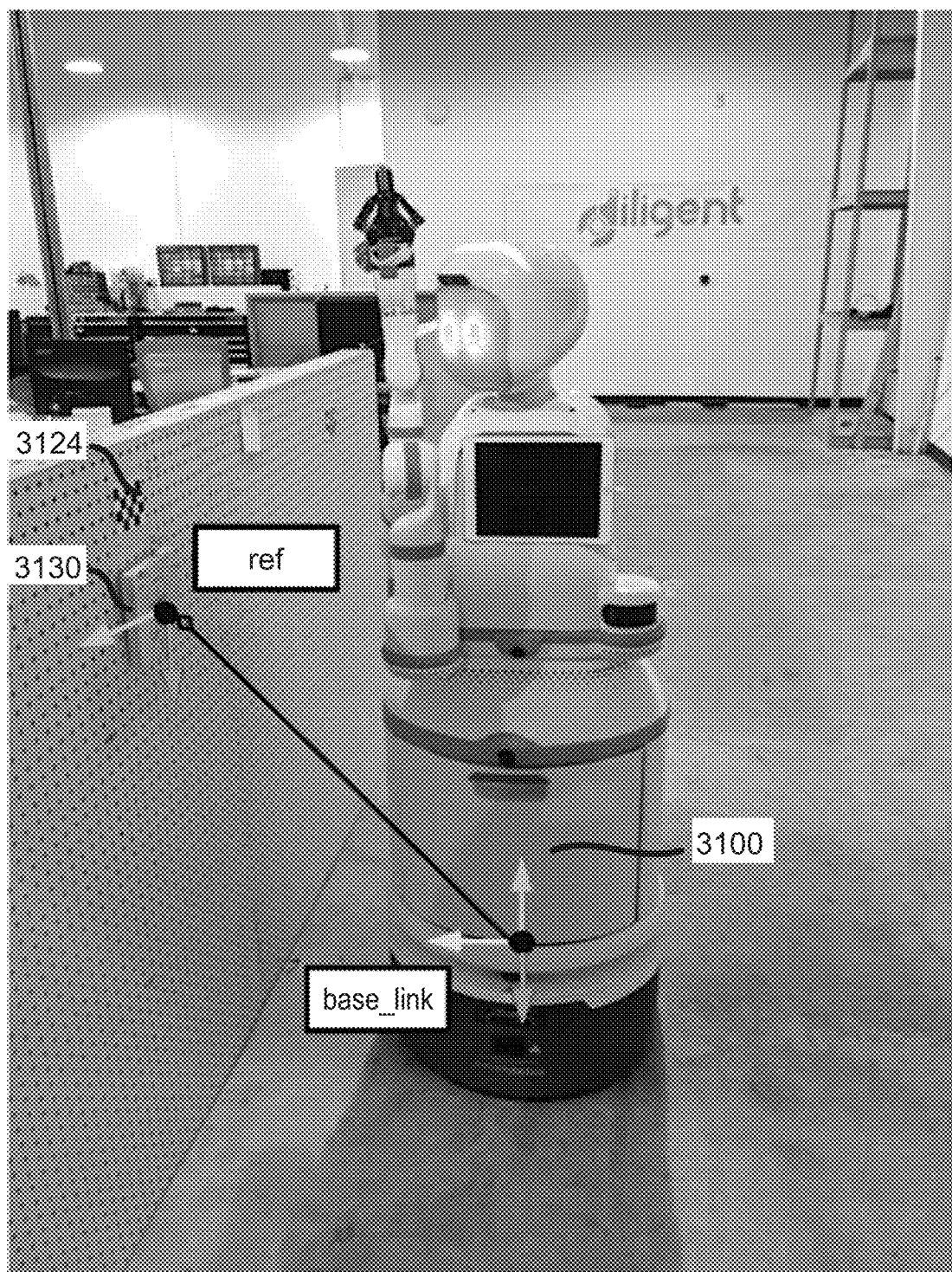
FIG. 31 illustrates an example reference pose, according to some embodiments.

In some embodiments, a reference pose with respect to the robotic device's base link (e.g., a link associated with a location of a base of the robotic device) can be associated with an activation device (e.g., activation devices 2730a, 2730b, and 2730c in FIG. 28). FIG. 31 illustrates an example reference pose, according to some embodiments. For example, FIG. 31 includes an example fiducial tag 3124. The fiducial tag 3124 is positioned near (e.g., above) an activation device 3130. FIG. 31 depicts the activation device 3130 with respect to a base link 3100 of the robotic device.

Figure 27A:
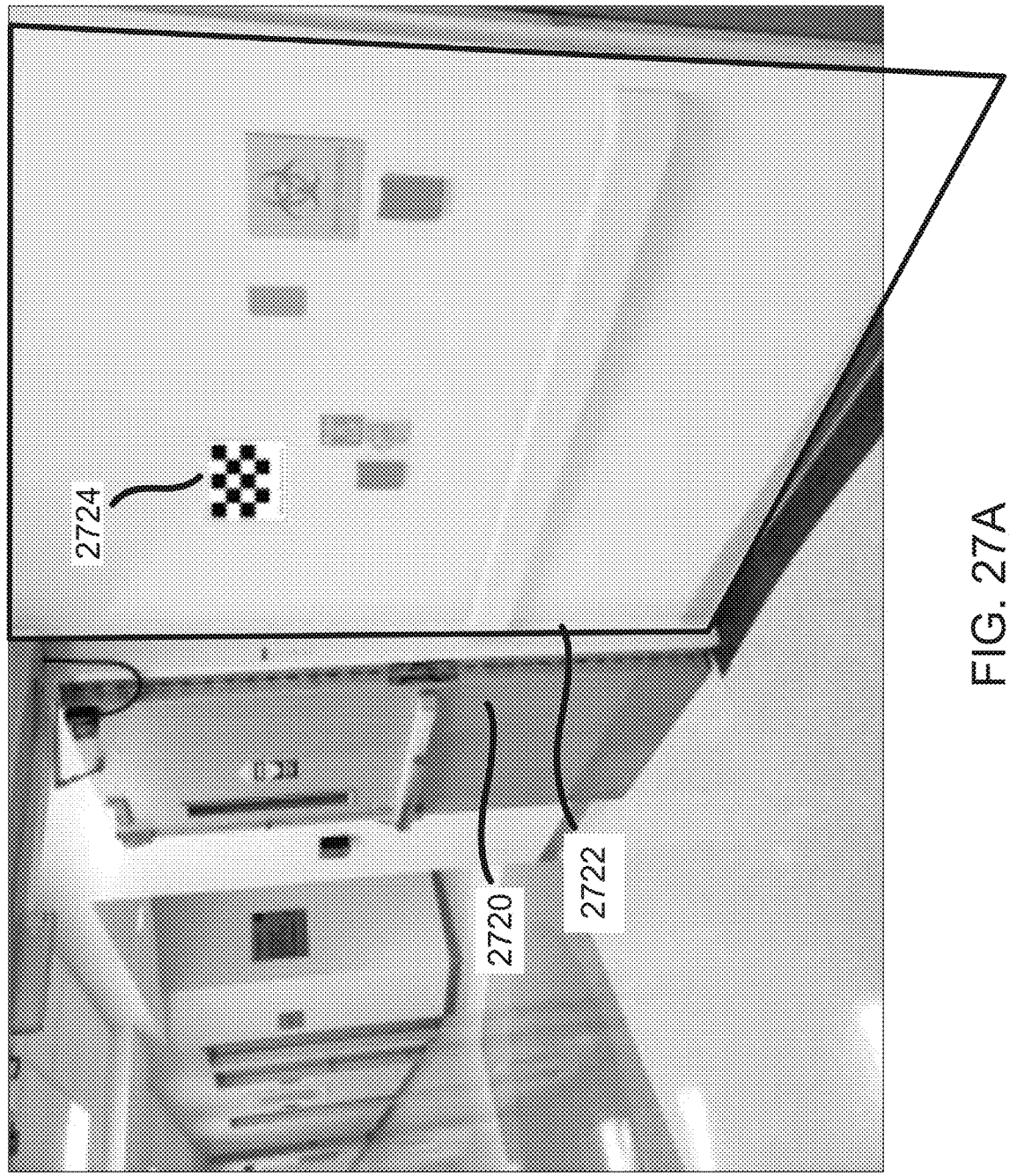
FIGS. 27A-27D depict approaches for building or loading an obstacle model, according to some embodiments.
Figure 27B:
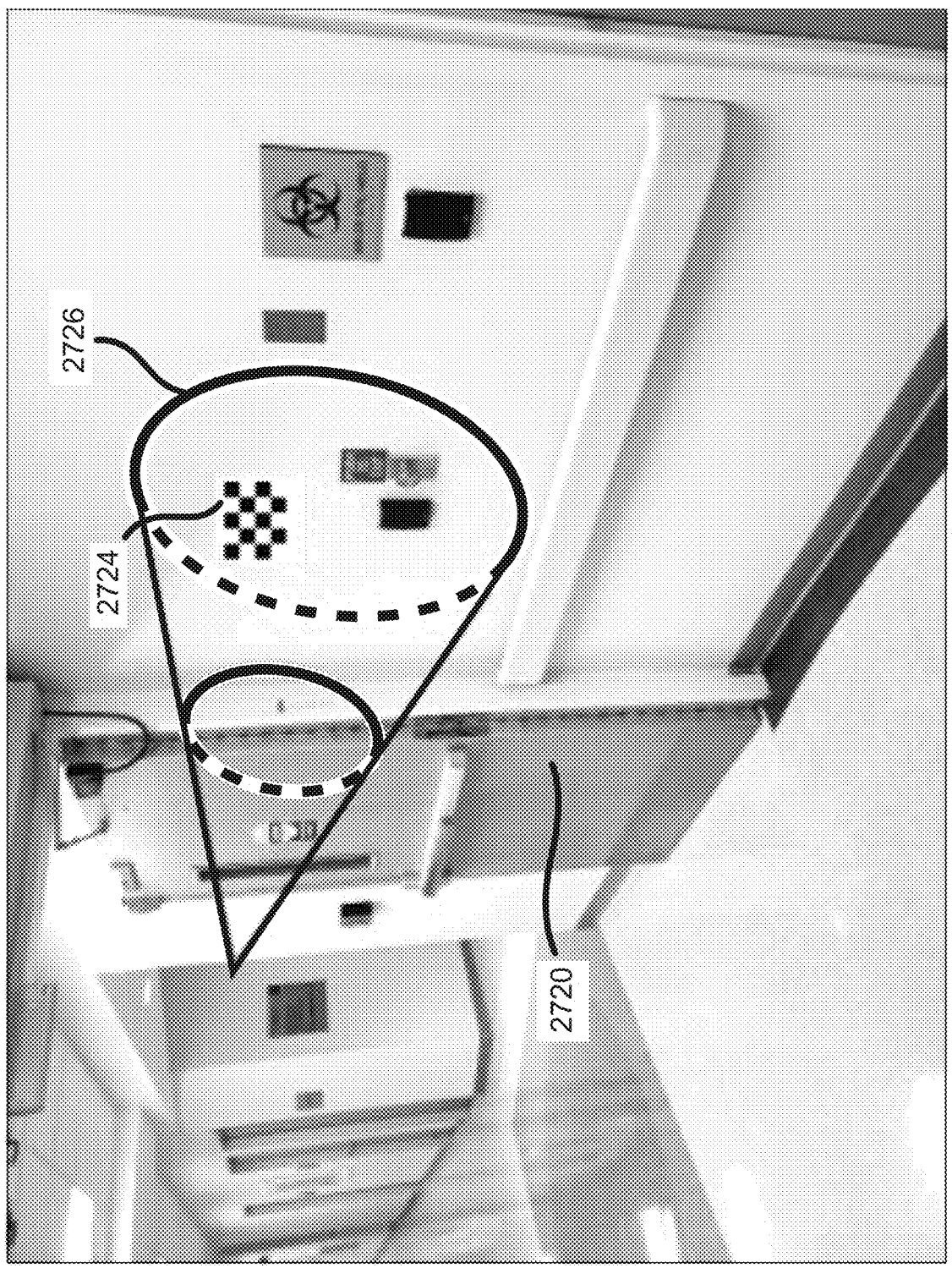
Figure 27C:
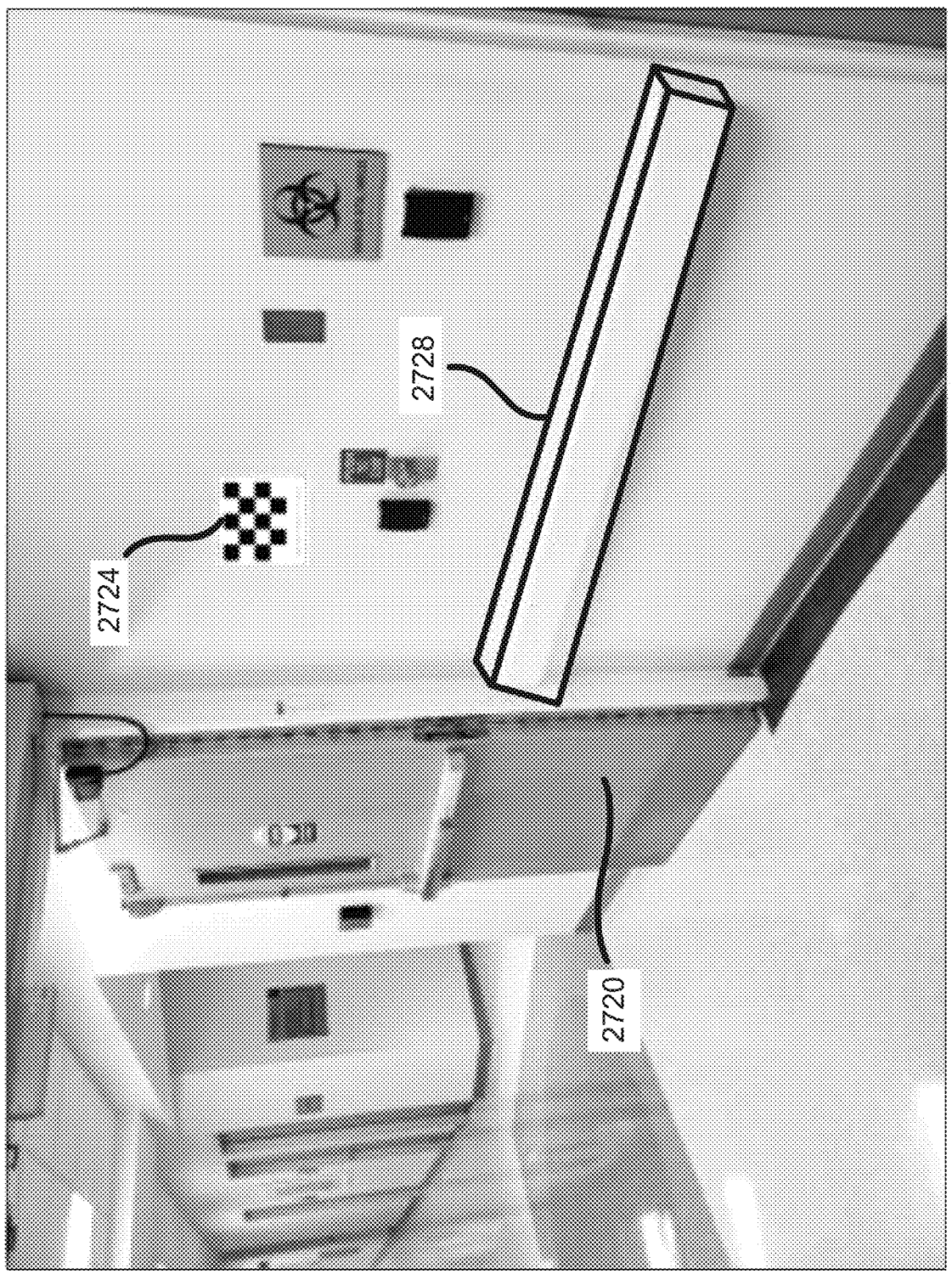
Figure 27D:
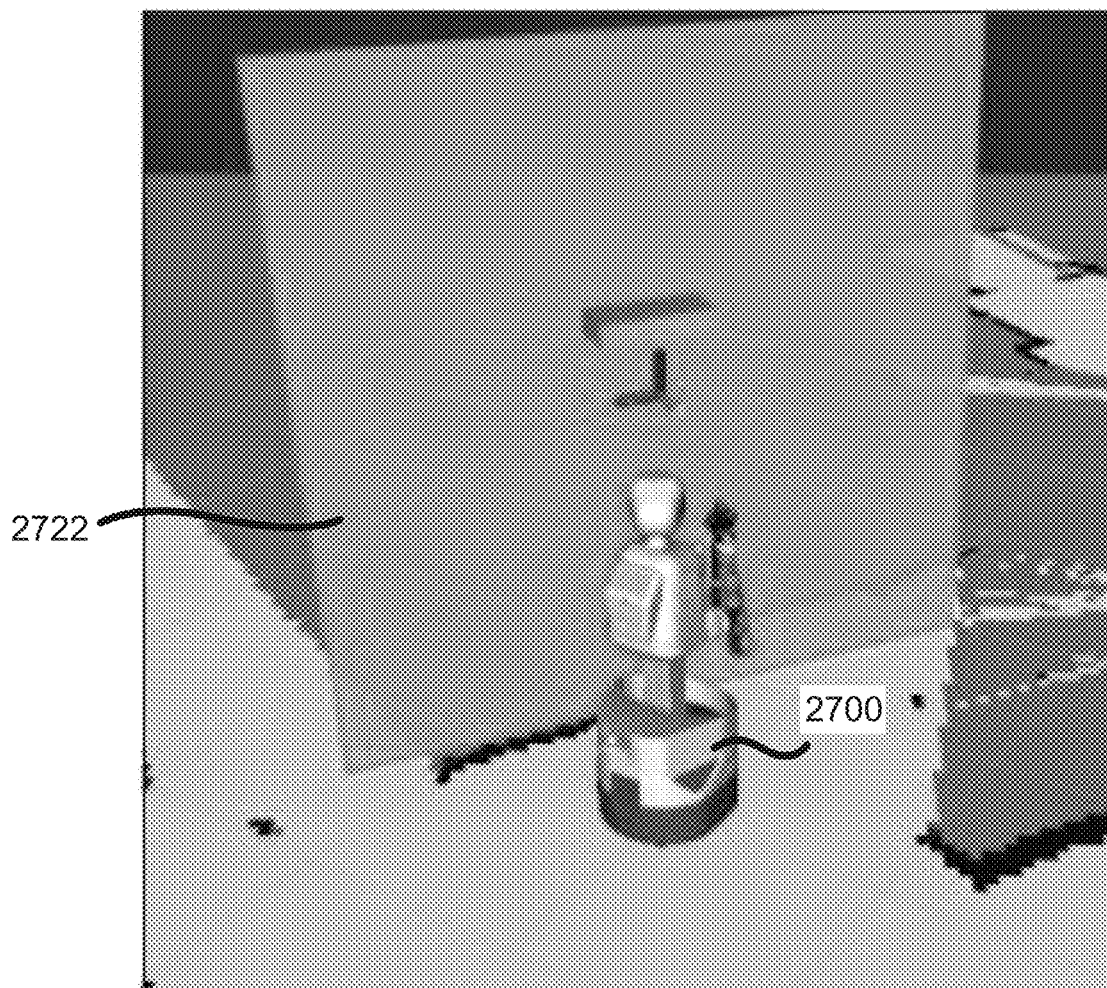

In some embodiments, a collision primitive can represent a set of obstacles on the wall with the activation device (e.g., activation devices 2730a, 2730b, and/or 2730c in FIG. 28). These sets of obstacles can be large obstacles on the wall. For example, collision primitives can represent obstacles such as fire extinguishers, devices on the wall such soap dispensing devices, hand sanitizer dispensing devices, etc., protrusions on the wall such as large balancing rods (e.g., protrusion 2728 in FIG. 27C), etc., a combination thereof, and/or the like that are on the wall along with the activation device. Examples of collision primitives can be coordinate data such as bounding boxes that represent the spatial location and geometric parameters of various objects.

In some embodiments, a plan group or plan cache can be a set of manipulation plans that are associated with a doorway. A plan group can reference a set of manipulation plans (e.g., including keyframes), as saved in libraries that are associated with the plans. In some embodiments, each plan within a plan group can be associated with a base-tag-end effector configuration (e.g., the relative positioning between the base of a robotic device, the fiducial tag or object marker, and the end effector or manipulation device of the robotic device), such that a plan can be selected according to base-tag-eef configuration during teaching to make teaching easier.

In some embodiments, a target pose can be a pose of an end effector (e.g., gripper on the robotic device's arm) of a robotic device, at the end of a manipulation. For example, the target pose can be a pose of the end effector on or near the activation device (e.g., pose at the end of a manipulation that can activate the activation device). The target pose can be stored relative to the coordinate frame of the fiducial tag (e.g., coordinate frame of 3024 shown in FIG. 30), coordinate frame of the activation device (e.g., coordinate frame of 3030 shown in FIG. 30 and/or coordinate frame of 3130 shown in FIG. 31), and/or other suitable coordinate frames for manipulation. In some embodiments, manipulation data can be set by a doorway file's manipulation field. While learning to navigate through a door and executing navigation through a door is described herein with reference to fiducial tags, it can be appreciated that any object, marker, symbol, tag, etc. within an environment can be used by the robotic device for localization.

Figure 23:
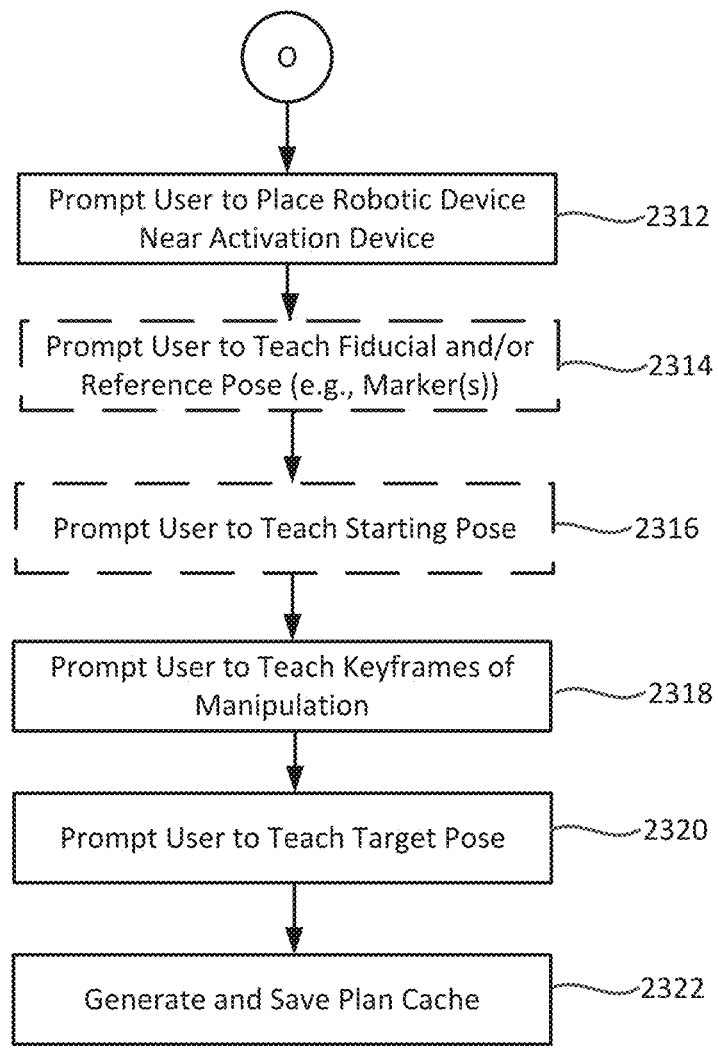
FIG. 23 is a flow diagram that depicts a shared teaching scenario, according to some embodiments.
Figure 24:
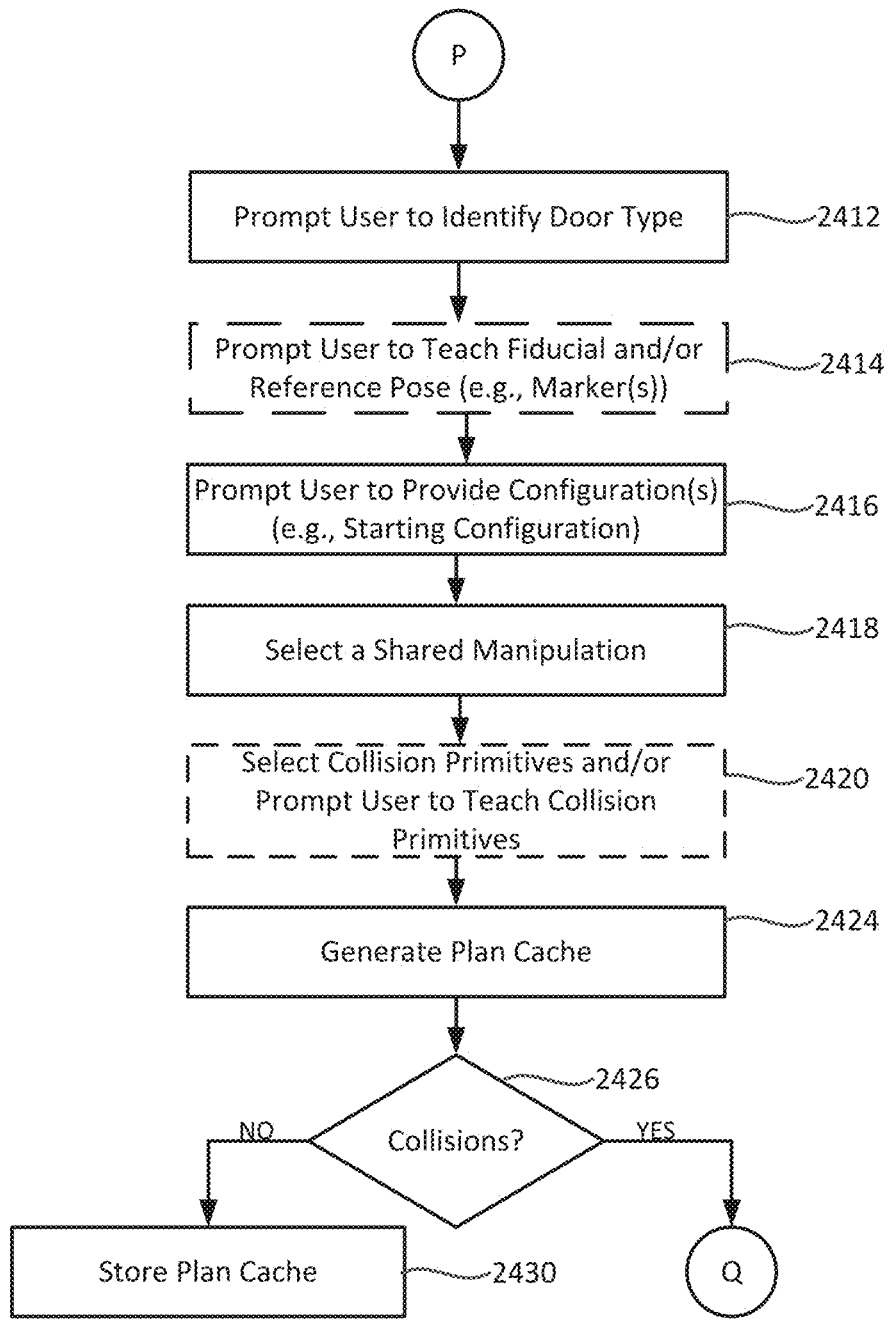
FIG. 24 is a flow diagram depicting a guided teaching scenario, according to some embodiments.
Figure 25:
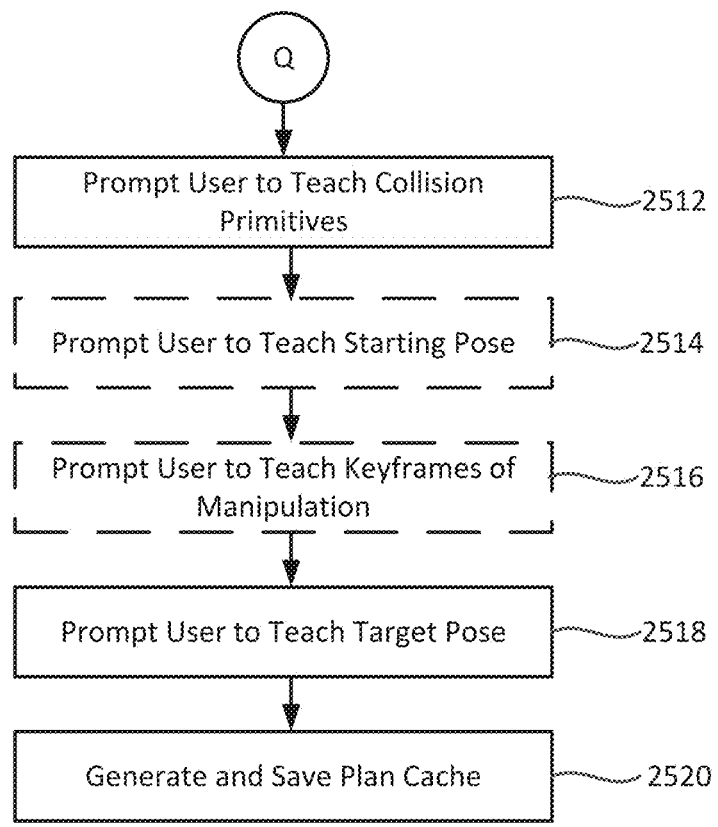
FIG. 25 is a flow diagram depicting a site-specific teaching scenario, according to some embodiments.

As discussed above, FIGS. 23-25 depict flow diagrams that illustrate various avenues through which a robotic device (e.g., robotic device 100, 200, and/or 500) can generate and save cached plans, e.g., to navigate through a doorway. For instance, FIGS. 23-25 depict flow diagrams that illustrate various learning or teaching scenarios that enable a robotic device to navigate through a doorway. In some embodiments, each of the teaching scenarios can be mediated via a state machine (e.g., a guided teach door state machine). In some embodiments, a user can guide the robotic device through the teaching scenarios. For example, the guided teach door state machine can be launched when the learning mode is initiated. The guided teach door state machine can be provided a doorway identifier (e.g., an identifier associated with a door to be navigated) by the user as an input. The guided teaching state machine can provide instructions and prompts to a user (e.g., on a display of the robotic device or a remote compute device) that instructs the user through various steps of the teaching process and can allow the user to provide data to the guided teaching state machine. It should be readily understood that although the teaching or learning scenarios disclosed herein are described as being implemented via a state machine, any suitable architecture may be used to mediate the teaching scenarios. For instance, any suitable model (e.g., computational model) can be used to mediate the teaching scenarios.

Figure 32:
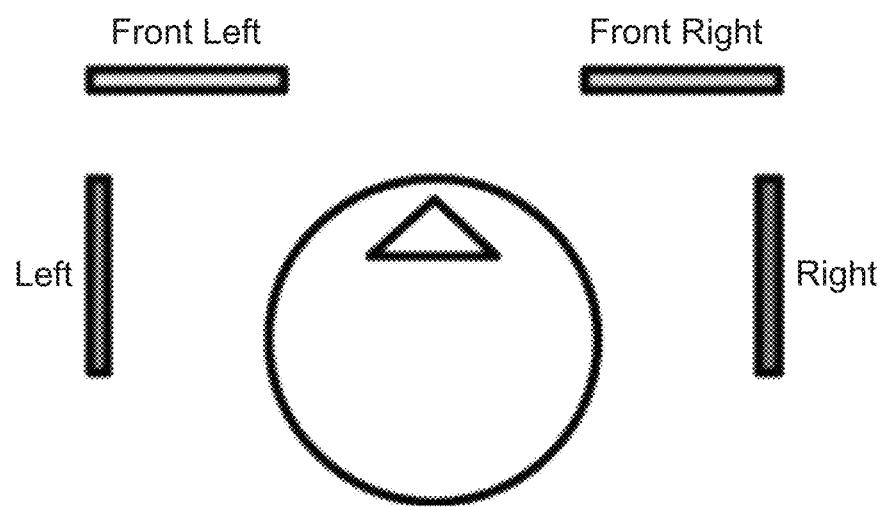
FIG. 32 depicts example fiducial tag locations relative to the robotic device, according to some embodiments.
Figure 33:
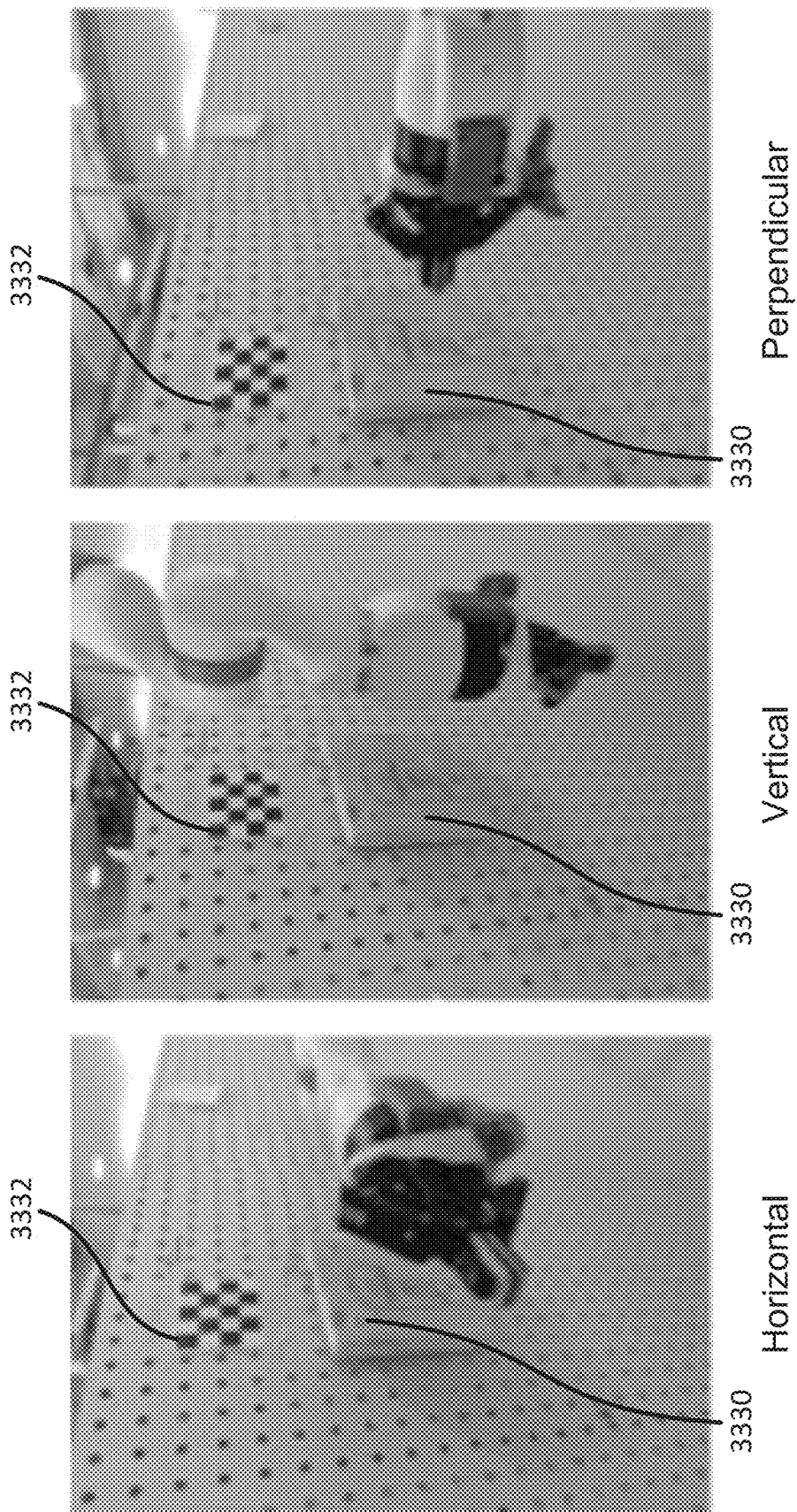
FIG. 33 depicts example orientations of the end effector relative to the fiducial tag, according to some embodiments.

FIG. 23 is a flow diagram depicting a shared teaching scenario, according to some embodiments. The shared teaching scenario can teach the manipulation data to activate the activation device for a particular base of a robotic device, fiducial tag or marker, door device pose, and end effector (referred to herein as "base-tag-eef" or "base-marker-eef" configuration). The resultant manipulations can be applicable across multiple doorways and sites. In embodiments that include a fiducial tag, the fiducial tag can be positioned in any suitable position relative to the activation device. The location of the fiducial tag can be determined relative to the robotic device. FIG. 32 depicts some non-limiting example fiducial tag locations relative to the robotic device. For example, there can be four fiducial tag locations relative to the robotic device, e.g., right, left, front right, and front left. In a similar manner, possible orientations of the end effector relative to the fiducial tag can be determined. FIG. 33 depicts example orientations of the end effector relative to the fiducial tag 3332. As seen in FIG. 33, in some embodiments, the fiducial tag 3332 can be placed above the activation device 3330. There can be multiple orientations of the end effector relative to the fiducial tag 3332, e.g., horizontal orientation, vertical orientation, and perpendicular orientation. These manipulation data can be shared to cover a plurality of scenarios across multiple doorways and sites.

Referring back to FIG. 23, at 2312, the robotic device (e.g., via the guided teach door state machine) can prompt the user to place the robotic device in position near the activation device (e.g., 2730a, 2730b, and/or 2730c) such that the robotic device can reach the activation device. For example, the guided teach door state machine can prompt the user to place the robotic device in position near the activation device such that the robotic device does not hit the wall or another obstacle/object during the positioning. In some embodiments, the robotic device can prompt the user to point a sensor, such as a camera on the robotic device, to capture the location of the fiducial tag (e.g., fiducial tag 2934) relative to the base of the robotic device.

At 2314, the robotic device can optionally prompt the user to teach fiducials (e.g., pose of the fiducial tag with respect to the map of the environment), objects (e.g., physical characteristics of objects or markers within the environment), and/or reference poses (e.g., pose of the activation device with respect to the robotic device's base link). In some embodiments, the fiducials and the reference pose can be used optionally to teach a starting pose or starting configuration (e.g., at 2316), such as, for example, a base-tag-eef configuration. At 2316, the robotic device can optionally prompt the user to teach a starting pose. The starting pose can be a pose of the end effector (e.g., gripper on the robotic device's arm) of the robotic device, upon being positioned near the activation device and prior to starting the manipulation (e.g., activating the activation device). For example, the starting pose can be the pose of the end effector before the end effector begins to activate the activation device. In some embodiments, the starting pose for the robotic device can be determined based on the fiducials and the reference pose determined at 2314 when the robotic device has been positioned near the activation device. In some embodiments, the starting pose can be the initial position of the end effector relative to the fiducial tag once the robotic device has been positioned near the activation device (e.g., at 2312). In some embodiments, the starting pose can be a first keyframe (e.g., pre-linear motion pose) for manipulation. As such, after the robotic device learns the fiducial, markers, and/or reference poses at 2312, the robotic device can be configured to learn a set of keyframes associated with manipulation skill, at 2318. In some embodiments, the robotic device can register the starting pose, the fiducials, and/or the reference pose, after the starting pose has been determined and/or taught to the robotic device.

At 2318, the robotic device (e.g., via the guided teach door state machine) can learn key frames for manipulation (e.g., keyframes for activating the activation device). For example, the guided teach door state machine can prompt the user to teach the keyframes for manipulation using similar techniques as depicted and described with reference to FIG. 11. For instance, the user can demonstrate to the robotic device the manipulation required to trigger the activation device. The robotic device can obtain sensor data from one or more sensors at multiple keyframes during the demonstration by the user. In some embodiments, the motion between keyframes can involve movement of transport element and/or manipulating element of the robotic device. At 2320, the robotic device can learn the target pose. The target pose can be the pose of the end effector at the end of the manipulation (e.g., at the end of activating the activation device). For example, the guided teach door state machine can prompt the user to teach the target pose by putting the end effector in contact with the activation device. In some embodiments, the robotic device can register the target pose after the target pose has been determined and/or taught to the robotic device. In the case that the activation device is a button (e.g., button 2730c), teaching the robotic device the target pose need not include teaching the robotic device to push the button. Put differently, the target pose can be the end effector contacting the button as opposed to pushing the button. The displacement needed to push the button can be handled by the robotic device during the execution mode. Therefore, shared teaching scenario can teach the arm motion for the robotic device such that the robotic device can activate the activation device. The arm motion can involve movement of the arm from the starting pose through the keyframes to the target pose. In some embodiments, a user can check if the robotic device can smoothly perform the linear motion from the last keyframe by manually moving the arm through a linear motion.

At 2322, after the keyframes are taught, a plan cache can be generated. During generation of the plan cache, the robotic device can simulate different starting poses (e.g., starting pose at 2316). For example, the robotic device can simulate different base location, arm location, and/or configurations (e.g., base-tag-eef configurations) upon being positioned near the activation device and prior to starting the manipulation. In some embodiments, the robotic device can be configured to sample different base-tag-eef configurations based on a random sampling algorithm. For each starting pose and/or for each base-tag-eef, the robotic device can generate motion between keyframes such that the robotic device does not produce collisions and/or does not collide with any obstacle, while activating the activation device. Therefore, in some embodiments, multiple plans can be generated for the same door for different starting poses. In some embodiments, each plan can be associated with the corresponding starting pose. In some embodiments, each plan can be associated with the corresponding base-tag-eef. In some embodiments, the plan cache generated for a door can be associated with the door. Once the plan cache has been generated, the robotic device can save the plan cache on an onboard memory of the robotic device and/or on a remote storage device (e.g., another compute device or database as described herein). In some embodiments, after teaching the shared manipulation, the user can run the manipulation one or more times to ensure that the robotic device is capable of performing the manipulation given different starting poses or configurations. For example, the robotic device can be placed at different start locations (e.g., start base-tag-eef configurations) for different runs to test the robustness of the saved plan cache.

FIG. 24 is a flow diagram depicting a guided teaching scenario, according to some embodiments. As discussed in FIG. 23, shared manipulations can be applicable to multiple different doorways and sites. If the robotic device encounters a new doorway, in some embodiments, the guided teaching process implemented by the robotic device can associate a previously taught shared manipulation (e.g., shared manipulation taught using the shared manipulation teaching scenario) with the new doorway.

As discussed above, when the guided teach door state machine is initiated or implemented by the robotic device, the user can provide an identifier for the doorway as input. At 2412, the guided teach door state machine can prompt the user to provide the doorway identifier. For example, the guided teach door state machine can provide different door types that the user can select from. The different door types can be associated with different activation devices, different door sizes, etc., as discussed with reference to FIG. 28.

At 2414, the robotic device (e.g., via the guided teach door state machine) can optionally prompt the user to teach the fiducials and the reference poses (e.g., such as in 2314). The guided teaching scenario does not involve teaching the manipulation itself. Instead, the guided teaching process can associate a previously taught shared manipulation with a new doorway. Therefore, since the guided teaching scenario does not involve teaching the manipulation itself, the placement of the robotic device when teaching the fiducial may not be important. Put differently, it may not be necessary to position the robotic device near the activation device (e.g., as in 2312) during the guided teaching process.

At 2416, the robotic device (e.g., via the guided teach door state machine) can prompt the user to provide starting configurations for the robotic device. For example, the guided door state machine can prompt the user to provide the location of the fiducial tag relative to the robotic device. Similarly, the guided door state machine can prompt the user to provide the orientation of the end effector relative to the fiducial tag. The location of the fiducial tag relative to the robotic device and the orientation of the end effector relative to the fiducial tag can be used to determine the base-tag-eef configuration for the robotic device.

At 2418, for the determined base-tag-eef configuration, a previously taught shared manipulation (e.g., a plan cache) can be selected to activate the activation device. For example, for a given base-tag-eef, a plan cache associated with the base-tag-eef generated and saved during shared teaching scenario can be selected.

At 2420, the user can optionally select collision primitives and/or the guided teach door state machine can optionally prompt the user to teach collision primitives. For example, the guided teach door state machine can prompt the user to place the tip of the end effector at the center of the obstacle. The guided teach door state machine can then prompt the user to enter the obstacle (e.g., by pressing an enter button on a display) when the user is ready to save the obstacle as a collision primitive. In some embodiments, the guided teach door state machine can prompt the user to provide the length, height, and/or other geometric or spatial features of the obstacle. In some embodiments, the width (or other geometric or spatial features) of the obstacle can be inferred from the placement of the end effector.

Additionally or alternatively, the guided teach door state machine can prompt the user to teach large obstacles, such as obstacles that may be out of the robotic device's field of view and/or obstacles that may be in the way of arm motion of the robotic device. The user can be guided to use one or more sensors of the robotic device to obtain information of the obstacle, e.g., similar to learning an environmental constraint, as described above. Some examples of large obstacles can include large metal rods protruding from the wall, soap dispensing device, hand sanitizer dispensing devices, fire extinguishers, etc. The wall itself need not be taught as a collision primitive since the wall is assumed to be present during teaching and execution of the manipulation. In some embodiments, smaller obstacles near the activation device may not be taught as a collision primitive. For example, door button for the physically challenged (e.g., handicap door button), exit button, etc. may not be taught as a collision primate. This is because these smaller obstacles are handled during the execution mode as further described below.

At 2424, a plan cache can be generated. For example, a previously generated plan cache during shared manipulation can be associated with the new doorway identifier. The robotic device can generate motion between keyframes based on the plan cache (e.g., plan cache associated with the new doorway identifier). If the robotic device encounters collisions (e.g., at 2426), one or more plans within the plan cache can be regenerated (e.g., modified) to avoid collisions. For example, one or more plans within the plan cache can be regenerated (e.g., modified) based on the collision primitives. If the robotic device does not encounter collisions, the plan cache can be stored (e.g., at 2430) on an onboard memory of the robotic device and/or on a remote storage device. In some embodiments, the plan cache can be associated with the new door/new doorway and/or the new doorway identifier. If the robotic device continues to encounter collision, the method can transition to site-specific teaching scenario as discussed in FIG. 25. Put differently, a check or validation can be performed to ensure that the selected plan cache does not collide with obstacles. If collisions are detected (e.g., either in a live execution or in simulating the movements of a plan within the cache), one or more plans within the plan cache can be regenerated based on the taught collision primitives. If regeneration fails, the guided teach door state machine can transition to site-specific teaching scenario. In some embodiments, if the regeneration fails, a user can be prompted to open the new door. In such scenarios, one or more sensors can obtain data as the user is opening the door and can use the data to generate a plan if the robotic device were to encounter the door at a later time.

FIG. 25 is a flow diagram depicting a site-specific teaching scenario, according to some embodiments. If a shared manipulation has not been taught for a particular base-tag-eef configuration, the robotic device (e.g., via the guided teach door state machine) can use the shared teaching process described in FIG. 23 to teach the shared manipulation. If a shared manipulation for the particular base-tag-eef configuration already exists but the doorway is new, the robotic device (e.g., via the guided teach door state machine) can select the guided teaching process described in FIG. 24. However, if applying the guided teaching scenario fails, the robotic device (e.g., via the guided teach door state machine) can transition to site-specific teaching scenario.

The site-specific teaching scenario can be used when the selected manipulation using existing plans or plan caches is found to not be applicable to the new doorway (e.g., the set of plans collide with the taught collision primitives). In this case, the robotic device can learn the manipulation data specific to the new doorway. In some embodiments, the manipulation data specific to the new doorway can be learned by the robotic device via the same process as described for teaching or learning a shared manipulation with reference to FIG. 23. For example, at 2512, the robotic device can prompt the user to teach collision primitives. At 2514, the robotic device can optionally prompt the user to teach the starting pose or configuration for the robotic device and the robotic device can learn that starting pose or configuration. At 2516, the robotic device can optionally prompt the user to teach keyframes of manipulation. At 2518, the robotic device can prompt the user to teach the target pose. At 2520, the robotic device can generate a plan cache and save that on an onboard memory of the robotic device and/or on a remote storage device.

In some embodiments, a teaching tool (e.g., a software module implemented by the robotic device) can be used to implement the shared teaching scenario, guided teaching scenario, and the site-specific teaching scenario. The teaching tool can provide guidance to a robotic device for sensory input (e.g., joints, cameras, etc.). The teaching tool can be used to provide guidance in motion (e.g., physically teaching a robotic device a motion). In some embodiments, the teaching tool can provide teaching of an environment and how to represent the environment (e.g., including obstacle generation). The teaching tool described herein can include interaction learning templates, e.g., different templates for different types of doors where a robotic device selects a door type and can then use additional teaching to actively collect data in the moment to parameterize a template to an unique environment and/or door. Guided teaching tool can allow for fast execution and/or motion, e.g., with a robotic device being socially aware (e.g., human-in-the-loop active guidance e.g. using user input), sampling/caching of past motions or plans for faster and/or more socially appropriate execution of tasks (e.g., providing an extension of an interactive learning template, as described above), and sampling/caching that is generated by user input.

For example, during a pre-execution phase, a robotic device can be configured to collect samples of different starting points for performing a task (e.g., according to different distributions/sampling methods) and determine (e.g., compute or generate) a plan for executing the task given each starting point. The robotic device can store these plans (e.g., in a cache) and then when the robotic device needs to perform the task in the future, the robotic device can draw on its pre-stored plans to select one for performing the task and/or select one to adapt for performing the task. Because the robotic device had already pre-planned the execution of the task, the robotic device can more quickly select and/or adapt a specific plan for executing the task in a live scenario.

In some embodiments, a robotic device can undergo teaching or learning described herein (e.g., shared, guided, and/or site-specific) with templates. A few strategies can cover a variety of doors, such as, for example, (1) activation device (e.g., activation devices in FIG. 28) on right, left, front-right, or front-left and/or (2) pre-linear motion end effector (eef) orientation being vertical or horizontal. When an activation device is at a first position (e.g., on front right), a single keyframe (e.g., pre-linear motion pose) may be needed. When an activation device is at a different position (e.g., on front left), a second keyframe may be needed to shape the motion such that a large volume is not swept by the arm of the robotic device during execution. In some embodiments, the teaching described herein can include performing offline (e.g., not during a live execution) non-guided teaching process to generate a set of suitable plans and performing online the selection of a plan based on information sensed by the robotic device and/or user input, and using live plan generation (e.g., as described with reference to FIG. 10 and accompanying figures) if none of pre-taught plans are able to perform the skill or behavior.

In some embodiments, a robotic device can be configured to generate a plan cache. For example, a robotic device can sample around taught eef poses and joint positions, e.g., using different distribution types such as, for example, uniform, Gaussian, etc. For each sampling, the robotic device can generate a plan, e.g., according to methods described above with reference to FIG. 12. The robotic device can validate the plan by simulating its execution and evaluating whether (1) there are any collisions between robotic components and/or static objects and (2) there are any significant changes in joint movement speeds (e.g., as a result of significant joint changes). The robotic device can include planning with guided taught environment and bounding boxes that represent different static objects within the environment. The robotic device can store a plurality of viable plans relative to a localized position of the robotic device to an object. The robotic device can generate forward and reverse cache plans.

In some embodiments, the robotic device can implement plan adjustment based on one or more fiducials tags or markers. The robotic device can scan an environment as described herein and associate one or more fiducial tags or markers within the environment with one or more objects. Alternatively or additionally, the robotic device can be provided information of one or more fiducial tags or markers that associates those markers with one or more objects, e.g., such as a library of marker information.

In some embodiments, the teaching described herein can be used to teach static obstacles. When opening a door, static objects can cause door failure. For example, door opening failure can occur due to collisions with wall/objects on the wall. The live data representation that is captured by the robotic device may not be sufficient because walls/objects can be present outside of the view of the sensory capture devices of the robotic device, e.g., because they are behind the door and/or they are far from the activation device. As such, it can be important for the robotic device to account for these obstacles in planning to avoid such collisions. In some embodiments, the robotic device can be taught a tag and can be physically taught a bounding box around static obstacles. In some embodiments, the robotic device can build and/or load an obstacle model of a static local environment to use during planning. The obstacle model of the static local environment can be loaded quickly (e.g., have a small size) and can minimize robot scanning of the local environment. The obstacle model can be fast to plan and include bounding boxes, e.g., to reduce a size of the obstacle model. The obstacle model can reduce teaching effort and reduce or minimize data gathering by a robotic device per door.

Some approaches for building and/or loading an obstacle model can include: robotic device scanning to build a larger map of an environment, robotic device saving map during a teaching session for operating a door, robotic device extrudes map upwards to get wall obstacles, robotic device saves a map of the environment and extrudes map, and robotic device locates wall from tag and has a small map (e.g., of the nearby environment) and semantic data or objects within the environment (e.g., bounding boxes for objects that show boundaries of objects within environment). An example approach for building an obstacle model is depicted in FIGS. 27A-27D. In the approach using a wall from a fiducial tag with a small live map (e.g., a live video feed of the robotic device's surroundings) and such semantic data, a robotic device can generate main wall obstacle 2722 from a fiducial, e.g., the coordinate associated with the location of the fiducial tag 2724 (or other visual marker) in a map coordinate frame such as the six degrees of freedom (6DOF) location of the fiducial tag (e.g., X, Y, Z, roll, pitch, yaw) (see FIG. 27A). This can be performed live. The robotic device can then use a small region of point cloud 2726 around the fiducial tag 2724 to get a map of objects near the activation device e.g., by live scanning the small region near the activation device (see FIG. 27B). This can be performed online. In some embodiments, the robotic device may have previously saved geometric data and/or user provided data regarding a larger surrounding environment (e.g., an environment not in the live scan). This previously saved data can indicate if there are obstacles of concern far from the activation device. The robotic device can include bounding boxes such as 2728 or other markings to represent those objects (see FIG. 27C). This can be performed offline. The robotic device 2700 can then load a saved model 2722 of static object(s) within a nearby environment (e.g., including geometric data representing bounding boxes associated with the objects within the environment) (see FIG. 27D). This can be performed live. By scanning a smaller region and pulling previously stored data on the larger surrounding environment in this manner, the robotic device can reduce time required to determine an execution plan.

In some embodiments, the teaching or learning described herein can be used to teach or learn arm motions. In some embodiments, a robotic device can cache plans and receive guidance to select a plan to execute to open a door. When a robotic device attempts to open a door, the robotic device may need to use an arm (e.g., manipulating element) to interact with either a button, a scanner, or another activation device. The robotic device can therefore execute a skill such as an arm motion.

In some embodiments, the robotic device can be configured to execute skills such as an arm motion that are human legible (e.g., associated with expected human motion and not wild or unpredictable) and/or safe to execute in a human environment. For example, the robotic device can be provided criteria that defines an acceptable range or types of motion, and can adjust generated plans or plan caches based on such criteria. It can be important that the arm motions of the robotic device be taught efficiently and consistently since there are many doors in a building and/or environment (e.g., a hospital) that a robotic device may need to go through. As a result, in terms of teaching keyframes, a user teaching a robotic device the skill of opening a door must have knowledge of standards of human legible motions for a robotic arm and the workspace of the robotic arm. However, there are limitations associated with finding a user to teach with the required knowledge. For example, training a person to be good at teaching arm motions may require a significant amount of training and practicing time. Even with training, it can be hard to ensure that the quality of taught arm motions are consistent from person to person. Additionally, maintaining a set of keyframes and arm motions for each door can be expensive.

Since many doors may have similar setups, it can be valuable to take advantage of those similarities. In an embodiment, a robotic device can be operatively coupled to (e.g., in communication with) and/or store a database that includes human legible keyframes and arm plans. The robotic device can employ a validation method that validates keyframes and arm plans with respect to the workspace and the follow-up motions, such as, for example, a linear search. The robotic device can employ a querying method that retrieves arm plans using their corresponding 3D poses. With the proposed components, the quality and/or consistency of the arm motions can be ensured by having one or a few experts (e.g., trained individuals) construct the database to make sure the arm motions meet human legible standards, and by validating each of the keyframes with respect to a set of desirable kinematic properties (e.g., singularity, reachability or metrics obtained from forward simulations). The robotic device can query the same database during execution of the arm motion for a plurality of doors, e.g., to enable reusability of keyframes and/or arm plans.

The database can be constructed in two phases. In the first phase, human experts can teach keyframe/arm plans that roughly cover the workspace of the robotic arm. For example, in the first phase, the robotic device can sample 3D poses in the workspace of the arm to indicate to the human experts poses the arm needs to reach. The human expert can teach the keyframe/arm plans associated with the indication. The robotic device can validate the keyframe/arm plan using the validation method. Based on the validation result, the robotic device can discard the keyframe/arm plan or save the keyframe/arm plan to a motion library, save the corresponding 3D pose to a k-dimensional (KD) tree for quick 3D positional query, or save the corresponding validation score for real time evaluation.

In the second phase, the density of the first phase database can be increased by using the keyframes/arm plans as seeds and transfer the seeding keyframes/arm plans to fill in the holes in the workspace that may have resulted in the first phase. The second phase can include: sample 3D poses (e.g., uniformly, Gaussian, etc.) in the workspace of the arm. With the first phase database, a check can be performed to confirm if there are already keyframes/arm plans taught that are close to the sampled 3D pose. If no keyframes/arm plans are close, from the first phase database, the robotic device can retrieve keyframes/arm plans within some acceptable vicinity from the sampled 3D pose. Acceptability can depend on, for example, a size of the object that the robotic device is interacting with. For example, with an object that is approximately 3 cm, the robotic device can sample and/or select plans that are within the size of the object. The robotic device can then select a seed (e.g., the best keyframe/arm plan) from these keyframes/arm plans based on their validation scores (e.g., based on a distance between a plan's base pose (e.g., 3 DOF: x, y, theta) and the perceived base pose). The robotic device can transfer the seeding keyframe/arm plan to fit the sampled 3D pose. The robotic device can validate the transferred keyframe/arm plan. The transferred keyframe/arm plan can be added to the database.

In some embodiments, for keyframe/arm plan validation, certain arm motions can be performed to trigger the activation device after the arm is at certain keyframes. In the validation method, the follow-up motion can be forward simulated and metrics related to the smoothness of the follow-up motion can be evaluated. In some embodiments, the linear Cartesian controller can be simulated by computing the Jacobian matrix and updating the arm joint angles iteratively after each time step. The smoothness of this linear motion can be evaluated by computing the maximum joint velocities throughout the entire simulation, since that usually indicates that the arm is close to a singularity configuration. The reachability of the keyframe/arm plan can be checked by checking whether or not the arm is making progress towards the target in the simulation process.

In some embodiments, certain arm motions can be performed to trigger the activation device after the arm is at certain specific keyframes. The additional arm motion can be performed with live planning after cached motion is used to perform the arm motion. This can allow the robotic device to account for slight imperfections if any in the sampling and cache selection process by using the exact reference pose location for the final interaction movement (e.g., final movement to trigger the activation device). In some embodiments, this process can be sped up by performing the live planning during execution but prior to the arm moving. This can ensure that there is a valid live plan prior to moving the arm.

In some embodiments, systems, devices, and methods described herein can be used to run new doors onsite in an efficient and quick manner, such that an open door behavior has a high success rate. Such embodiments may be designed to require less or minimal knowledge of a manipulation stack. Door opening success can be determined by evaluating whether the robotic device can smoothly execute a final linear motion given error in a base position.

In some embodiments, a robotic device can implement fast button pushing (e.g., button pushing that is executed in a relatively short period of time). In order to minimize obstruction to humans in the environment (e.g., hospital staff) and increase the overall speed of executing tasks, a robotic device may need to be able to open scan/button automatic doors quickly. In some embodiments, a single plan for manipulation and/or cache and index plans for various fiducial tag poses relative to the robot can be used to increase speed. As a safety measure, an impedance controller for the arm can also be used. These approaches can produce a reduction in overall manipulation time.

Under the single plan approach, performing the scan/push behavior involves executing three plans in succession: moving from a navigation pose to a prepare pose, moving from the prepare pose to the interact pose (e.g., a predefined or "x" cm perpendicular to the fiducial tag), and optionally moving linearly from the interact pose until the activation device is triggered.

In some embodiments, planning is interleaved between the different phases. This means that the arm accelerates and decelerates as it transitions between plans. Sometimes, there can be additional delays due to sending and processing multiple plans. One approach to increase speed can be to perform a single plan that removes the acceleration and deceleration portions. Planning holistically in this manner can result in a planning time speed reduction. In some embodiments, planning of a trajectory can be done offline. Therefore, even if there is a speed reduction, it is not experienced online.

Under the plan caching approach, time savings can be obtained by removing online planning (e.g., having offline planning). In some embodiments, online planning can be performed for a portion of the scan/push behavior to account for imperfect navigation. For example, a robotic device may not land in the exact location it was trained for a behavior. The plan therefore can be adjusted according to the pose of the fiducial tag or other reference marker (e.g., door device pose). The fact that the manipulation target (e.g., activation device) does not require precise accuracy, however, can be exploited by moving at least a portion of the planning offline. Different poses can be sampled, the adjustments for those samples can be performed, and these plans can be indexed by the pose offline. With a sufficient amount of sampling, a desirable manipulation online can be achieved by selecting and executing the plan with the nearest pose to the perceived one. These plans can be validated to be collision-free using a static out-of-view obstacle model and live map. If the cached plan is not collision-free or the perceived pose is too far from the nearest pose in the database, live online planning can be performed instead.

Systems, methods, and devices described herein can implement a single plan for manipulation and plan caching as described below.

For the single plan approach, plans saved from the keyframe sequence stop at each keyframe can be used, and multiple saved plans moving from different poses (e.g., navigation to prepare pose, and prepare to interact pose) and online computed linear motion can be executed (e.g., prepare to interact plan can be adjusted based on tag). Additionally, a "plan through" option to generate plans that pass through and do not stop at keyframes can be used, and saving and execution of plans can use existing infrastructure.

For plan caching, individual plans can be saved in a motion library. Additionally, a mechanism to generate plans from a seed plan and reference pose can be implemented, e.g., by sampling poses within some region from an input pose. A motion library function can be used to associate sets of plans and reference poses into a plan group, e.g., such as in a metadata file. A motion library function can query a plan from reference pose.

In some embodiments, for each doorway, a robotic device can, when offline, generate plans associated with a given base position error and, when online, compute base error via tag detection and select plan(s) in cache with closest error. This can be integrated into a module for going through the door that is part of the plan for executing opening and navigating through the door.

For the offline generation of plans associated with a given base position error, a module for generating and storing a cache including a plurality of plans for executing a task (e.g., a plan cache generator) can be implemented. The module can receive as inputs information such as, for example, a number of plans to generate, an identifier for a tag associated with the plans, sequence of keyframes for a zero error case, and/or list of keyframes that need to be transformed given a certain base position error. The module can combine the inputs with other information including, for example, semantic data (e.g., static obstacles, etc.), to generate a plan.

In some embodiments, a cache library can be planned for use by a teaching interface. In some embodiments, a module for obtaining information regarding one or more states of the robotic device with a transform element (e.g., a body planner handle request with transform) can be called by plan cache generator to generate transformed plans. In some embodiments, the use of the transform can be generalized to be a subset of one or more keyframes in plan instead of being applied to all keyframes in a plan. For example, a doorway plan can be performed in three segments, and the last two of which can be transformed while the first is not transformed. The robotic device (or a user) can select which keyframes should be transformed to run full manipulation as a single plan, e.g., don't need to transform navigation to prepare motion. In some embodiments, space considerations can be taken into account, e.g., approximately 400 kb per doorway plan (e.g., 200 kb per direction), 2 doorways per door, etc.).

For online computing of a base error via tag detection and selection of plan(s) in cache with closest error (e.g., execution of fast plan), the following can be implemented: Using a software module to detect base error, selecting closest pose and returning the associated plan, and checking the plan for collisions. If collisions do not exist, the selected plan can be executed. If not, live planning fallback can be performed.

Figure 26:
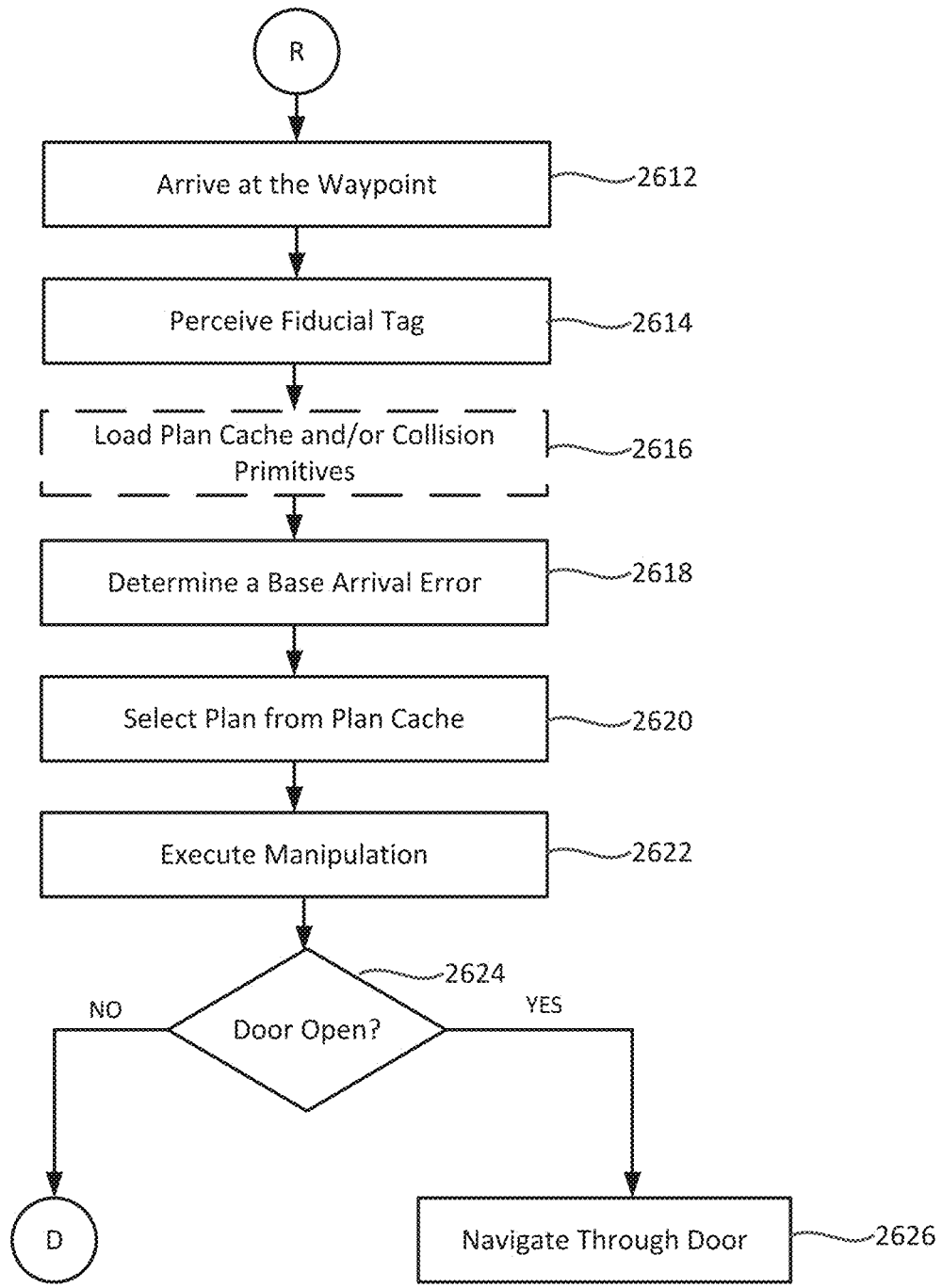
FIG. 26 is a flow diagram depicting execution of door navigation, according to some embodiments.

In the execution mode, the robotic device can traverse doors semi-autonomously. FIG. 26 is a flow diagram depicting execution of navigation through the door, according to some embodiments. At 2612, the robotic device can arrive at the waypoint that can be defined by the fiducial and the reference pose. At 2614, the robotic device can perceive the fiducial tag (e.g., marker) near the activation device, e.g., using sensors such as cameras. For example, the robotic device can scan the environment and identify the marker and/or fiducial tag associated with the activation device for opening the door (e.g., according to method 700). At 2616, if the door type is known, the robotic device can optically load the plan cache and the collision primitives. For example, if the door type is known, the robotic device can access the plan cache for the door type. At 2618, the robotic device can determine a base arrival error from the perceived tag pose (e.g., fiducial). For example, the robotic device can determine a difference between a current pose (e.g., a current fiducial and/or current reference pose) of the robotic device once it arrives near the activation device and a base pose saved during teaching that is associated with a pre-linear search motion keyframe (e.g., first keyframe that was taught to the robotic device to trigger the activation device). At 2620, the robotic device can select a plan from the plan cache (e.g., plans generated in FIGS. 23-25) using the base arrival error. For example, the robotic device can determine its current pose and load a plan that corresponds to the base-tag-eef configuration for the current pose. If the door type is known, the robotic device can select a shared manipulation plan. If the door type is not known, the robotic device can undergo guided teaching to associate a previously generated shared manipulation plan with the new door type. If the guided teaching continues to result in collisions, the robotic device can undergo site-specific teaching. In some embodiments, in response to the collision, the robotic device can terminate execution of the plan and move the end effector to a predefined safe position. At 2622, the robotic device can execute the manipulation. Executing the manipulation can include triggering the activation device such that the door opens. If the door opens (e.g., at 2624), then the robotic device can navigate through the door (e.g., at 2626). In some embodiments, prior to navigating through the door, the manipulating element can be positioned such that it is within a predefine safe position and/or radius as further described below. If the door does not open, rescan the environment and plan its trajectory as described with reference to FIG. 12. In some embodiments, if the door does not open, the base and the end effector can be re-positioned to achieve a different starting pose with a different base-tag-eef configuration.

As mentioned above, the robotic device can traverse semi-autonomously through doors. In some embodiments, a state machine (e.g. a module) can house the logic for a robotic device's door traversal behaviors. A state machine is a non-limiting example, however, and it should be readily understood that any suitable computational model can be executed by the robotic device to enable the robotic device to navigate or traverse through a door or engage in other skills or behavior. The robotic device's behavior when traversing a door can vary depending on the recorded door type. Some example set of door types include no_door: open doorway connecting two rooms, auto motion: door that opens when motion is detected, auto button: door that opens when a button is pressed, auto scanner: door that opens when badge is scanned, auto wave: door that opens with a wave at a wave sensor, manual_push bar: a manually opened door that opens with a push bar, manual handle_push: a manually opened door that requires pulling a handle, and manual handle_pull: a manually opened door that requires pushing a handle.

With the no_door and auto motion door types, a robotic device can travel directly to the door's post waypoint. With other types of doors that require manipulation (e.g., auto button, auto scanner, and auto wave door types), if manipulation is enabled, then the robotic device can execute a sub-state machine (e.g., a sub-module) whereby the robotic device automatically manipulates an activation device to open the door. If manipulation is disabled, then the robotic device can execute a sub-state machine where the robotic device requests help from a user. The robotic device's behavior under each of the above sub-state machines is described in more detail below.

Figure 36:
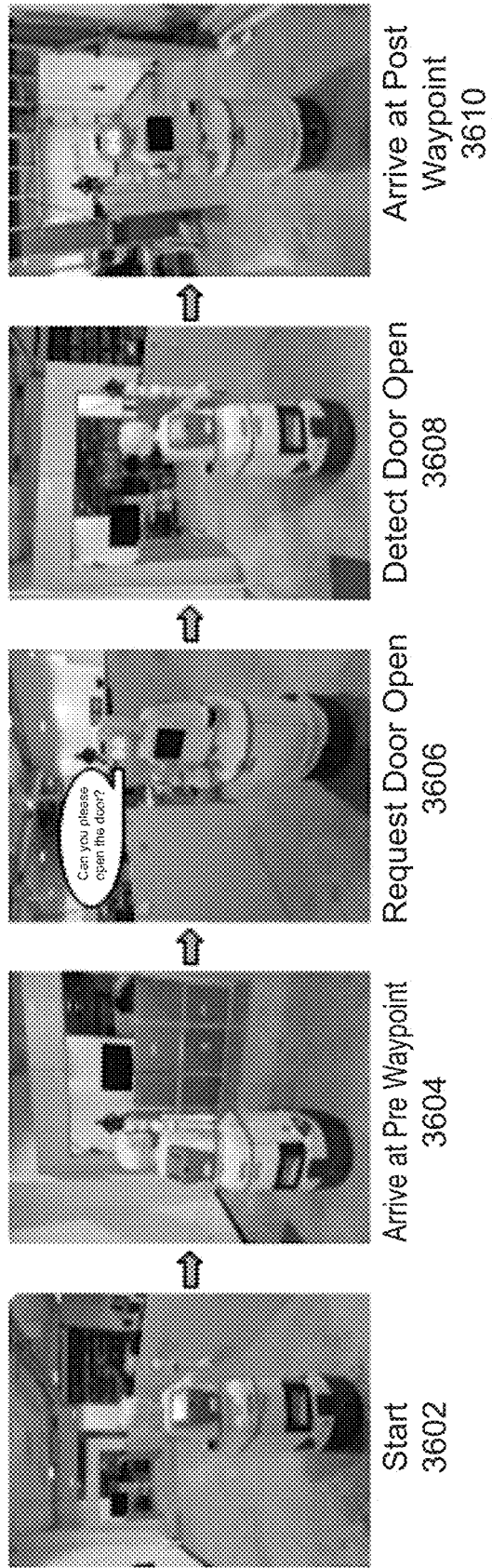
FIG. 36 depicts an example flow of executing the sub-state machine for going through the door with user help, according to some embodiments.

FIG. 36 depicts an example flow of executing the sub-state machine (e.g., a model) for going through the door with user help. When executing the sub-state machine with user help, the robotic device arrives at the door pre-waypoint (at 3604) and can request assistance (e.g., from a user) at 3606 to open the door. The robotic device monitors the open/close state of the door with a door state detector, waiting for the door to be opened. In this waiting phase, the robotic device can periodically request the door to be opened. When the door is detected as open at 3608, the robotic device can navigate through the door to arrive at the door's post waypoint at 3610. If the door is detected as closed anytime during the move to the post waypoint, the robotic device can return to the pre waypoint and repeat the process.

Figure 35:
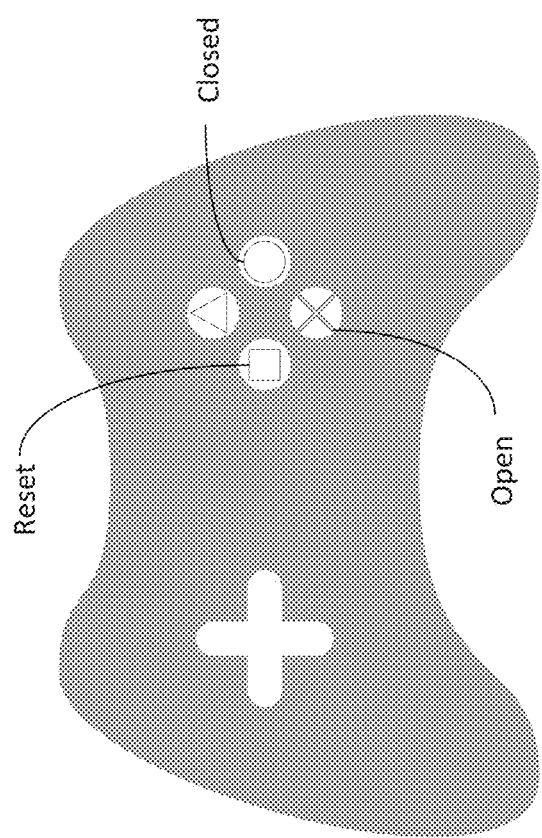
FIG. 35 illustrates a controller that a user can use to overrise an output of a door state detector of the robotic device, according to some embodiments.

In some embodiments, a user can override the output of the door state detector with a controller or user input device, e.g., as depicted in FIG. 35. For example, after a robotic device has arrived at the door pre waypoint, the operator can press a first button (e.g., X) to tell robot the door is open, a second button (e.g., 0) to tell robot the door is closed, or a third button (e.g., Square) to reset to autonomous door state detection. After pressing X or O, the user can press Square to reset to autonomous door state detection, e.g., for the next door that the robotic device encounters. While these three inputs are provided as examples, it can be appreciated that any suitable type of input can be used and is not limited to buttons. For example, audio inputs can be provided to the robotic device in addition to or as an alternative to button inputs.

Figure 34:
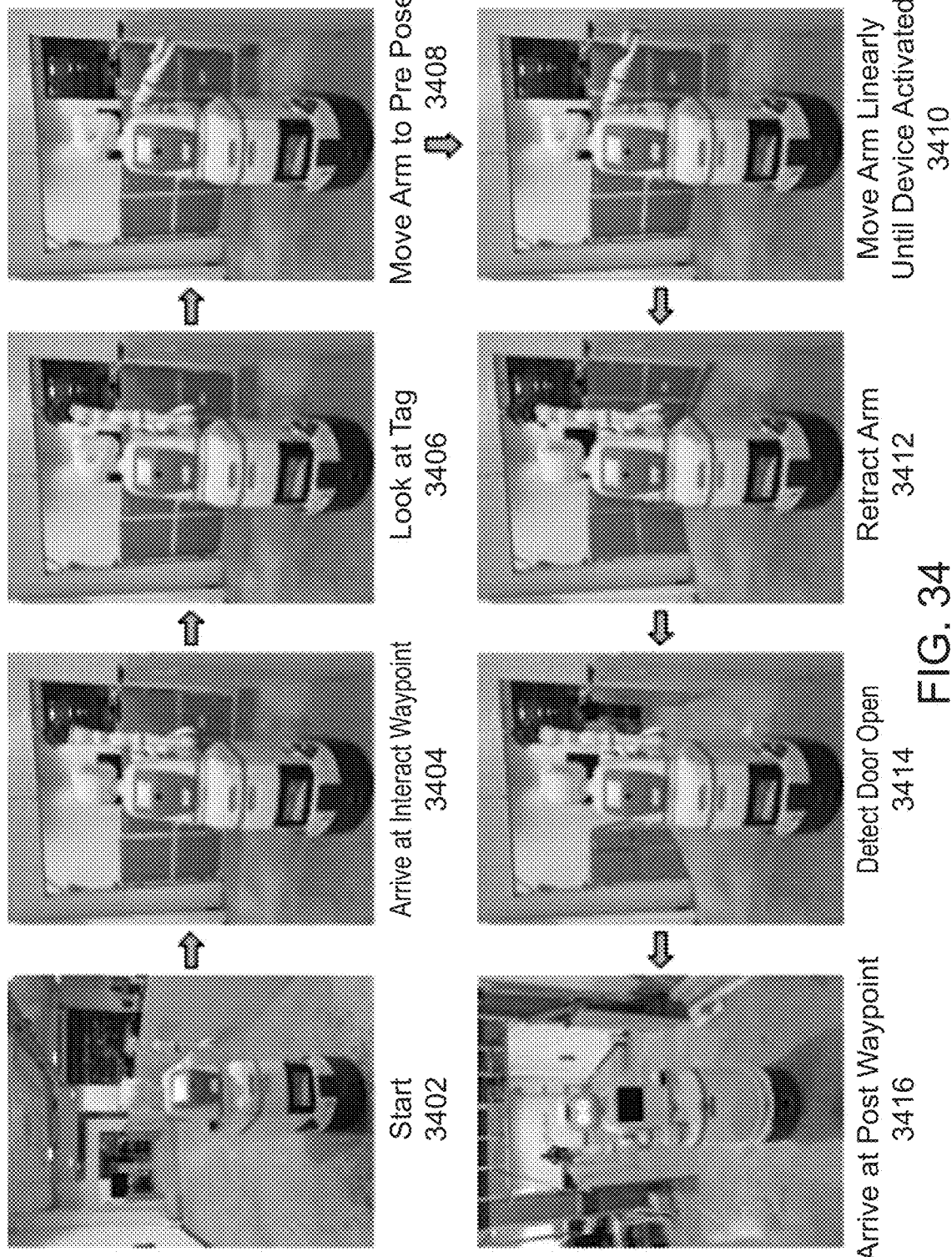
FIG. 34 depicts an example flow of executing the sub-state machine for going through the door autonomously, according to some embodiments.

FIG. 34 depicts an example flow of executing the sub-state machine (e.g., a model) for going through the door autonomously. When executing the state machine for automatically or autonomously opening and navigating through a door, a robotic device can first arrive at the interact waypoint at 3404. This waypoint can be different from the door's pre waypoint. Unlike the pre waypoint, the robotic device can activate the activation device from the interact waypoint. The robotic device then scans and identifies the fiducial tag placed near the door device to acquire the tag's pose at 3406. Once the robotic device has determined the tag pose, it can move the arm so as to activate the device and open the door. This motion can be broken into two stages: (1) motion to pre search pose at 3408 and (2) linear search motion at 3410. In the first stage (e.g., at 3408), the robotic device moves the arm such that the end effector (e.g., gripper) is near the activation device. In the second stage (e.g., at 3410), the robotic device moves the end effector (e.g., gripper) in a linear motion until either the robotic device detects that the activation device was activated, the robotic device detects a large force on the arm, or the motion times out. The arm is then retracted back to the navigation pose at 3412, after which the robotic device traverses through the door at 3416 if the door state detector detects that the door is open at 3414. If the door is detected as closed anytime during the move to the post waypoint, the robotic device can return to the interact waypoint and repeat the process. In some embodiments, a user (e.g., a remote user viewing a live video feed, or an onsite user) can override the output of the door state detector with a controller, as described above with reference to FIG. 35.

In some embodiments, during the linear motion of the arm of the robotic device, the robotic device can run a door device activation detector, e.g., to stop the motion once the door device has been activated. At any time during the linear motion, the user (e.g., a remote user viewing a live video feed, or an onsite user) can manually stop the motion, e.g., by pressing the X button of the controller depicted in FIG. 35. This is provided as a way for the user to mitigate false negatives in the door device activation detector. Pressing the X button during linear motion can have the effect of overriding the door state detector to the open state. If X was pressed to stop the linear motion, then another button (e.g., Square in the controller depicted in FIG. 35) can be pressed after the robotic device has traveled through the doorway but before it gets to the post door waypoint and/or another door such that the robotic device does not recall the prior override value at a subsequent door.

In some embodiments, while monitoring the execution of the door traversal behaviors, a user can cause the robotic device to abide by the established social etiquette rules and remain mindful of the time constraints of task execution and safety. In some embodiments, while monitoring the execution of a state machine (e.g., module) for going through a door with user help, as described above, the user can cause the robotic device to: yield to people trying to go through the door, override open door state detection if robotic device takes too long to notice door as open (e.g., after a predetermined period of time from the door opening and the robotic device failing to detect that the door is open), and/or manually drive robotic device through door if autonomous navigation takes too long to traverse (e.g., after a predetermined period of time from a certain event).

In some embodiments, while monitoring the execution of a state machine for going through a door autonomously, the user can cause the robotic device to: yield to people trying to go through the door, watch for any unsafe arm motions and respond accordingly (e.g., by performing arm motion execution monitoring), press a button on a controller (e.g., X on the controller depicted in FIG. 35) if arm continues to push into the activation device/wall a few seconds after activation of activation device and/or misses the activation device and is pushing against the wall, override open door state detection if robotic device takes too long to notice door as open, manually drive robotic device through door if autonomous navigation takes too long to traverse and/or if robotic device has unsuccessfully executed door open motion too many times, and watch out for the door closing on the robotic device as the robotic device navigates through the door, e.g., to avoid damage to the robotic device.

During execution of a door opening and navigation task, a robotic device according to embodiments described herein can experience failure in certain situations. In such instances of failure, the robotic device can be configured to employ one or more recovery tactics. In an embodiment, a robotic device can be configured to alert a remote user. For example, if the robotic device encounters a navigation failure, then the robotic device can send an alert to a user that notifies them of the navigation failure. If the robotic device is unable to obtain fiducial information and therefore cannot determine a reference pose, the robotic device can send an alert to a user that notifies them of a perception failure. If the robotic device is unable to return to a safe navigation pose or navtuck pose, then the robotic device can send an alert to a user that notifies them of a navigation pose failure. In some embodiments, the user can provide an input or feedback to the robotic device, e.g., to assist the robotic device in performing the task.

To navigate through the door, it can be important to efficiently and accurately detect whether or not a door is open in front of a robotic device. Environmental variables that can impact this detection include: different door shapes, lighting conditions, and people/objects near a door.

In some embodiments, sensors near a door can be employed, such as, for example proximity switch, such as magnetic switch, mechanical switch, and/or optical sensors, such as beam-break sensors. In some embodiments, a robotic device can detect a door and/or monitor a state of the door using combinations of semantic data that are taught, e.g., location of door and/or location of objects around the door. The robotic device can merge semantic data with sensor inputs and build a model of whether a particular door is open. In some embodiments, the robotic device can continually evaluate and monitor whether a door is moving. In some embodiments, a remote user can override the execution of a robotic device with human-in-the-loop guidance (e.g., informing the robotic device of a condition such as, for example, the door being open even if the robotic device believes the door to be closed).

In some embodiments, a robotic device can employ camera-based detection, including detecting the door frame and track the corners, and/or computing the absolute image difference of the cropped images. In some embodiments, a robotic device can employ laser-scan based detection, such as detect whether or not points are seen from the other side, and/or cropping the points for doors and compute similarities. Laser-based detection can be more robust than using a camera. For example, laser-based detection can be robust to lighting conditions. Computation cost of laser-based detection can be low and therefore processing of data can be fast. In some embodiments, laser data points can be used for reasons such as because the shape of the door can be classified on a two-dimensional (2D) plane, and/or because laser data is less prone to lighting condition changes.

In some embodiments, laser-based detection can include cropping the laser points for the door using localization, evaluating a combined metric (e.g., by determining the number points that can be seen on the other side of the door, and/or by comparing the current scan with the scan of the door when the door is open), determining a threshold for the combined metric that can be representative of the door status (e.g., open or closed). In some embodiments, the robotic device can detect the door by marking the bounding box of the door on the map, cropping out of the laser points that are in the bounding box, converting the laser points inside the bounding box to a binary image, and training a classifier to classify the binary image as door open/close. In some embodiments, a module can be used to convert laser points into binary images and the binary image can be stored as an array of a class.

In some embodiments, a classifier, such as, for example, a Support Vector Machine (SVM), can be used to train the models, e.g., load and save models and classify grid image data. The input to the model can be the flatten binary image. The output of the model can be a door state, e.g., open, half open, half close, close. In some embodiments, a module can be used to run the door detection. The module can be activated/deactivated, e.g., by user inputs. Once activated, the module can provide the door states and laser data points (e.g., processed and/or cropped). In some embodiments, the door detection data can be filtered.

In some embodiments, a module can be used interactively to collect laser data given a name (identifier) of a target door. The laser data collected can depend on whether a bounding box has already been taught and whether a robotic device can see a door. The collected data can be saved as a binary image, e.g., in the format of JSON. In some embodiments, Histogram of Oriented Gradient (HOG) features can be used to improve door state detection. Suitable examples of HOG features are described at https://scikit-image.org/docs/dev/auto examples/features detection/plot hog.html, as incorporated by reference herein. In some embodiments, the robotic device can base its classification of whether a door is open or closed on Gaussian Mixed Models of laser scans.

In detecting door state, one or two walls can be partially visible and detectable, even with blocking by humans and/or small objects. In some embodiments, learning is not required and a robotic device can rely on geometric data associated with one or more objects within the nearby environment. In some embodiments, a doorway bounding box and cropping may not be required, e.g., when using random sample consensus (RANSAC).

In some embodiments, a robotic device can use lidar data to determine when to begin navigating through a door. Such a determination can be made across a variety of door-robotic device configurations, including configurations in which the door may not be directly in view of the robotic device. For example, a semantic labeling approach can be implemented to inform a classifier how to transform (e.g., label) input data before being processed by a Gaussian Mixture Model (GMM)—based classifier. In some embodiments, the semantic label can be provided by a human teacher. FIG. 37 depicts four doorway configurations based on the presence of walls, the robotic device's location, and whether the door is in the robotic device's field of view from an interact waypoint or starting pose (e.g., waypoint or starting pose at which robotic device begins interacting with the activation device).

In some embodiments, wall types can be classified into five different classes: right wall, left wall, blocking right wall, blocking left wall, no wall. In some embodiments, the wall type can inform the classifier on how to rotate the data (e.g., input data such as lidar data). For instance, the data can be rotated such that the door is at a consistent orientation in the data. Accordingly, even with localization and arrival error the door can be rotated to be in a consistent orientation.

In some embodiments, whether the doorway is in the robotic device's field of view can be computed based on an angle difference between current pose of the robotic base and the door's pre waypoint (e.g., waypoint learned through teaching by guidance described above). In some embodiments, the door pre-waypoint can be configured to directly face the door. The door pre-waypoint can be provided when the robotic device is trained on the door. If the angle difference is large, the door is determined to not be in the field of view of the robotic device. If the angle difference is small, the door is determined to be in the field of view of the robotic device.

In some embodiments, the field of view computation can be used to inform whether the base classifier's output is reliable. If the door is determined to not be in the field of view of the robotic device, the classifier's output may be untrustworthy since the data that the classifier is processing is not actually viewing the door. FIG. 38 depicts an example door in the field of view of the robotic device and an example door outside the field of view of the robotic device.

In some embodiments, the door may not be in the field of view of the robotic device from the interact waypoint or starting pose for a manipulation to open the door (e.g., as shown in FIG. 38). In such cases, the robotic device can determine the state of the door based at least in part on the state of the manipulation process. After arriving at the interact waypoint, the robotic device can assume that the door is closed until the robotic device executes the manipulation process successfully to trigger the activation device. After successful execution of the manipulation, the robotic device can assume that the door state is open until the door is in its field of view. Once the door is in the field of view of the robotic device, the classifier can classify the door state based on sensor input (e.g., lidar data).

In some embodiments, a door detector can have multiple outputs, e.g., Open, Closed, and Undetermined. In some embodiments, the undetermined output can represent a low confidence and/or no confidence in the current state of the door. In some embodiments, before processing the laser data, the classifier can determine whether the robotic device is past the door. For example, the classifier can use the robotic device's current pose and the door's pre-waypoint and door bounding box that may be provided at training time. If the robotic device is past the door, the output can be latched and/or classified to the open state. Using the robotic device's current pose and the door's pre-waypoint, the classifier can determine whether the door is in the robotic device's field of view. If the door is not in the robotic device's field of view, the output can be latched and/or classified to undetermined state. If the door is in the robotic device's field of view, then the robotic device (e.g., via the state machine) transitions to processing the live lidar data.

In some embodiments, using the wall type, a line can be fit to the laser data using RANSAC. This can inform the classifier how to rotate the laser data such that the door is at a consistent orientation within the data (e.g., the door is aligned along the y-axis). In some embodiments, data not within a bounding box of the door can be discarded from further processing. If after discarding too few points of data remain, the output can be latched and/or classified to undetermined state.

In some embodiments, a Gaussian mixture model can be fit to the x coordinates of the remaining points. The variance and weight of the component with mean closest to the expected location of the door can be analyzed to compute the open/closed state. The door can be classified as closed if there are enough points in the component (weight) and there is low variance to this component.

In some embodiments, a robotic device can employ sensors to determine when/if the robotic device has successfully scanned a card or hit a button (e.g., activated an activation device). In some embodiments, a robotic device may not have an activation device in its live view of a scene when it is triggering the activation device (e.g., pushing a button or scanning a badge). Accordingly, additional sensors (e.g., force, audio) can be employed to confirm whether a robotic device has activated/triggered the activation device.

In some embodiments, in scenarios in which the activation device is a button, a robotic device can detect a button push. The robotic device can implement a push detector model. The push detector model can be designed to replace a joystick input from a user (e.g., pressing X on the controller depicted in FIG. 35 to stop linear search). The push detector model can be designed in near real-time, e.g., to avoid over-pushing. In embodiments described herein, near real-time can be less than about a microsecond, about a millisecond, about a second, about a few seconds, or about tens of seconds, including all subranges and values in-between. The push detector model can be configured to identify one or more feature sets that are required and to analyze sensitivity and specificity.

Depending on changes in the forces sensed by the robotic device, the robotic device can determine whether a button push has occurred and/or is successful. For example, a robotic device can determine whether a push is unsuccessful based on the spikes in the detected forces. In some embodiments, small spikes with wide variance and large end effector error (e.g., end effector distance from button or target) can be indicative of arm movement, and narrow spikes with some end effector error can be indicative of a partial push. Both types of spikes can indicate that a push is unsuccessful. Alternatively or additionally, a robotic device can determine whether a push is successful based on the spikes in the detected forces. In some embodiments, narrow spikes with large derivatives and low end effector error can be indicative of a successful push. The robotic device can determine the end effector error based on its starting position (e.g., where its base is located relative to the fiducial) and the stored plans in the cache. For each plan (or a subset of plans), the robotic device can determine what it believes to be the error of the end effector, e.g., the distance between the final location of the end effector (or the location of the end effector associated with pushing the button) and a reference point of the button. With a small amount of error and force sensing, the robotic device can determine whether the button push is successful, despite not being directly aligned with a reference point (e.g., center point) of the button.

In some embodiments, the robotic device can use a machine learning classifier for push detection. The classifier can be graded on sensitivity (e.g., ability of the classifier to correctly identify button push or true positive rate) and/or specificity (e.g. ability of classifier to correctly identify non-push or true negative rate).

| | |
|---|---|
| Low specificity | Early detection resulting in no button press |
| High Specificity | Linear search proceeds until a successful push or failure to hit target |
| Low Sensitivity | Hole in the wall (or other wall damage) or arm error due to over-pressing |
| High Sensitivity | Linear search terminates upon push |

In some embodiments, a robotic device can use recurrent neural networks (RNNs) for push detection. In some embodiments, a robotic device can use long short term memory networks (LSTMs) for push detection. In some embodiments, a robotic device can use a moving window and linear regression for push detection.

In some embodiments, a robotic device can use a moving window and a multiple dimensional SVM classifier to determine whether pushes are successful or unsuccessful. Classification of data can be in linear search motion state. The timeout can be after a predetermined amount of time (e.g., a predetermined X number of seconds). A threshold maximum force can be set. The ground truth of whether a push is successful or unsuccessful can be based on a joystick command (e.g., via a controller such as in FIG. 35) from a user or based on hand labelling based on head camera image. The features can include a combination of end-effector error, force magnitude, and force derivative.

In some embodiments, thresholds, timeouts, overlap end effector pose and errors can be added to data for improving models used by the robotic devices. In some embodiments, a robotic device provided with such data may be capable of performing classification, e.g., with a threshold. In some embodiments, a robotic device can employ learning-based methods (e.g., HMM based detection) instead of hand engineering window time for window and SVM approach for push detection.

In some embodiments, a robotic device can use a video stream to identify error in end effector position (e.g., how far did end effector end up from the button) and/or correct the error and use force data at a backup to determine a push. In some embodiments, human guidance (e.g., remote and/or on site operator) can be used to correct for error in detection when a model has incorrectly detected whether badge/button pushing has been successful.

In some embodiments, for a force model detection, the force data can be normalized before classification. In some embodiments, additional or alternative feature spaces can be explored, e.g., velocity (e.g., speed) of an end effector and/or a window of forces instead of a single frame.

In some embodiments, in scenarios in which the activation device is a scanner, a robotic device can be configured to detect whether it has successfully scanned a card. In some embodiments, the robotic device can build/generate an audio model. For example, the robotic device can build a machine learning model that can be trained with audio data gathered from the various sites that can identify a scanner beep. Audio data can be collected, for example, using microphones on a robotic device. In some embodiments, the robotic device can build/generate a force model. For example, the robotic device can utilize force model data previously collected by the robotic device (e.g., during training/exploration/execution, etc.) as the base and compare accuracy using different models and different approach methods for badge scanning.

In some embodiments, these models can be built/generated in a remote device (e.g., server 120 and/or compute device 150 in FIG. 1). In some embodiments, a combined approach can be used in which the results of the audio model and the force models can be combined and/or compared as dual verification of a badge activation.

In some embodiments, a robotic device can employ a scanner audio detection convolutional neural network (CNN) approach. The robotic device can be configured, for an initial set of audio features in a set of training clips, to extract the mel-frequency cepstral coefficients (MFCC) from each of the training clips. The CNN can be structured in a narrow but deep fashion so that as many features per clip can be extracted from the clips. For example, a network with 3 layers can be used. Alternatively or additionally, a multi-layer perceptron (MLP) or SVM with a similar approach can be used. The CNN can be trained using a training data set, e.g., based on sound clips collected from different sources (e.g., site of robotic device, such as in a hospital, or online sound clips, etc.). The training data set can include sounds that correspond to badge scanning and/or other common sounds in a site where the robotic device is being used.

In some embodiments, a robotic device can employ a combined approach (e.g., audio and force) as described above. For example, the robotic device can output a confidence level from both an audio model and a force model. The robotic device can combine the confidence level by using weights, e.g., 60% force+40% audio including the door laser scan. In some embodiments, the robotic device can weigh the outputs from the different models based on environmental conditions or constraints (e.g., weighing force greater when there is a significant amount of ambient noise).

In some embodiments, the robotic devices, systems, and methods described herein can navigate through a dynamic perceptual environment, solve complex manipulation planning problems with multiple degrees of freedom, and/or implement a human-in-the-loop approach.

As mentioned above, a robotic device may generate a plan to plan action trajectories for the robotic device to achieve manipulation goals. However, in a dynamic perceptual environment, the robotic device can make limited assumptions about the initial state of the environment with respect to its actuators. For instance, consider a robotic device (such as any of the robotic devices described herein) with a manipulating element (e.g., arm) mounted on a moveable base that includes transport elements. Any time a manipulation action is to be planned for the robotic device, a few static assumptions about the environment may be made. A frame of reference of the planning problem may be continually changing because the motion of the mobile transport elements may continually change how the manipulating element is positioned within the environment.

Additionally, the manipulating element described herein can implement complex actions (e.g., since the manipulating element described herein has seven degrees of freedom). Accordingly, constructing an ego-centric understanding of the perceptual environment to solve the planning problem may be complex. In some embodiments, execution of fast plan/fast button pushing (as described above) and/or teaching scenarios (as described above) can be implemented to solve the complex planning problem.

In some embodiments, human-guidance can be leveraged for key pieces of information so as to successfully operate a high degree of freedom robotic device in a dynamic perceptual environment. In some embodiments, leveraging human-guidance can reduce computational time and improve accuracy. Door detection described above provides an exemplary example of leveraging human-guidance. The set of door types (e.g., four door types described with reference to FIG. 37) and the configurations (e.g., a single door that swings out, double doors that both swing out, etc.) that a robotic device may be expected to encounter can be used as semantic data. The sematic data can have two key features (1) a human can encounter the door and can correctly label its type and/or configuration, and (2) a classifier can be built based at least in part on this labeling to detect whether the door is open or closed. As described above, in some embodiments, a given door type can inform transformation that can be made on lidar data prior to classification with a Gaussian Mixture Model.

In some embodiments, a multi-tiered approach that relies on dynamically computed safety bubbles centered around the robotic device can be implemented so as to successfully operate the robotic device in a dynamic perceptual environment. In some embodiments, the dynamically computed safety bubbles can be computed using statistical modeling. In some embodiments, dynamically computed safety bubbles can be computed through a combination of human-guidance and teaching by guidance. In some embodiments, this method can utilize dynamically changing robotic footprint and human-guidance to capture and train the safety boundary around the robotic device.

In some embodiments, a safety layer described herein can include the ability for people (e.g., obstacles) to intentionally bump and interact with the robotic device during operation in a dynamic environment. For instance, the method can include a combination of a compliance controller, a set of sensor monitors, and safety behaviors that assume that people can get into the robotic device's space. Accordingly, described herein is a multi-tiered safety architecture built specifically for human-robot interaction.

In some embodiments, the safe manipulation processes described herein can enable manipulating element motions for a mobile manipulation platform (e.g., manipulation elements that can be coupled to transport elements) operating in human-occupied dynamic environments. In particular, the robotic device may need to safely operate under a number of unideal conditions, such as unexpected obstacles entering the manipulating element's workspace and/or unexpected collisions with external objects and/or people. In some embodiments, an approach to ensure safe operations for the robotic device even under unideal conditions can include: (1) Safety bubble monitoring, (2) remote monitoring, (3) compliant controller, and (4) pose/force bounds monitoring.

During safety bubble monitoring, the robotic device's motion (e.g., the manipulating element's motion and/or transport element's motion) can be paused or slowed down when an unexpected object/person enters the robotic device's's workspace. For instance, in some embodiments, the manipulating element's motion can be slowed without being entirely paused when an unexpected object enters the manipulator's workspace.

During remote monitoring, a remote user/operator can view and provide inputs (e.g., via a user interface, terminal tool, controller, etc.) for particularly safety critical stages of manipulation. In some embodiments, the compliant controller can detect if the manipulating element (e.g., arm of the robotic device) can comply with external forces while still tracking the goal trajectory for the robotic device.

During force bounds monitoring, the robotic device's motion (e.g., manipulating element's motion) can be paused, for example, when robotic device motion exceeds a threshold for tracking the expected goal trajectory and/or when the robotic device (e.g., manipulating element) encounters external forces outside the acceptable bounds of the compliant controller. In some embodiments, the total displacement of the manipulating element and/or the force encountered by the manipulating element can be monitored. If the total displacement and/or the force is outside acceptable bounds of the compliant controller, the manipulating element's motion can be paused.

In some embodiments, safety bubble monitoring can determine whether unexpected objects are within the robotic device's defined safety perimeter. Safety bubble monitoring can produce/generate PAUSE, RESUME, and SLOW signals when an unexpected object/person enters or leaves the safety parameter, respectively.

Figure 41:
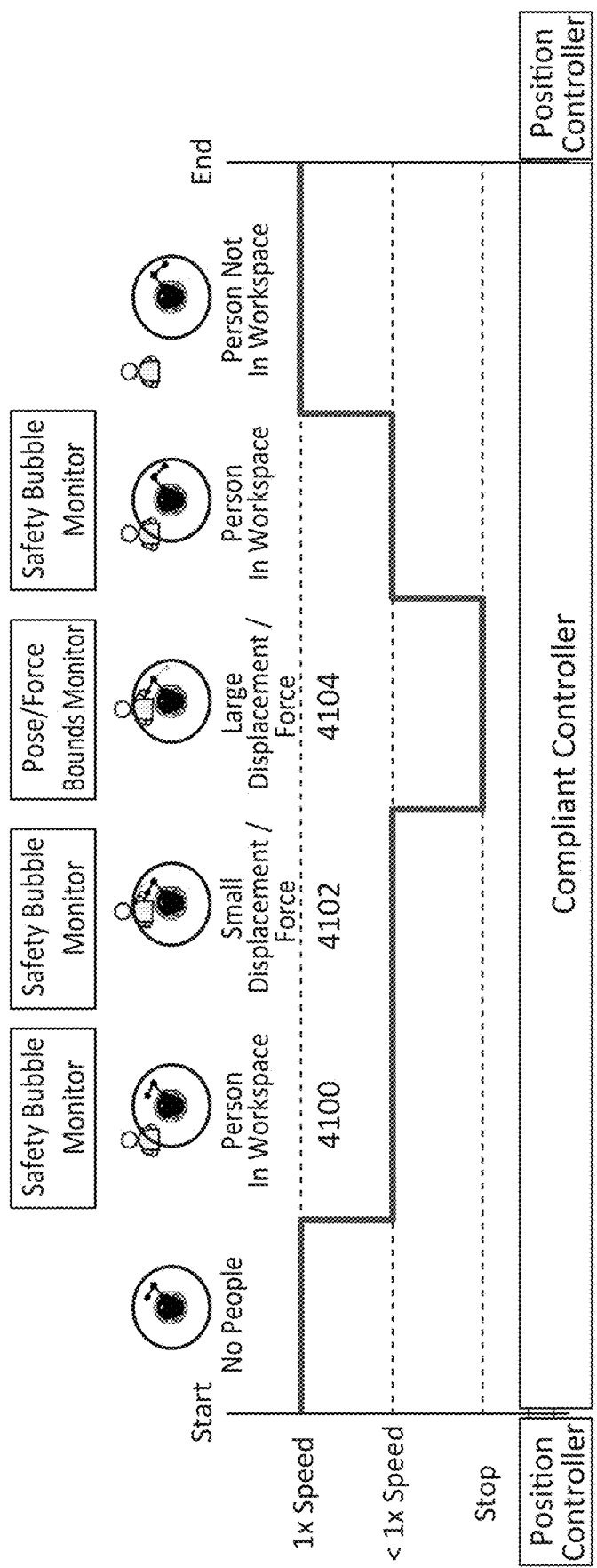
FIG. 41 depicts an example of adjusting movement speed of the robotic device according to an example safe manipulation process or algorithm, according to some embodiments.

In some embodiments, safety bubble monitoring can account for expected static obstacles, unexpected static obstacles, and dynamic obstacles entering/leaving the safety perimeter (e.g., as depicted in FIG. 41). As discussed above, the operating conditions of the mobile robotic device can be a dynamic environment such that the manipulating element's workspace changes constantly. In some embodiments, different sets of objects/people can nominally be within the safety perimeter of the robotic device but can still be deemed safe for manipulation. Additionally, unlike environments which can be outfitted with external sensors, the robotic devices described herein may operate in environments without external sensors by using onboard sensors to estimate whether an object/person is within the safety perimeter.

In some embodiments, two two-dimensional lidar sensors that cover a 360 degree view of the robotic device's surroundings can be used as an input to the safety bubble monitoring. In some embodiments, an array of range sensors can be used as an input to the safety bubble monitoring.

In some embodiments, the robotic device can slow down but may not completely stop within the safety bubble. In the multi-tiered safety approach, the compliant controller can allow for forces during a slower movement. Accordingly, a slowed motion can allow a person to touch and/or interact with the robotic device.

Figure 39:
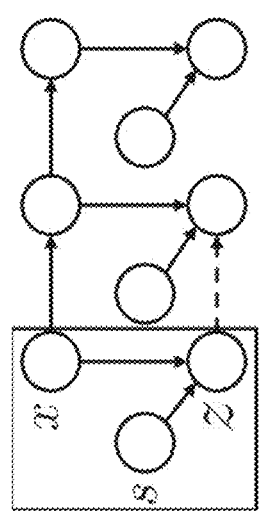
FIG. 39 depicts a hidden Markov model that computes pause/resume, according to some embodiments.

In some embodiments, a probabilistic modeling approach can be taken to estimate the likelihood that an unexpected object/person is within the safety perimeter. For example, within perimeter→pause, outside perimeter→resume. In some embodiments, a hidden Markov model can be implemented to compute pause/resume. FIG. 39 depicts a hidden Markov model with hidden state x being the pause/resume signal, z being the observed range values, and s being whether the expected ranges are within the safety range thresholds. In some embodiments, it can be assumed that estimating pause/resume independently at each time step can yield good results. According, define z :=current range values
z* :=expected range values
$z_{safe}$ :=safety range tresholds Independence between each range measurement of the lidar ($z^i$) can be assumed, such that $$p(z) = \prod_{i=0}^{N} p(z^i)$$

To determine pause/resume, compute $$x = \operatorname*{argmax}_{x} p(x|z, s)$$

Using Bayes' rule, $$p(x|z,s) \propto p(z|x,s) \cdot p(x|s)$$

which given $x \perp s$, simplifies to $$p(x|z,s) \propto p(z|x,s) \cdot p(x)$$

Thus, to compute pause/resume, the range distributions $p(z|x, s)$ are to be modeled.

In some embodiments, a common probabilistic beam model for range finders can be modified to model the range distributions. The probabilistic beam model can have 4 components:

1. Expected range with local noise $$p_{hit}(z^i) = \begin{cases} \eta \mathcal{N}(z^i; z^{i*}, \sigma) & 0 \le z^i \le z_{max} \\ 0 & o/w \end{cases}$$

$$\eta = \left( \int_0^{z_{max}} \mathcal{N}(z^i; z^{i*}, \sigma) dz^i \right)^{-1}$$

2. Unexpected objects $$p_{short}(z^i) = \begin{cases} \eta \lambda e^{-\lambda z^i} & 0 \le z^i \le z^{i*} \\ 0 & o/w \end{cases}$$

$$\eta = \left( 1 - e^{-\lambda z^{i*}} \right)^{-1}$$

3. Measurement failure $$p_{max}(z^i) = I(z^i = z_{max})$$

4. Random measurement $$p_{rand}(z^i) = U(z^i; 0, z^{max})$$

With the full distribution being $$p(z^i) = \begin{pmatrix} \alpha \\ \beta \\ \gamma \\ \delta \end{pmatrix}^T \cdot \begin{pmatrix} p_{hit}(z^i) \\ p_{short}(z^i) \\ p_{max}(z^i) \\ p_{rand}(z^i) \end{pmatrix}$$

where $0 \le \alpha, \beta, \gamma, \delta \le 1$ and $\alpha + \beta + \gamma + \delta = 1$.

This model can be modified to incorporate the safety thresholds by splitting the contributions of $p_{short}$ across the pause, resume conditions as follows $s^i$=True $$p(z^i|x = \text{pause}, z^{i*} < z_{safe}) = \begin{pmatrix} \alpha \\ \beta \\ \gamma \\ \delta \end{pmatrix}^T \cdot \begin{pmatrix} p_{hit}(z^i) \\ p_{short}(z^i) \\ p_{max}(z^i) \\ p_{rand}(z^i) \end{pmatrix}$$

$$p(z^i|x = \text{resume}, z^{i*} < z_{safe}) = \frac{1}{\alpha + \gamma + \delta} \begin{pmatrix} \alpha \\ 0 \\ \gamma \\ \delta \end{pmatrix}^T \cdot \begin{pmatrix} p_{hit}(z^i) \\ p_{short}(z^i) \\ p_{max}(z^i) \\ p_{rand}(z^i) \end{pmatrix}$$

$s^i$=False $$p(z^i|x = \text{pause}, z^{i*} < z_{safe}) = \begin{pmatrix} \alpha \\ \beta \\ \gamma \\ \delta \end{pmatrix}^T \cdot \begin{pmatrix} p_{hit}(z^i) \\ \eta_{pause} \cdot p_{short}(z^i) \\ p_{max}(z^i) \\ p_{rand}(z^i) \end{pmatrix}$$

$$\eta_{pause} = \left( \int_0^{z_{safe}} p_{short}(z^i) dz^i \right)^{-1}$$

$$p(z^i|x = \text{resume}, z^{i*} \ge z_{safe}) = \begin{pmatrix} \alpha \\ \beta \\ \gamma \\ \delta \end{pmatrix}^T \cdot \begin{pmatrix} p_{hit}(z^i) \\ \eta_{resume} \cdot p_{short}(z^i) \\ p_{max}(z^i) \\ p_{rand}(z^i) \end{pmatrix}$$

$$\eta_{resume} = \left( 1 - \int_0^{z_{safe}} p_{short}(z^i) dz^i \right)^{-1}$$

It should be readily understood that the probability modeling approach described above is a non-limiting example of a Markov model to compute pause/resume. Any suitable modeling approach can be implemented to compute pause/resume.

In some embodiments, the expected range values can be used to account for any expected obstacles that might nominally lie within the specified safety perimeter. A variety of methods can be used to produce the expected range values. One approach can include using the range values at the start of the manipulation. However, such an approach can ignore potential safety hazards that are present at the start of the manipulation (e.g. person within perimeter at start).

To properly account for such scenarios, a human-in-the-loop can be incorporated where a remote user/operator can determine if the robotic device's surroundings are safe to start the manipulation. When the remote operator signals that it is safe to start the manipulation, the lidar scan can be captured as the expected range values.

In some embodiments, the safety threshold can be generated using multiple expected range values over time. For example, the multiple range values can be collected and used to generate multiple statistical models of safety over time (or merged into a single model with time as a variable) as an example approach for generating/gaining the initial safety bubble threshold.

Each of these remote operator interactions can serve as training data for a learning model (e.g., learning by demonstration, learning by execution, learning by exploration, learning using user input, and/or learning by cache generation) that upon receiving enough training data becomes able to self-supervise its manipulation surroundings with similar accuracy as a human supervisor.

In some embodiments, a combination of data collected over time (e.g., unsupervised data) and interactions with remote operator/user can be used to generate a safety bubble threshold. The interactions can be sparse interactions, thereby eliminating the need for excess human input.

In some embodiments, the safety thresholds can be used to define the distance within which unexpected objects/people are considered too close to the robotic device (e.g., within a predetermined threshold distance from the robotic device) and can therefore signal a pause. These thresholds can be used to define an arbitrary shape around the robotic device and can be generated once at the start or dynamically as the robotic device moves. In some embodiments, the approach can include defining a radius around the robotic device. In some embodiments, this can end up being overly conservative with unnecessary pausing of the motion.

Figure 40:
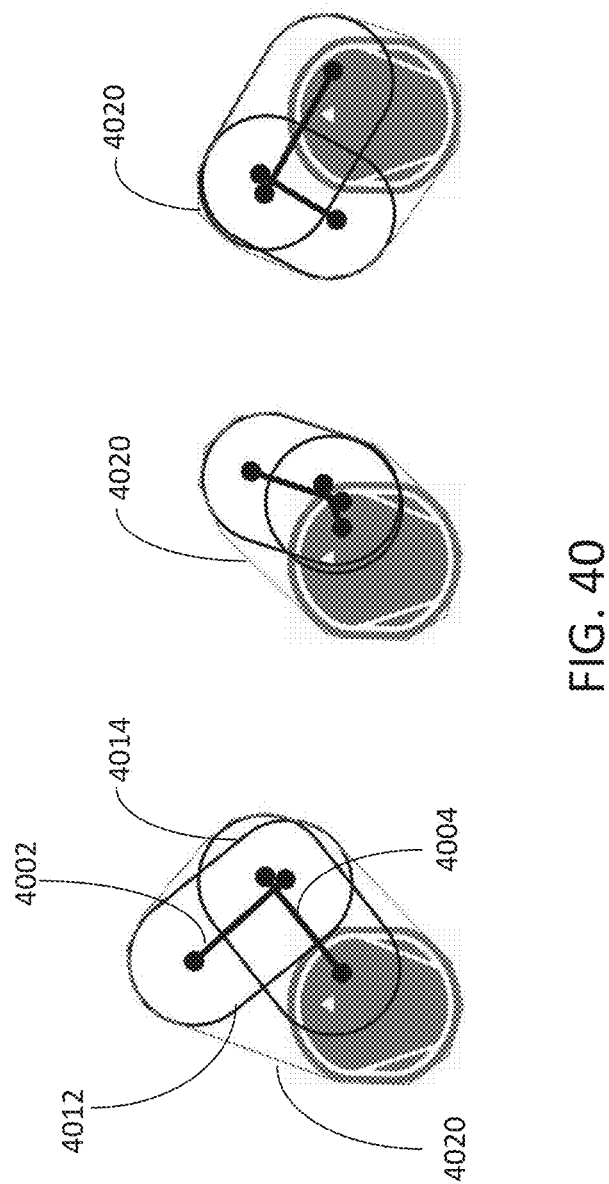
FIG. 40 depicts schematic depictions of safety range thresholds, according to some embodiments.

Since safety implications of the moving manipulating element are of particular concern, the approach can include generating the safety range thresholds according to an approximation of the manipulating element's (e.g., arm's) projected shadow. FIG. 40 depicts schematic depictions of safety range thresholds as described herein. Each link of the manipulating element can be approximated as a line (e.g., lines 4002, 4004 in FIG. 40) and projected onto the floor plane. Then to generate the set of safety thresholds, a convex hull of the robotic device's base and rounded rectangles (e.g., rounded rectangles 4012, 4014 in FIG. 40) of the approximated lines of the links can together define a safety range threshold (e.g., 4020 in FIG. 40). Depending on the position or configuration that the links of a robotic arm are in, the safety threshold can update, as shown FIG. 40.

The compliant controller can limit the forces that the moving manipulating element can apply to objects and/or people that intersect with the manipulator's desired trajectory. As the compliant controller is used to produce the commands to the arm, it can act as a passive safety system in case the safety bubble and/or the remote monitoring components fail.

In some embodiments, the compliant controller can use the concepts from impedance and admittance control theory to produce a controller which can comply with external forces while still tracking a trajectory. The goal can be to provide a level of safety by allowing people and/or objects to contact the manipulating element during motion which can then comply with minimal resistance. For instance, in some embodiments, the compliant controller can be intentionally utilized to allow people to interact with the robotic device. This can be enabled by choosing to slow down the manipulating element without completely stopping it during the interaction in the safety bubble.

For the controller it can be assumed that the manipulating element is rigidly mounted which allows the controller to model the manipulating element in the form:

$$M(q)\ddot{q}+N(q,\dot{q})=T+T_{ext}$$

With $T_{ext}$ being the torques resulting from external forces. For the control, cartesian motion of the effector can be considered. This is given by the equations:

$$x=f(q)$$

$$\dot{x}=J(q)\dot{q}$$

$$\ddot{x}=J(q)\ddot{q}+\dot{J}(q)\dot{q}$$

The compliant controller can receive a series of joint positions and velocities from a motion planner which are denoted by $q_d$ and $\dot{q}_d$ respectively. Using the above transforms, the desired joints can be transformed to cartesian coordinates:

$$x_d=F(q_d)$$

$$\dot{x}_d=J(q_d)\dot{q}_d$$

From the desired position and velocity, a desired compliance equation can be defined in the cartesian coordinate system to be:

$$\ddot{x}_d=K(q_d-q)+D(\dot{q}_d-\dot{q})+I\int(q_d-q)dq+F_{ext}$$

In some embodiments, the compliant controller may not be able to explicitly measure the value of $F_{ext}$, but instead the compliant controller can measure a gravity compensated wrench which is given by:

$$F_m=F_a-F_{ext}$$

Where $F_m$ is the measured wrench, and $F_a$ is the applied wrench due to the control motion. Under ideal conditions, the value of $F_a$ is equal to the value of $\ddot{x}_d$ when $F_{ext}$ 0. Applying the measured back into the original equation for $\ddot{x}_d$ gives:

$$\ddot{x}_d=K(q_d-q)+D(\dot{q}_d-\dot{q})+1\int(q_d-q)dq+F_a-F_m=2K(q_d-q)+2D(\dot{q}_d-\dot{q})+dI\int(q_d-q)dq-F_m$$

Following the desired cartesian acceleration will mean that the manipulator can act as a spring of given stiffness and damping which can allow external forces to move the arm from the desired path or trajectory whilst maintaining stability of motion. The integral gain can be made small as it is added to compensate for inaccuracies in the cancellation of the gravitational forces causing inaccuracies in the position algorithm. However, since the position and derivative gains are small the phase margin can naturally be small which means the integral gains can remain small.

The desired cartesian motion can define the behavior of the manipulator at a given point. However, it can be desirable for the manipulator to maintain a desired shape as defined by the desired joint positions and velocities in the trajectory. For this the compliance controller can define the additional desired acceleration for the joints to be:

$$\ddot{q}_d=K_p(q_d-q)+K_d(\dot{q}_d-\dot{q})+\alpha J^T(q)F_{ext}$$

This may not be an exact equation as meant to act generic scaling factor as a replacement for $M^{-1}(q)$, which can be tuned to define the sensitivity of the null space to external forces. This is acceptable as the goal can be about maintaining the shape under ideal conditions.

To find the command for the system, a quadratic program can be used. The typical form of a quadratic program can be:

$$\text{Min}_x x^T Q x - C^T x$$

For the control of the manipulator, the general form can be used:

$$\min_q (\ddot{x}-\ddot{x}_d)^T \Lambda (\ddot{x}-\ddot{x}_d)+\lambda(\ddot{q}-\ddot{q}_d)^T \Phi (\ddot{q}-\ddot{q}_d)$$

The term $\lambda$ is small, as it represents the null space motion and isn't intended to detract greatly from the primary control objective. Using the transform form the first portion can be written as $$(\ddot{x}-\ddot{x}_d)^T \Lambda (\ddot{x}-\ddot{x}_d) = \ddot{q}^T \Theta \ddot{q} - 2(\ddot{x}_d - \dot{J}\dot{q})^T \Lambda J \ddot{q} + (\ddot{x}_d - \dot{J}\dot{q})^T \Lambda (\ddot{x}_d - \dot{J}\dot{q}) \Theta = J(q) T \Lambda J(q)$$

Collecting terms and dropping the combined terms which are constant per loop cycle, the control quadratic program can be found to be:

$$\min_{\ddot{q}} \ddot{q}^T Q \ddot{q} - 2C^T \ddot{q}$$

$$Q^q = \Theta + \lambda \Phi$$

$$C^T = (\ddot{x}_d - \dot{J}\dot{q}) \Lambda J + \lambda \ddot{q}_d \Phi$$

Solving the quadratic program can give a resulting acceleration $\ddot{q}^*$. The resulting acceleration can then be applied to the command velocity with:

$$\dot{q}_{cmd}(k) = \dot{q}_{cmd}(k-1) + \ddot{q}^* \Delta t$$

The above described model for the manipulating element is a non-limiting example. It should be readily understood that any suitable approach can be used to model the manipulating element.

FIG. 41 depicts an example of adjusting movement speed of the robotic device according to an example safe manipulation process or algorithm, according to embodiments. As depicted in FIG. 41, depending on where a user is situated within a safety bubble surrounding a robotic device (4100, 4102, 4104), the robotic device can be configured to slow its manipulation speed (e.g., Pause and/or Stop), e.g., to reduce the risk of causing safety issues. In some embodiments, the robotic device can monitor whether a user has entered the safety bubble. Then, depending on whether the robotic device is executing a small displacement manipulation (4102) or a large displacement manipulation (4104), the robotic device may adjust its movement speed, e.g., slow down its movements, to account for the presence of the user. With larger displacement manipulations (4104), the robotic device can slow down more (e.g., come to a stop) than with smaller displacement manipulations.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Some embodiments and/or methods described herein can be performed by a different software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

It will be understood that, although the terms first, second, third, etc. may be used herein to describe various elements, these elements should not be limited by these terms. These terms are only used to distinguish one element from another element. Thus, a first element discussed herein could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof

What is claimed is:
1. A robotic device, comprising:
a memory;
a base supported on a transport element;
a manipulating element coupled to the base and including an end effector;
a set of one or more sensors; and a processor operatively coupled to the memory, the base, the manipulating element, and the set of sensors, the processor configured to:
  in response to receiving a first user input indicating a starting pose for opening a first door, register the starting pose of the base and the end effector relative to a first activation device for opening the first door;
  obtain, using the set of sensors and during a demonstration of a manipulation required to trigger the first activation device to open the first door, sensor data at a plurality of keyframes of the demonstration;
  in response to receiving a second user input indicating a target pose for triggering the first activation device, register the target pose of the end effector relative to the first activation device;
  generate a plan for triggering the first activation device based at least in part on the starting pose, the sensor data collected at the plurality of keyframes, and the target pose;
  identify a plurality of additional starting poses for opening the first door;
  generate a plurality of additional plans for triggering the first activation device based at least in part on the plurality of additional starting poses, the sensor data collected at the plurality of keyframes, and the target pose;
  store the plan and the plurality of additional plans for triggering the first activation device as a plan cache in the memory;
  detect, using at least one sensor from the set of sensors, at least one of a second door or a second activation device for opening the second door; and
  select, based on a pose of the base and the end effector relative to the second activation device, a specific plan from the plan cache to execute such that the second door can be opened.

2. The robotic device of claim 1, wherein the processor is further configured to:
  scan, using at least one sensor of the set of sensors, an environment near the robotic device; and
  identify, based on the scan of the environment, a marker associated with the activation device,
  the processor being configured to register the starting pose of the base and the end effector relative to the first activation device based at least in part on a position of the marker relative to the base.

3. The robotic device of claim 1, wherein the first door is a specific type of door of a plurality of types of doors, and the processor is further configured to associate the plan cache with the specific type of door.

4. The robotic device of claim 3, wherein the processor is further configured to determine that the second door is the specific type of door,
  the processor configured to select the specific plan from the plan cache associated with the specific type of door in response to the processor determining that the second door is the specific type of door.

5. The robotic device of claim 1, wherein the processor is further configured to:
  obtain information of an obstacle in an environment near the second door;
  determine whether executing the specific plan would cause a collision between the robotic device and the obstacle; and
  in response to determining that executing the specific plan would cause a collision, generate a modified plan for triggering the second activation device.

6. The robotic device of claim 5, wherein the processor is configured to obtain information of the obstacle by retrieving information of objects near at least one of the second door or the second activation device from a map of the environment stored in the memory.

7. The robotic device of claim 1, wherein the processor is further configured to:
  determine whether executing the specific plan would successfully trigger the second activation device;
  in response to determining that the specific plan would successfully trigger the second activation device, execute the specific plan.

8. The robotic device of claim 7, wherein the processor is further configured to:
  in response to determining that the specific plan would not successfully trigger the second activation device, generate a modified plan for triggering the second activation device.

9. The robotic device of claim 1, wherein the processor is further configured to:
  execute the specific plan; and
  determine, using at least one sensor from the set of sensors, whether the execution of the specific plan successfully triggered the second activation device;
  in response to determining that the execution of the plan successfully triggered the second activation device, cause the transport element to navigate the robotic device through the second door.

10. The robotic device of claim 9, wherein the processor is further configured to:
  in response to determining that the execution of the specific plan did not successfully trigger the second activation device, select a different plan from the plan cache; and
  execute the different plan.

11. The robotic device of claim 9, wherein the processor is further configured to:
  in response to determining that the execution of the specific plan did not successfully trigger the second activation device, generate a modified plan for triggering the second activation device.

12. The robotic device of claim 1, wherein the processor is configured to identify the plurality of additional starting poses by randomly sampling around the starting pose based on a statistical distribution.

13. The robotic device of claim 1, wherein the processor is further configured to:
  in response to receiving a third user input indicating that an obstacle is located near the first door, obtain, using at least one sensor from the set of sensors, spatial and geometric information of the obstacle,
  the processor configured to generate the plan and the plurality of additional plans further based on the spatial and geometric information of the obstacle.

14. A robotic device, comprising:
  a base supported on a transport element;
  a manipulating element coupled to the base and including an end effector;
  a set of one or more sensors; and
  a memory storing (1) a first plan cache including a first plurality of plans for triggering a first type of activation device for opening a first type of door, and (2) a second plan cache including a second plurality of plans for triggering a second type of activation device for opening a second type of door;

a processor operatively coupled to the base, the manipulating element, the set of sensors, and the memory, the processor configured to:
scan, using at least one sensor from the set of sensors, an environment near the robotic device;
identify, based on the scan of the environment, a marker associated with an activation device for opening a door;
determine a pose of the base and the end effector relative to the marker;
determine whether the activation device is of the first type of activation device or of the second type of activation device;
in response to the activation device being of the first type, select a plan from the first plan cache based on the pose of the base and the end effector;
in response to the activation device being of the second type, select a plan from the second plan cache based on the pose of the base and the end effector; and
execute the plan selected from the first plan cache or from the second plan cache.

15. The robotic device of claim 14, wherein the processor is further configured to:
after executing the plan, determine whether the door has opened using at least one sensor from the set of sensors;
in response to determining that the door has opened, cause the transport element to navigate the robotic device through the door.

16. The robotic device of claim 15, wherein the processor is further configured to:
in response to determining that the door has opened, position the manipulating element into a predefined safe position prior to causing the transport element to navigate the robotic device through the door.

17. The robotic device of claim 15, wherein the plan is a first plan, and the processor is further configured to:
in response to determining that the door has not opened, select a second plan from the first plan cache or the second plan cache, the second plan being different from the first plan; and
execute the second plan.

18. The robotic device of claim 15, wherein the plan is a first plan, and the processor is further configured to:
in response to determining that the door has not opened, move the base and the end effector into a different pose relative to the marker associated with the activation device;
select a second plan from the first plan cache or the second plan cache based on the different pose; and
execute the second plan.

19. The robotic device of claim 14, wherein the processor is further configured to:
detect a collision with an obstacle during the execution of the plan;
in response to detecting the collision, terminate the execution of the plan and move the end effector back into a predefined safe position; and
generate a modified plan for triggering the activation device that avoids a collision with the obstacle.

20. The robotic device of claim 14, wherein the processor is configured to:
in response to receiving a user input after executing the plan that indicates that the door has not opened, select a second plan from the first plan cache or second plan cache; and
execute the second plan.

21. The robotic device of claim 14, wherein the processor is further configured to:
define a safety perimeter associated with the robotic device;
determine a likelihood that an object has entered the safety perimeter; and
based on the likelihood:
pause movement of the manipulating element;
slow a speed of movement of the manipulating element; or
resume movement of the manipulating element.

22. The robotic device of claim 14, wherein the processor is configured to select the plan from the first cache by selecting the plan from the first cache that is associated with a starting pose of the base and the end effector that is substantially the same as the pose of the base and the end effector, and
the processor is configured to select the plan from the second cache by selecting the plan from the second cache that is associated with a starting pose of the base and the end effector that is substantially the same as the pose of the base and the end effector.

23. A robotic device, comprising:
a base supported on a transport element;
a manipulating element coupled to the base and including an end effector;
a set of sensors; and
a memory storing a plan cache including a plurality of plans for triggering an activation device for opening a door, each plan from the plurality of plans being associated with a starting pose of the base and the end effector relative to the activation device;
a processor operatively coupled to the base, the manipulating element, the set of sensors, and the memory, the processor configured to:
scan, using at least one sensor from the set of sensors, an environment near the robotic device;
identify, based on the scan of the environment, a marker associated with the activation device;
determine a current pose of the base and the end effector relative to the marker;
select the plan from the plurality of plans having a starting pose of the base and the end effector that is substantially the same as the current pose of the base and the end effector; and
execute the plan to trigger the activation device to open the door.

24. The robotic device of claim 23, wherein the processor is further configured to:
after executing the plan, determine whether the door has opened using at least one sensor from the set of sensors; and
in response to determining that the door has opened, cause the transport element to navigate the robotic device through the door.

25. The robotic device of claim 24, wherein the processor is further configured to:
in response to determining that the door has opened, position the manipulating element into a predefined safe position prior to causing the transport element to navigate the robotic device through the door.

26. The robotic device of claim 24, wherein the plan is a first plan, and the processor is further configured to:
in response to determining that the door has not opened, select a second plan from the plan cache, the second plan being different from the first plan; and
execute the second plan.

27. The robotic device of claim 24, wherein the plan is a first plan, and the processor is further configured to:
- in response to determining that the door has not opened, move the base and the end effector into a different pose relative to the marker associated with the activation device;
- select a second plan from the plan cache based on the different pose; and
- execute the second plan.

28. The robotic device of claim 23, wherein the processor is further configured to:
- detect a collision with an obstacle during the execution of the plan;
- in response to detecting the collision, terminate the execution of the plan and move the end effector back into a predefined safe position; and
- generate a modified plan for triggering the activation device that avoids a collision with the obstacle.

\* \* \* \* \*

UNITED STATES PATENT AND TRADEMARK OFFICE
CERTIFICATE OF CORRECTION

PATENT NO. : 11,904,470 B2
APPLICATION NO. : 18/446040
DATED : February 20, 2024
INVENTOR(S) : Andrea Lockerd Thomaz et al.

It is certified that error appears in the above-identified patent and that said Letters Patent is hereby corrected as shown below:

In the Specification

At Column 20, Line number 37: "depicted in FIG. 1*n* some embodiments, robotic device 500" should read --depicted in FIG. 5. In some embodiments, robotic device 500--

At Column 61, Line numbers 28-40: "doorway connecting two rooms, auto motion: door that opens when motion is detected, auto button: door that opens when a button is pressed, auto scanner: door that opens when badge is scanned, auto wave: door that opens with a wave at a wave sensor, manual_push bar: a manually opened door that opens with a push bar, manual handle_push: a manually opened door that requires pulling a handle, and manual handle_pull: a manually opened door that requires pushing a handle. With the no_door and auto motion door types, a robotic device can travel directly to the door's post waypoint. With other types of doors that require manipulation (e.g., auto button, auto scanner, and auto wave door types), if manipu-" should read --doorway connecting two rooms, auto_motion: door that opens when motion is detected, auto_button: door that opens when a button is pressed, auto_scanner: door that opens when badge is scanned, auto_wave: door that opens with a wave at a wave sensor, manual_push_bar: a manually opened door that opens with a push bar, manual_handle_push: a manually opened door that requires pulling a handle, and manual_handle_pull: a manually opened door that requires pushing a handle. With the no_door and auto_motion door types, a robotic device can travel directly to the door's post waypoint. With other types of doors that require manipulation (e.g., auto_button, auto_scanner, and auto_wave door types), if manipu- --

At Column 62, Line number 1: "second button (e.g., 0) to tell robot the door is closed, or a" should read --second button (e.g., O) to tell robot the door is closed, or a--

At Column 69, Line number 54: "device's's workspace. For instance, in some embodiments" should read --devices' workspace. For instance, in some embodiments--

At Column 71, Line number 48: "$p_{max}(z^i)=I(z^i=z_{max})$" should read --$p_{max}(z^i) = I(z^i=z_{max})$--

At Column 71, Line number 53: "$p_{rand}(z^i)=U(z^i;0z^{mar})$" should read --$p_{rand}(z^i) = U(z^i; 0, z_{max})$--

Signed and Sealed this
Twenty-first Day of May, 2024

*Katherine Kelly Vidal*
*Director of the United States Patent and Trademark Office*

CERTIFICATE OF CORRECTION (continued)

At Column 72, Line number 47: "eling approach described above is anon-limiting example of" should read --eling approach described above is a non-limiting example of--

At Column 73, Line number 67: "$M(q)\hat{q} + N(q,\dot{q}) = T + T_{ext}$" should read --$M(q)\ddot{q} + N(q,q) = T + T_{ext}$--

At Column 74, Line number 7: "$\dot{x} = J(q)\dot{q}$" should read --$\dot{x} = J(q)\dot{q}$--

At Column 74, Line number 12: "denoted by $q_d$ and $\dot{q}_d$ respectively. Using the above trans-" should read --denoted by $q_d$ and $\dot{q}_d$ respectively. Using the above trans- --

At Column 74, Line number 32: "the value of $F_a$ is equal to the value of $\ddot{x}_d$ when $F_{ext}$ 0." should read --the value of $F_a$ is equal to the value of $\ddot{x}_d$ when $F_{ext}$ is 0.--

At Column 74, Line numbers 35-36: "$\ddot{x}_d = K(q_d - q) + D(\dot{q}_d - \dot{q}) + 1 \int (q_d - q)dq + F_a - F_m = 2K(q_d - q) + 2D(\dot{q}_d - \dot{q}) + dI \int (q_d - q)dq - F_m$" should read --$\ddot{x}_d = K(q_d - q) + D(\dot{q}_d - \dot{q}) + I \int (q_d - q)dq + F_a - F_m = 2K(q_d - q) + 2D(\dot{q}_d - \dot{q}) + 2I \int (q_d - q)dq - F_m$--

At Column 74, Line number 63: "$\text{Min}_x x^T Q x - C^T x$" should read --$\min_x x^T Q x - C^T x$--

At Column 74, Line number 67: "$\min_q (\ddot{x} - \ddot{x}_d)^T \Lambda (\ddot{x} - \ddot{x}_d) + \lambda(\ddot{q} - \ddot{q}_d)^T \Phi(\ddot{q} - \ddot{q}_d)$" should read --$\min_{\ddot{q}} (\ddot{x} - \ddot{x}_d)^T \Lambda (\ddot{x} - \ddot{x}_d) + \lambda(\ddot{q} - \ddot{q}_d)^T \Phi(\ddot{q} - \ddot{q}_d)$--

At Column 75, Line numbers 5-6: "$(\ddot{x} - \ddot{x}_d)^T \Lambda (\ddot{x} - \ddot{x}_d) = \ddot{q}^T \ominus \ddot{q} - 2(\ddot{x}_d - j\ddot{q})^T \Lambda j\ddot{q} + (\ddot{x}_d - j\ddot{q})^T \Lambda (\ddot{x}_d - j\ddot{q}) \ominus = J(q)T\Lambda J(q)$" should read --$(\ddot{x} - \ddot{x}_d)^T \Lambda (\ddot{x} - \ddot{x}_d) = \ddot{q}^T \Theta \ddot{q} - 2(\ddot{x}_d - j\ddot{q})^T \Lambda j\ddot{q} + (\ddot{x}_d - j\ddot{q})^T \Lambda (\ddot{x}_d - j\ddot{q}) \Theta = J(q)^T \Lambda J(q)$--

At Column 75, Line number 11: "$\min_q \ddot{q}^T Q \ddot{q} - 2C^T \ddot{q}$" should read --$\min_{\ddot{q}} \ddot{q}^T Q \ddot{q} - 2C^T \ddot{q}$--

At Column 75, Line number 13: "$Q^q = \ominus + \lambda\Phi$" should read --$Q = \Theta + \lambda\Phi$--

At Column 75, Line number 15: "$C^T = (\ddot{x}_d - J\ddot{q})\Lambda J + \lambda \ddot{q}_d \Phi$" should read --$C^T = (\ddot{x}_d - j\ddot{q})\Lambda J + \lambda \ddot{q}_d \Phi$--

At Column 75, Line number 18: "eration$q$ . The resulting acceleration can then be applied to" should be --eration $\ddot{q}^*$. The resulting acceleration can then be applied to--